United States Patent
Garcia, III et al.

(10) Patent No.: US 11,222,372 B2
(45) Date of Patent: Jan. 11, 2022

(54) METHODS AND SYSTEMS FOR ONLINE TRANSACTIONS

(71) Applicant: Carvana, LLC, Tempe, AZ (US)

(72) Inventors: Ernest C. Garcia, III, Phoenix, AZ (US); Nicole Behrens, Phoenix, AZ (US); Adam Swofford, Phoenix, AZ (US); William Adams, Scottsdale, AZ (US)

(73) Assignee: Carvana, LLC, Tempe, AZ (US)

( * ) Notice: Subject to any disclaimer, the term of this patent is extended or adjusted under 35 U.S.C. 154(b) by 351 days.

(21) Appl. No.: 15/924,084

(22) Filed: Mar. 16, 2018

(65) Prior Publication Data

US 2018/0204261 A1 Jul. 19, 2018

Related U.S. Application Data

(63) Continuation of application No. 14/161,212, filed on Jan. 22, 2014, now Pat. No. 9,922,356.

(Continued)

(51) Int. Cl.
| | |
|---|---|
| *G06Q 30/06* | (2012.01) |
| *H04N 7/18* | (2006.01) |
| *G03B 37/02* | (2021.01) |
| *G06Q 40/02* | (2012.01) |
| *G06T 11/60* | (2006.01) |
| *G06T 13/00* | (2011.01) |

(Continued)

(52) U.S. Cl.
CPC ......... *G06Q 30/0609* (2013.01); *G03B 37/02* (2013.01); *G06Q 30/0641* (2013.01); *G06Q 30/0643* (2013.01); *G06Q 40/025* (2013.01); *G06T 11/60* (2013.01); *G06T 13/00* (2013.01); *G06T 13/80* (2013.01); *G06T 19/006* (2013.01); *H04N 5/2224* (2013.01); *H04N 5/2256* (2013.01); *H04N 5/23206* (2013.01); *H04N 5/23238* (2013.01); *H04N 5/247* (2013.01); *H04N 7/181* (2013.01); *G03B 17/561* (2013.01); *G06F 3/0482* (2013.01); *G06F 2203/04806* (2013.01); *G06T 2200/24* (2013.01)

(58) Field of Classification Search
CPC .................................................. G06Q 30/06–08
USPC ............................................... 705/26.1–27.2
See application file for complete search history.

(56) References Cited

U.S. PATENT DOCUMENTS

| | | |
|---|---|---|
| 6,448,987 B1 | 9/2002 | Easty et al. |
| 6,901,384 B2 | 5/2005 | Lynch et al. |

(Continued)

OTHER PUBLICATIONS

In Re Venner et al., No. 6391, LexisNexis; United States Court of Customs and Patent Appeals; Oral argument Nov. 7, 1958, Dec. 19, 1958.

(Continued)

*Primary Examiner* — Ming Shui
(74) *Attorney, Agent, or Firm* — The Marbury Law Group, PLLC

(57) ABSTRACT

Systems, methods, and devices of the various embodiments enable online transactions related to buying/selling an item, such as a vehicle. In an embodiment, one or more installment agreements relating to a user and one or more items may be generated in response to one or more received inputs. In an embodiment, a deal table comprising the one or more installment agreements may be generated, and the deal table may be transmitted to a user device for presentation via the user interface.

21 Claims, 35 Drawing Sheets

Related U.S. Application Data

(60) Provisional application No. 61/830,963, filed on Jun. 4, 2013, provisional application No. 61/793,445, filed on Mar. 15, 2013, provisional application No. 61/775,384, filed on Jan. 22, 2013.

(51) Int. Cl.

| | | |
|---|---|---|
| *G06T 13/80* | (2011.01) | |
| *G06T 19/00* | (2011.01) | |
| *H04N 5/222* | (2006.01) | |
| *H04N 5/225* | (2006.01) | |
| *H04N 5/232* | (2006.01) | |
| *H04N 5/247* | (2006.01) | |
| *G03B 17/56* | (2021.01) | |
| *G06F 3/0482* | (2013.01) | |

(56) References Cited

U.S. PATENT DOCUMENTS

| | | | |
|---|---|---|---|
| 6,950,807 | B2 | 9/2005 | Brock |
| 7,992,102 | B1* | 8/2011 | De Angelo ......... G06F 3/04886 |
| | | | 715/834 |
| 9,436,380 | B2* | 9/2016 | Chmielewski ........ G06F 3/0482 |
| 2002/0082860 | A1 | 6/2002 | Johnson |
| 2007/0011083 | A1 | 1/2007 | Bird et al. |
| 2013/0104079 | A1* | 4/2013 | Yasui ................... G06F 3/0482 |
| | | | 715/834 |
| 2013/0127911 | A1* | 5/2013 | Brown ................ G06F 3/04886 |
| | | | 345/649 |
| 2013/0226683 | A1* | 8/2013 | Bement .................. G06Q 30/00 |
| | | | 705/14.23 |

OTHER PUBLICATIONS

Credit Acceptance Corp, Guaranteed Credit Approval, Auto Loan; http://www.insider-car-buying-tips.com/credit_acceptance_corp.html; accessed Dec. 17, 2013.

Auto Success; Credit Acceptance's Upgraded Credit Approval Processing System Simplifies Approval Process; vol. 1 Issue 33; http://www.imakenews.com/autosuccess/e_article001075242.cfm?x=bgB6Vlj,b7jJcq29,w; accessed Dec. 17, 2013.

Credit Acceptance Corp (CACC.OQ) Company Profile | Reuters.com; http://www.reuters.com/finance/stocks/companyProfile?symbol=CACC.OQ; accessed Dec. 17, 2013.

Credit Acceptance Corporation—Annual Report; United States Securities and Exchange Commission; Washington D. C. 20549; Form 10-K; Annual Report Pursuant to Section 13 or 15(d) of the Securities Exchange Act of 1934. http://www.ir.creditacceptance.com/secfiling.cfm?filingID=885550-13-18&CIK=885550; accessed Dec. 17, 2013.

* cited by examiner

METHODS AND SYSTEMS FOR ONLINE TRANSACTIONS

RELATED APPLICATIONS

The present application is a continuation of U.S. Non-Provisional application Ser. No. 14/161,212, entitled "Methods and Systems For Online Transactions" filed Jan. 22, 2014 which claims the benefit of priority to U.S. Provisional Application No. 61/755,384, entitled "Methods and Systems for Online Transactions" filed Jan. 22, 2013, U.S. Provisional Application No. 61/793,445, entitled "Methods and Systems for Online Transactions" filed Mar. 15, 2013, and U.S. Provisional Application No. 61/830,963, entitled "Methods and Systems for Online Transactions" filed Jun. 4, 2013. The entire contents of all four applications are hereby incorporated by reference.

BACKGROUND

Purchasing an item, such as a motor vehicle, can be time consuming and complex. Typically, a buyer (or customer) and seller must meet in person to discuss the terms of the contract, inspect the item, close the contract, and take possession of the item. The need to meet in person can result in lost time for both the buyer (or customer) and seller.

SUMMARY

The systems, methods, and devices of the various embodiments enable online transactions related to buying/selling an item, such as a vehicle. In an embodiment, one or more installment agreements relating to a user and one or more items may be generated in response to one or more received inputs. In an embodiment, a deal table comprising the one or more installment agreements may be generated, and the deal table may be transmitted to a user device for presentation to a customer (or buyer) via the user interface.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
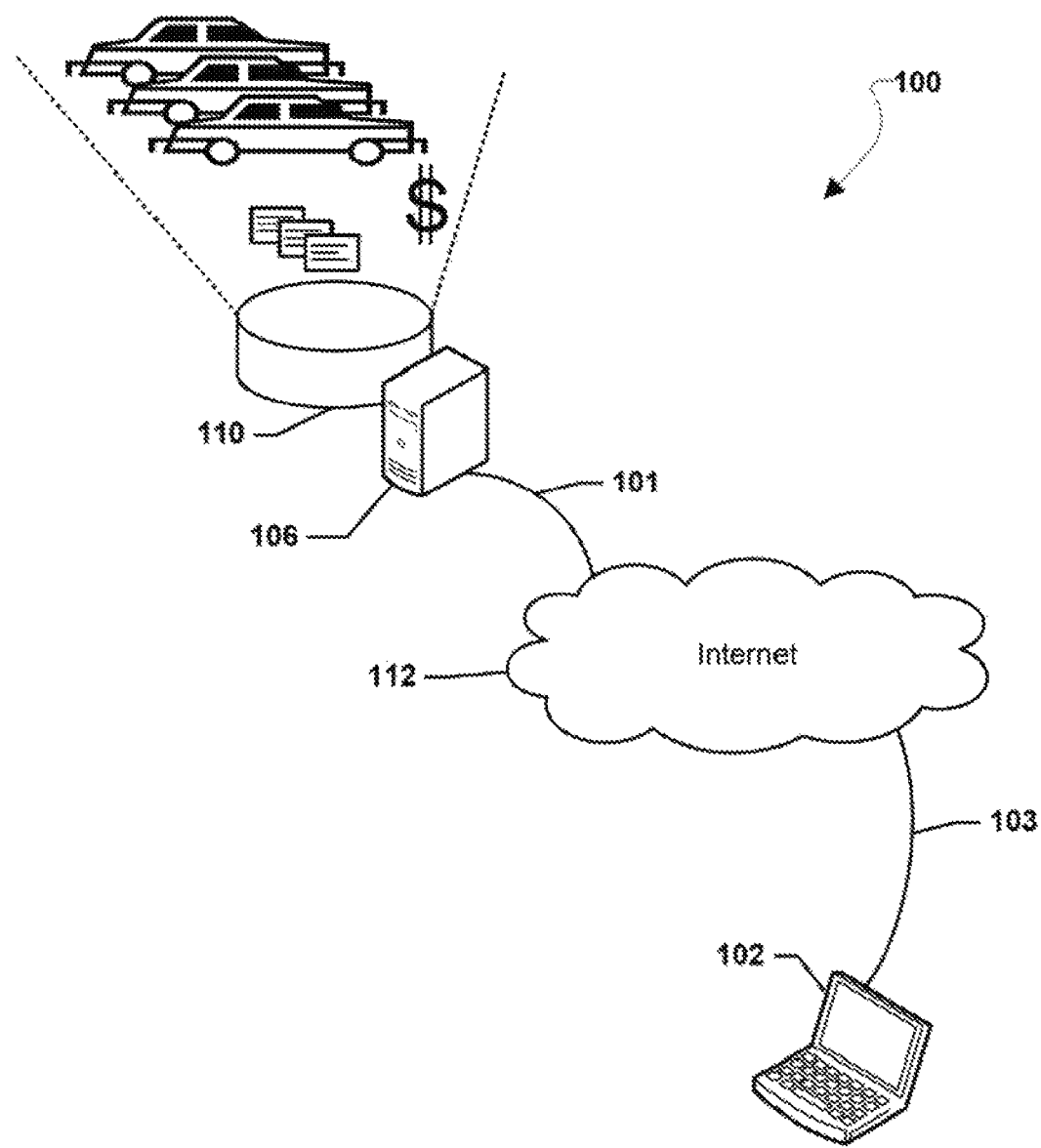
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "computing device" is used to refer to any one or all of desktop computers, cellular telephones, smart phones, personal or mobile multi-media players, personal data assistants (PDA's), laptop computers, tablet computers, smart books, retail terminals, palm-top computers, wireless electronic mail receivers, multimedia Internet enabled cellular telephones, wireless gaming controllers, and similar electronic devices which include a programmable processor and memory and circuitry for receiving user input and rendering data, such as web pages, images, etc.

The various embodiments are described herein using the term "server." The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The systems, methods, and devices of the various embodiments enable online transactions related to buying/selling an item, such as a vehicle. In an embodiment, one or more installment agreements relating to a user and one or more items may be generated in response to one or more received inputs. In an embodiment, a deal table comprising the one or more installment agreements may be generated, and the deal table may be transmitted to a user device for presentation to a customer (or buyer) via the user interface.

Various examples of different items or products are discussed herein, specifically motor vehicles or vehicles. The discussions of motor vehicle or vehicles are provided merely as examples to better illustrate the aspects of the various embodiments, and are not intended to limit the various embodiments in any way. Other items or products may be used in the various embodiments, the other items or product may be substituted in the various examples without departing from the spirit or scope of the invention.

In an aspect, a loan pricing engine may provide financing options for the purchase of an item, such as a motor vehicle, to a customer via on online, interactive interface. These terms may be pre-approved by the provider so any combination of options the customer chooses may be immediately applied. As an example, the customer may be able to choose certain parameters as inputs to find the exact financing terms that work best for him or her.

In an aspect, determining loan pricing may include calculating financing parameters for a particular vehicle-customer combination given customer chosen inputs. Parameters may comprise a down payment, period payment, and annual percentage rate (APR") for a certain term. One or more parameters may be calculated if one of down payment, period payment, or term is specified at a certain value (e.g., an APR). Additionally, determining loan pricing may include running the above calculations for every potential set of inputs the customer could make for a particular vehicle-customer combination. As an example, preloaded deals data objects, such as deal tables, may be populated from the calculated information. As a further example, rules and/or requirements may be used to select one or more deals from the objects. Further, determining loan pricing may include sending the preloaded deals objects to the customer's computing device for temporary storage by the web browsing software running on the customer's computing device.

In an embodiment, a customer's computing device receiving the preloaded deals objects may parse (e.g., read) the objects and locate the necessary financing parameters given input parameters. In an aspect, objects may be organized by down-term and period payment-term. A customer may select a down and term and receive an APR and payment or select a payment and term and receive an APR and down for a particular item based on data in the received objects. For a certain down and period payment, the customer's computing device may determine a term and APR by combining data from two or more received objects, such as data from two or more deal tables.

In an embodiment, a user interface on a website may allow for customer input and may display output with regards to financing parameters. In an aspect, the user interface may take on the appearance of an automotive dashboard with gauges and dials. As an example, the user interface may present the limits of feasibility for each purchase contract parameter. As a further example, the user interface may utilize features such as locking and snapping.

In an aspect, multiple systems may be employed to present financing options for the purchase of a motor vehicle or similar product to a customer via an online, interactive interface. The various embodiments may provide a user with financial requirements that meet both the needs of the seller and the preferences of the customer (or buyer).

In an embodiment, a retail installment agreement including financing options meeting the needs of the seller and the buyer may be generated by first generating an initial retail installment agreement for a customer (or buyer) given the buyer's personal traits, the market conditions, and/or user selected inputs.

Financing a vehicle or similar item may allow for payment to be completed over several phases. Two components may define payment, an immediate down payment and several smaller, regularly made payments. The down payment may constitute a portion of the total price of the vehicle and may be paid at the time of purchase. The remaining value of the vehicle (and any fees or taxes applied in addition) left unpaid may constitute the amount financed, which must be paid off by the series of incremental payments, made once per period of time, for the entire life of the retail installment agreement or financial transaction. The number of periods, and therefore the number of period payments, may be defined by the term of the retail installment agreement. The APR may be applied to the amount financed in order to compensate a service provider (e.g., a loan servicing company) for the costs of servicing the retail installment agreement, to compensate for customer risk, and to attain their desired rate of return on the retail installment agreement.

An important detractor from service provider's motivation to supply a deal to a customer may come from the risk of a customer never fully paying for his or her vehicle. A failure to repay the retail installment agreement may be referred to as a charge off and the potential likelihood for a customer to charge off on any given period may be measured as his or her hazard. A customer's hazard rate may be calculated from their credit score, using a risk assessment model. The service provider additionally may request the customer's income to better understand his or her ability to pay. One or more of these values may be collected to help the service provider determine the extreme limits for any potential deal with this customer and vehicle. Some of these important values may include the maximum possible period payment, the maximum available term length, and the customer's payment to income ratio (PTI). One or more of these values may become subsequently implemented in the system and may assist the service provider in undertaking the financial transaction under the risk of potential charge offs and regular costs of service.

In the event of a charge off, the service provider may recoup at least a portion of its costs with recovery of the motor vehicle. The expected recovery amount for any particular retail installment agreement may be determined by customer hazard and the vehicle's depreciation in value. The sum of expected payments (from the customer) and expected recoveries, reduced by expected servicing costs, may constitute the amount financed. The service provider may then discount the amount financed by a special rate, defined by the company as the desired return percentage for all retail installment agreements. This desired return may be the rate at which expected payments, recoveries, and servicing costs are calculated over. The goal of this process may be to calculate the specific APR that results in an expected internal rate of return (IRR) for the expected cash flows that equals the desired return. This may be in direct contrast to most lenders today, who accept any APR as an input. The APR the service provider calculates may then be used to find the appropriate down payment amount for the retail installment agreement via its important use in determining the appropriate amount financed. The service provider insures from this process that the retail installment agreement, via the discounted amount financed, now includes an expectation for the service provider's desired return or yield in issuing a retail installment agreement for a vehicle.

When composing a deal for a particular customer-vehicle combination, the service provider may know the full price of the vehicle, as well as all applicable taxes and fees. Therefore the seller (e.g., the service provider and/or company selling the vehicle) may know the full value of the retail installment agreement. The difference between this value, called the Required Present Value, and the amount financed discounted above, may be the down payment for the deal. Finding the exact value of down payment may be separated into several smaller calculations depending on how the other parameters of the financial transaction are calculated. The Calculated Required Down may be the difference between the Required Present Value and the present value of PTI Constrained Maximum Period Payment over maximum term and Cap Constrained APR. PTI Constrained Maximum Period Payment may be found by taking the lesser of the risk assessed maximum period payment mentioned above and the product of the customer's income per period and his or her PTI ratio. This may insure the customer is not given a payment he or she cannot pay given income constraints. Cap Constrained APR is the minimum value between Start APR and the upward bound APR Constraint imposed by state law or seller policy. Start APR is the appropriate rate for the maximum term, maximum period payment amount, and the customer's PTI. From this perspective the service provider may insure an upper bound for APR under the condition of minimum down payment, while checking to conform with local legislation as well. The amount that constitutes minimum down payment may be the Calculated Required Down if it also equals the Active Required Down though the former value may usually be too small a number, as the maximum period payment amount applied over the maximum term length may produce an amount financed greater than the value of the vehicle. Unless the vehicle is very expensive, the Calculated Required Down may most likely be negative, which may be unacceptable. The Active Required Down value may have to at least cover the initial depreciation of the vehicle at time of purchase, the very condition that dictates Active Required Down may be the minimum down payment as long as it is greater than the Calculated Required Down amount. The corresponding Period Payment at the Active Required Down for the Maximum Term may be calculated at maximum term, Active Required Down, and Cap Constrained Start APR. All of these calculations may serve to compose the initial (or basic) retail installment agreement deal for the customer.

Maximum term, minimum down payment, maximum period payment and Cap Constrained APR may define the initial, minimal conditions for a retail installment agreement between the service provider (or seller) and a customer. However, in the various embodiments, a customer may be enabled to select their own financing conditions to best match his or her own preferences. Therefore, all of the above variables may be recalculated when the user (or customer) chooses to specify a certain period payment or down payment.

In an embodiment, to account for the customer's ability to select their own financing conditions, a seller server may populate alternative versions of the retail installment agreement for every possible term length within the acceptable limit. For each number of periods, many separate calculations may be made to allow for the high degree of customer choice. For example, assume a customer increases the down payment amount beyond that of the Active Required Down. There may now exist Extra Down Chosen, which may be the difference between the new chosen or specified down payment and the Active Required Down. The difference between the Required Present Value and the specified down payment may be the new Required Amount Financed at the specified down. An increase in down payment may reduce the amount financed, reduces risk, and increases the expected cash for the deal. To compensate for the increased down the seller may modify term, reduce period payments, or reduce APR. The seller may choose to pass some of the additional revenue generated from less risk on to the customer in the form of a reduction in APR, meaning the customer may have less additional interest to pay over the life of the deal. Period payments may also decrease if term is kept constant. The Payment Reduction from the Extra Down may be a measure of how much the period payment amount may reduce to and may be found by computing the present value of a set of period payments of one dollar per period for the maximum term. This may serve as the conversion ratio to translate an increase in present value (down payment) dollars into a corresponding reduction in period payment dollars.

Period payments may generally be decreased by more than what may be mandatory for a specific increase in down payment, depending on APR. One mechanism a seller server may use to determine the magnitude of the reduction in period payments may come from the product of the customer's yield and the Cap Constrained APR, though other APR mechanisms may be used as well. The maximum amount a period payment may change due to extra down may be found with an analogous method, except this time the interest may be set by the minimum APR rate. The minimum actual period payment allowed for a specified down may simply be the difference between the maximum reduction allowed and the payment amount established at the Active Required Down rather than the specified down. This value may be important to insure that the APR used in the final retail installment agreement is not below minimum APR and that the actual payment amount for an increase in down payment is not too low. The Start Period Payment at the specified down may be the Calculated Period Payment for the specified down (for example, taking the original payment amount at the Active Required Down and maximum term and subtracting it by the payment reduction for extra down) unless that calculation results in a value below the minimum period payment at specified down. Whichever of those two values is greater may be the Start Payment at Max Term for the Specified Down. The start payment may not be greater than the Payment at the Active Required Down either. From this initial start value period payments may be adapted to match changes in down payment. The end result of all of these calculations may be that a new payment scheme may be created, where the customer may pay more up front but may pay less each succeeding period.

If a customer then wanted to reduce his or her term length by one period while keeping the same down payment, period payment may have to increase. Additionally, any reduction in term may reduce risk. While the amount of each period's payment may have to increase, some of the benefit gained from less risk may be passed on to the customer by the seller via a reduced APR. The first step in determining how period payments need to change to compensate for the loss of a period's payment may be to find the present value of payments that will no longer be made. This may be determined by taking the period payment at the specified down for the previous term length and calculating the present value of that amount discounted by the customer's yield. That present value may then be referred to when determining by how much each periodic payment installment must increase by (the payment change) to compensate for that loss. This may be true unless the payment change when reducing term for the specified down may be found to be less than the minimum payment change for the specified down, in which case the minimum change may be applied. The minimum payment change may simply be the difference between the minimum period payment amount at the specified down at the new term compared to the previous term.

The degree of payment change may also have to be modified if the minimum APR constraint is not met. If the resulting APR from the payment change is below minimum APR, the payment change may have to be adjusted so the new payment figure at the new term produces at least the minimum APR. Whether the magnitude of the payment change is the minimum value or greater, the new period payment at specified down for the new, reduced term may be found by adding the payment change to each old period payment amount under the same down payment at the previous term (or the current term plus one period). If a term is reduced by multiple periods, then these steps may be performed for each period reduced. Thus, if a customer wishes to reduce his or her term from 60 periods to 50 periods, the present value of payments not made, the payment change, and the new period payment amount, may be calculated iteratively for each period lost. Period payments may not change equally for every customer. Risk may play an important factor here as it may everywhere else. One tool, though not the only tool that may be used is customer yield, where higher yields may represent greater risk and larger payment decreases for a reduction in term or an increase in down payment.

Down payment may be just as open to change when the customer wishes for other parameters to remain at certain values. For example, perhaps a user may be interested on maintaining maximum term length while also reducing period payment levels. In that case down payment must increase. Down payment may simply be a measure of present value, therefore the additional or extra down needed may a present value calculation of the change in period payment. The complication may come from which APR value to use. One way to determine the additional down required may be to multiply the Cap Constrained APR by the customer's yield to calculate the present value of the difference between the period payments made at the Active Required Down at maximum term and the chosen payment amount at maximum term. Another way to find the extra down required for a payment change may be to determine the amount of down payment which generates a period payment amount equal to the specified payment reduction. A customer may want to reduce period payments by X payments per period, and a down payment of Y may generate a period payment of X. Therefore the additional down required may be Y for a reduction of X. In this situation yield may not used. This is just one example of how there may be multiple avenues for determining necessary values.

For the magnitude of change that may be required of the down payment to compensate for the reduction in period payments, the resulting APR may not fall below the minimum constraint. Finding the present value for the chosen payment with the absolute minimum APR at maximum term and subtracting that value from the difference between Required Present Value and the Active Required Down may also generate a measure of extra down needed for a desired period payment. As long as the final down payment increase may be equal to or greater than the value just calculated, the seller server may determine the corresponding APR is equal to or greater than its minimum requirement. Of course the actual figure used may not reduce down payment below its minimum constraint as well. Taking the larger down payment change between the figure calculated at regular APR and the figure calculated at minimum APR may be an optimal decision from a risk reducing standpoint. It may also be a good safety check in case the yield adjusted Cap Constrained APR falls below the absolute minimum APR for any possible reason, such as an extremely high down payment due to a low period payment.

If a customer then chooses to reduce the length of a term while maintaining the same period payment, the down payment may increase further in order to achieve the same total amount financed. First the present value of the payments which are not made for the reduced term at the specified period payment may be calculated using the yield adjusted Cap Constrained APR and may be compounded by the previous term length. That value may be added to the any additional down already calculated, in case term have been reduced before, and that total value may be added to the down payment level set at the previous term. That sum may represent the new down payment required at the same period payment amount and the reduced term. In an embodiment, there may be a confirmation system in place. The absolute minimum APR, an important value in determining the minimum period payment for a specified down, may drive another separate yet related calculation for the additional down for a specified period payment when term is reduced. If for any reason the final down payment amount arrived at with Cap Constrained APR is less than the value calculated with minimum APR, then the latter value may be used to calculate the new down for a specified period payment when term is reduced. Since minimum APR may be used to calculate the minimum period payment for any given down payment, minimum APR may also be used to determine the minimum down payment for any given period payment. This minimum threshold may be important again for it may outline the necessary retail installment agreement parameters given customer input for the service provider to go forward with the deal. Efficiency in conveying practical retail installment agreement options is a primary goal of the service provider retail installment agreement pricing, as it may reduce the costs for both the customer and the seller.

The last financing parameter that adapts to customer input may be the actual APR values applied to the specific retail installment agreements generated by the calculations discussed above. Whereas two main APR values (Cap Constrained Start APR and absolute minimum APR) may used to calculate many of the values needed to determine the ultimate down payment or period payment of a possible financial transaction, these two main APR values may not represent the particular APR that best applies to a particular retail installment agreement. Just as down payment, period payment, or term may take on chosen or specified values within acceptable ranges, so too may APR vary in value. The difference may be that APR may function as an output of a particular combination of down payment, period payment, term, and/or any number of the other financing parameters.

The output of APR as a fluctuating value based on a combination of down payment, period payment, term, and/or other financing parameters represents a departure from previous retail installment agreement systems which have not allowed APR to fluctuate based on customer selected financing parameters.

In an embodiment, APR may function as an input in addition to its unique role as an output. The APR for a specified down payment may be the interest rate calculated with a periodic installment amount equal to the period payments for the specified down, with a present value goal of the Required Amount Financed for the specified down, applied over the life of the retail installment agreement (the current term length). The APR for a specified period payment may be calculated again for the current term, but with a installment amount of the specified period payment itself, with a present value goal determined by subtracting the required down for the specified period payment from the Required Present Value. Changing term may adjust the APR from the perspective of down or period payment by changing the life of the financial transaction.

In an embodiment, given a customer's chosen down payment, period payment, term length, and corresponding APR, the seller server may be able to isolate each specified value, one at a time, and calculate retail installment agreement parameters to match each specification. Given certain constraints, some retail installment agreement types may be deemed "true" or feasible deals to actually produce. In certain situations these constraints may be overridden. These constraints may be established by minimum and maximum values, such as those discussed above. The exact amounts of these extreme values may be determined by a risk assessment system or from further calculations involving those values. In an embodiment, a seller server may generate a portion of the relevant calculations used to define the corresponding retail installment agreement parameters, such as all the relevant calculations or less than all the relevant calculations, for a single customer input. However, this process alone may not be sufficient to meet the needs of the final method presented in the user interface where multiple customer inputs must be combined together to find one retail installment agreement deal. Therefore, in an embodiment, a seller server may determine one or more possible customer input decisions (e.g., one or more down payment amounts, one or more term lengths, one or more monthly payment amounts, etc.) and may calculate and compile parameters of potential retail installment agreements ahead of actual user input to generate a series of potential retail installment agreements. In an embodiment, the seller server may calculate all the possible customer input decisions, such as all down payment amounts, all term lengths, and/or all monthly payment amounts, and may calculate and compile parameters of potential retail installment agreements ahead of the actual user input to generate a series of potential retail installment agreements.

In an embodiment, a series of potential retail installment agreements for the particular customer-item (e.g., customer-vehicle) combination may be pre-calculated by a seller server and sent to a customer computing device. In an embodiment, the seller server may create an object, such as a deal table, including the series of potential retail installment agreement parameters. Creating this object (e.g., a Preloaded Deals table), may be advantageous in presenting an smooth interactive experience to the customer in purchasing an item, such as a vehicle. Instead of running all the calculations discussed above to adjust terms of a retail installment agreement in response to customer changes to the terms (e.g., changes to down payment, term, APR, and/or period payment) one at the time of a customer's particular input selection, one or more, such as all or less than all, potential customer inputs may be anticipated ahead of time such that when the customer may make a selection at his or her computing device, the customer computing device may referencing a set of values for potential installment agreements that have already been calculated and provided to the customer computing device. In order to insure that the customer will not have to resubmit information for every financial parameter adjustment, a series of potential retail installment agreements may be temporarily stored in a memory of the customer's computing device. In an embodiment, an object including the series of potential retail installment agreements may be sent from the seller server to the customer's computing device. In an embodiment, only certain retail installment agreements that meet all necessary constraints may be collected in the object. Both properties, sending the information to the customer, and eliminating invalid installment agreements, may improve efficiency from the customer's perspective, so the interaction with the user interface may be fast and seamless.

In an embodiment, once the customer's vehicle preference and credit information become available, the series of calculations discussed above may be repeatedly performed for a variety of financial parameters. The inputs may be defined on an incremental scale, so that the seller server may not have to wait for the customer to manually select an input and may instead pre-run the calculations discussed above iteratively for the intervals. However, that process may produce a large list of financial structures (e.g., a large series of potential retail installment agreements), and only a certain number of which may actually be feasible from a practical perspective. These transactions may be valid retail installment agreements. After every calculation is run, the seller server may determine the valid retail installment agreements for every input and compiles an object including the valid retail installment agreements, such as a table of Preloaded Deals. Which retail installment agreements are valid may be determined from a set of seller defined constraints, which may vary slightly depending on if it is down payment or period payment which are being specified.

The various embodiments may enable user input to be anticipated. However, not every financial structure that appeals to the customer may appeal to the seller as well. Feasible (or valid) retail installment agreements that qualify as preloaded deals may defined by certain constraints. There may be minimum and maximum limitations imposed on down payment, period payment, term, and APR. Some of these limitations may be constant thresholds established for the particular customer. Other limitations may be adjusted as conditions change, creating a dynamic border for establishing valid retail installment agreements. Both types of limits may work toward guaranteeing that whichever retail installment agreement a customer generates with the user interface, the customer generated retail installment agreement is a financial structure the service provider (or seller) may accept given its own costs and desired return (or yield).

Beginning with constrains on down payment, minimum down payment for all practical purposes may be the Active Required Down. This value may insure that the down payment by the customer covers the initial depreciation in value of the vehicle when it is purchased, as well as any additional restrictions applied by the service provider. The maximum amount that may be supplied for a down payment may be restricted by the minimum required Amount Financed, the present value of the minimum period payment at maximum term and minimum APR. The minimum period payment may be determined from a separate risk assessment program and may unique to the customer. The maximum period payment criterion may either be found from the PTI Constrained Period Payment or from the period payment required by the Active Required Down. The former value may be entirely dependent on the customer's PTI ratio and the results of the separate risk assessment program. There may be no consideration for maintaining Active Required Down. In order to guarantee that Active Required Down is met by the specified payment, the period payment amount may be calculated for Active Required Down. This value, if less than the PTI based value, may be substituted in as the maximum period payment limit. However, the period payment at Active Required Down may be denied from rising above the PTI Constrained Maximum Payment. The result may be a maximum period payment amount that increases with decreases in term until an upward ceiling is hit (PTI value) where maximum payment may remain the same value for all other terms. Often times PTI Constrained Maximum Payment may be dictated by the APR constraint established by state law or company policy. The minimum term length may be defined by the number of periods it may take to reach the full Required Present Value of the vehicle with maximum down payment and maximum period payment with minimum APR. The maximum term length may be established by the maximum down and minimum period payment at minimum APR or from input. Unless the maximum period payment amount is modified, it may be possible at full term for the total amount financed to eat into the minimum down payment. The APR applied to the period payments may add to the amount financed as well. The absolute minimum APR may be a value that itself may be constructed from independent research on the customer's risk assessment and used to calculate the minimum payments necessary for a specified down, a component of minimum Amount Financed. The maximum APR rate possible may be defined either by the Cap Constrained Start APR, which may be set at Active Required Down and maximum term, or a state law imposed value. However, reducing term from the maximum amount may cause the maximum APR as calculated above to be too great a value. Down payment may have a minimum value; therefore the service provider may not want to offer an APR for a specified down payment and corresponding period payment that may be below that minimum amount. Therefore the APR for the minimum down payment may become the practical maximum value for whatever value term takes on. These may be the main constraints faced when calculating potential retail installment agreements, though the type of parameter the customer specifies may play a role in what conditions constitute a valid retail installment agreement.

A customer may be able to specify financing terms by modifying down payment, period payment, term, and APR in various embodiments. Therefore, in an embodiment, the Preloaded Deals table, both to meet the needs of the customer and the limitations of data storage, may be split into two or more objects. In an embodiment, one object may be defined by down payment and term and another object may be defined by period payment and term. These objects may then be cross referenced by the customer computing device to find retail installment agreements by any combination of down, period, term, and/or APR criteria.

The minimum constraint for a valid deal for a specified down payment may be that the selected down payment equal the Active Required Down amount. If the customer does not at least provide that value in down payment no deal may be possible. Furthermore, for the customer's specified down payment, the corresponding period payment amount may not be greater than the maximum payment or less than the minimum payment limits. If, in order to achieve the amount financed on the vehicle given the specified down payment and term, the period payment has to be greater than its maximum limit, a retail installment agreement may not be possible. The value for period payment may be dependent on term and Cap Constrained Start APR. Both measures may also lie on their own valid ranges. A lower period payment could possibly qualify for a specified down payment if it was subject to an APR below the absolute minimum APR, but that may not cover the service provider's costs. Alternatively, greater term may reduce the amount paid per period, but term may only be extended so far before a customer's hazard becomes too great. However, if a customer selects a down payment equal to or greater than the Active Required Down, and if, for the given term, the period payment lies between its minimum and maximum limitations, a retail installment agreement may be determined to be valid.

In an embodiment, retail installment agreement terms may be generated from the perspective of specifying down payments, starting at Active Required Down. The seller server may iterate the process repeatedly, increasing the specified down by established intervals. This iterating process may continue until the down payment amount equals the Required Present Value of the vehicle. If the intervals at which the program iterates are adjusted, the seller server may employ a skip over program that may prevent repeated recordings of already collected valid deals. If a retail installment agreement corresponds to both the old interval as well as the new, it may not be recorded. For each interval of down payment, possible retail installment agreements may be listed in order of descending term length, and include with them their corresponding APR and period payment values.

Retail installment agreements may be collected based on specified period payment amounts. This seller server may begin at the first interval of period payment above zero (the conditions of cash purchase) and may iterate repeatedly for each interval in a similar process as for down payment and lists possible retail installment agreements, such as all possible retail installment agreements, at each period payment level in order of decreasing term. The conditions for a valid retail installment agreement for a specified payment may be defined differently from the conditions for down payment. A feasible financial transaction for any specified period payment at a given term may first provide an amount financed greater than the minimum amount financed. Additionally, the down payment corresponding to the chosen payment may not be less than the Active Required Down. Since the amount financed in a retail installment agreement may be the difference between the Required Present Value of the vehicle and the down payment for the chosen period payment and since down payment may not drop below minimum levels, the amount financed also may have an upward limit. When a period payment is specified below the payment required for Active Required Down, the difference (or change) in value may correspond with an amount of additional down that has to be added to the Active Required Down. There may be two calculations for this number, one at minimum APR and one at Cap Constrained APR. The greater of those two values may be used to help compute the proper down payment amount for a specified period payment, given the existing Active Required Down and any additionally owed down payment for a reduction in term from its maximum length. Thus, APR and term limits may have an indirect effect on determining down payment amounts for specified period payments, and which period defined retail installment agreements may meet the two main conditions for validity.

Once the iteration process is complete, every valid retail installment agreement for every input interval or skip over interval will be compiled into one of two Preloaded Deal tables or objects by a seller server. This process may be done immediately upon the customer's selection of a vehicle and provision of credit information. This may save operational time for the user interface over performing calculations on the spot when a user makes a specific selection. Furthermore, since the Preloaded Deals object may be a more secure and easily transferable form of information, it may be transferred to temporary storage on the customer's computing device. This may remove several logistical hurdles that prevent the seamless behavior of the user interface, such as round trip signal time, bandwidth delays, etc.

In an aspect, a seller server may send the objects discussed above, such as one or more deal tables, to a customer's computing device. This may be done once a connection is established between the customer's device and the seller server hosting a service provider website. As soon as the customer inputs the necessary information, the Preloaded Deal objects may be constructed as discussed above for a particular customer-item combination and sent to the customer's device for temporary storage when financial parameters are modified.

In an embodiment, the web browser running on the customer's computing device may reference the temporary objects stored on the customer's device. This information may be refreshed periodically as dictated by the customer's web browsing capabilities, typically every time a customer returns to the financing terms page. Using this method the calculations that have to be run for the customer and his or her selected vehicle may be completed and sent to the customer's network connected computing device when he or she begins manipulating the user interface. Therefore, the web interface does not have to cause the customer's computing device to connect to the remote server (i.e., the seller server) to run calculations. Also, the customer computing device does not need to confirm the validity of the results, as all the information that is transferred in the object(s) may be pre-approved by the service provider. In this manner, the customer computing device does not require a customer to resubmit any amendment to the financing parameters to the seller server for approval or adjustment, as is common in past systems. All of the information the customer needs is on his or her computing device and is therefore made available to them almost instantly via a user interface. In basic terminology, the customer may interact with the user interface and may receive immediate feedback without having to hit a "submit" button.

In an embodiment, the user interface running on the customer's computing device may enable the customer to traverse the information stored on the Preloaded Deals object(s) in a manner that corresponds to the operation of the user interface. These objects together may include a portion of the service provider approved retail installment agreements (e.g., one of the valid retail installment agreements, more than one of the valid retail installments agreements, or all of the valid retail installment agreements) for the particular customer-item combination. The valid retail installment agreements may be natively displayed as matrices, a format that may not intuitively display the relationships among the financing parameters. Thus, a customer interface may be helpful to convey the complex interaction of these variables more directly to the customer. The customer interface in turn may aid the customer in finding an installment agreement that best meets his or her needs. However, before that information may be displayed to the customer on the web interface, there may be many important protocols and rules that dictate how information may be referenced in the data objects and by relation how the user interface may ultimately operate.

Where the financing parameters may include down payment, period payment, term, and/or APR, one or more objects, such as two objects, may be created and transferred (i.e., sent) to the customer's computing device. These object(s) may be referred to as the Preloaded Deals objects and comprise pre-approved retail installment agreements (i.e., valid retail installment agreements) organized by either down payment and term and/or period payment and term. These objects may be composed in a variety of computer languages, though a preferred format may be JavaScript Object Notation. The default format to display this information may, as mentioned above, as a matrix or a table. The Down-Term table, as the name may describe, may use down payment amounts as the organization key, with the exact values determined by set increments. One potential default interval length for down payment may be $100. For each increment of down payment, the corresponding maximum and minimum acceptable terms may be listed. Then, for each key value, there may be a sub-table organized by increasing term length, beginning at the minimum term and ascending to the maximum term. Each term length may have a corresponding APR and period payment amount listed. Thus, given a specified down payment and term length, the customer's computing device may perform a search to isolate the given values on the Down-Term table to find the appropriate period payment and APR. All of these values, both inputs and outputs, may be displayed on user interface. The Period-Term table may be ordered in a very similar way, except that the organization keys may be represented by increments of period payment amounts. For any particular period payment determined by the increment applied, the maximum and minimum term lengths may be included. There may also be a sub-table organized again by ascending term within the previously listed limitations. For every term, given a period payment, the corresponding APR and down payment are listed. It may be important to note that while the organizational relationships between down payment, period payment, and term remain the same, the final structure of the tables need not always be in this order or format for the functionality described herein.

When a customer opens the Financing Terms user interface on the service provider website and begins to interact with the user interface, the data objects may be referenced. The customer computing device may search the organizational keys of the objects with their corresponding terms to find the financing parameter that is actively selected. Since the objects may be indexed by either down payment and term or period payment and term, the user interface may be designed to take any of those three as inputs. Objects may use down payment and period payment as separate keys, therefore when one of those two financing parameters is actively specified, the correct key may be found first. The customer may then select a term length. The associated sub-table may then be searched for the specified term length. This may lead to a period payment and APR for the selected down payment and specified term. The customer computing device may also operate in reverse so that the customer may begin by selecting a term length. In that situation, all sub-table rows with the correct term may be isolated first, and then, when a key parameter (period payment or down payment) is specified, the valid row under that key may become the final solution. The search process may be identical regardless if down payment or period payment is the key, though the other specified value may be term for the data objects to be useful. If the customer wished to specify both a period payment and a term and leave term alone, the customer computing device in this step may return an output, even though it may be beyond the scope of the existing objects.

When the customer decides to search for a retail installment agreement by specifying both a down payment and a period payment (or vice versa) a new object may be created. This may be done by taking both existing objects and combining them to form a temporary, reverse look up object. An illustrative situation would be if period payment is selected first by the customer, followed by a particular down payment. In such a scenario, the object containing feasible retail installment agreements organized by period payment and term may be scanned. All deals with keys matching the correct period payment amount may be pulled from that object and used to build a reverse lookup object, for example organized as a table. All of the possible installment agreements that were collected under period payments may then be organized in order of down payment values, along with their corresponding APR and term values. This may create a new object that may be searched under conditions of a single specified period payment and changing down payments. The entire process may be performed for a specified down payment and actively changing period payments as well. Simply substitute one parameter for the other and the process may be the same. Creation of new objects may be performed on the customers' computing devices stored in a temporary state that as a different combination of financing parameters are specified. The reverse lookup may be created to serve a brief, specific purpose. By using both tables and any number of temporary tables temporarily created, if a deal exists for the customer under his or her selected inputs, it may be found and displayed on the interface.

In an embodiment, the customer may select conditions that may not result in valid retail installment agreement, meaning there may be no deal that meets these conditions listed on any of the data objects. However, instead of indicating to the customer the deal is not possible, the customer computing device may work to find an installment agreement that does exist on the objects and therefore is valid that is close to what the customer wants. The customer computing device may utilize pivot points and backing values to determine close valid installment agreements. Both pivot points and backing values serve essentially the same purpose, but operate in very different ways.

In an embodiment, when the customer interacts with the user interface in such a way that a term does not result in a matching valid installment agreement, a temporary object may be created as explained above and pivot points may be generated for the currently selected parameter. Pivot points may represent maximum and minimum limits for feasibility among the financing parameters given each one's value relative to all of the others because each key may have its own maximum and minimum term lengths, and therefore the reverse lookup table may only have a certain range of down payments for a specified period payment or vice versa. Whatever parameter the customer may be currently searching through, whether it may be term, down payment, or period payment, may have upper and lower bounds, partly determined by whatever value the key takes on. Values one half of an increment below or above a pivot point or points may be given shift values. There may be three shift values: negative one, zero, and one. A shift value of negative one may be attached to a parameter value indicating the presently selected value may be below the pivot point and the keyed in value needs to increase. A positive one shift value may indicate the number on the active parameter may be greater than the pivot point and the previously set parameter value may need to be decreased. A shift value of zero may mean no effect, or that the selected value may lie in the acceptable range of pivot points, or pivot point and an absolute maximum or minimum. There may be one or two pivot points on a gauge depending on the relationship between the keyed in or specified value and the value currently being selected or searched. When a customer extends beyond the pivot point, this may indicate to the customer computing device to suspend use of the temporary third object and return to one of the existing objects. This may be because, given a specific key value in down or period payment (locked in for example), and a selected value of the other parameter that is not feasible, then the only remaining parameter to adjust in may be term. The computing device may be searching for terms that may maintain the most recently selected parameter (the value which is beyond a pivot point) and may instead produce a new key value that may produce a valid deal and deliver the remaining outputs, in this case APR. While APR is treated as an output in this example, APR does not have to be an output and may be included as an additionally selectable value. The shift values may be important to insure that even if the customer is not moving through a parameter in any particular order and skips over the pivot point value, the customer computing device may still relocate to an existing object and find an approximately close deal. This may preserve the priority order the customer computing device must respect to keep valid relationships among parameters and may be an important tool in calculating approximately close deals without inconveniencing the customer.

In another embodiment, the customer computing device may determine alternative deals using the backing value. Backing values may exist for each parameter, but may only be significantly important for term, as term may have no pivot values. Since pivot points may serve to tell the system to move from the reverse lookup table to an existing table, and term may already be on both existing objects, there may be nothing to move too. When term becomes the last selected value, the customer computing device may attempt to hold that value constant while the customer works to select an additional input. This value may be the backing value for term and may be the term for which the other parameter, whether it is down payment or period payment, may be indexed against. If a customer finds a value for the other parameter that does not have a term within its maximum and minimum limitations that includes the backing value, the customer computing device may abandon the specified term and find a new one. Specifically, the maximum term length for the chosen parameter may be used. If the term is greater than the backing value, then the customer computing device may adjust the term value displayed on the gauge to the maximum term for that particularly selected parameter. Additionally, if the backing value may be below the minimum term length, then the maximum term length also may replace the backing value as the term given to the customer. This new maximum value may become the new backing value, unless the customer again cannot find that backing value, in which case it may be replaced with the maximum term. This value then becomes the backing value. Reversing this process may eventually return the customer to a term equaling the original backing value. Backing values also may serve as the point of return for when a customer violates a pivot point and wishes to go back. Therefore, backing values produce similar results to pivot points in that backing values may prevent the user interface from returning a "no result," when specifying term, but backing values interact with the data objects in a different way than pivot points.

One or more of the separate rules and procedures may be executed on a customer computing device to insure the proper operation of the user interface for a large set of inputs. These inputs may be included in the data objects transferred to the customer's device. In an embodiment, the web page documents sent from the seller server may include scripts that when executed may access the customer's local storage via the web browsing software. When making use of the interface on the portal, the customer may in fact be conducting a search for specific numbers within the data objects stored on his or her own computing device. However, this process may be displayed to the customer in such a way as to simulate the creation of new installment agreement requirements. Even though the actual generation of potential deals happened previously at the seller server, the customer may be viewing the process for the first time.

The initial information about the customer and the vehicle, including a credit check, may be used as inputs by the seller server to generate potential retail installment agreement parameters, characterized by a set of chosen inputs as discussed above. The seller server may activate and/or generate retail installment agreements for one or more, potentially selectable inputs for the given vehicle, such as all potentially selectable inputs, screening the results for deals that the service provider can feasibly support. The valid retail installment agreement results may be indexed to a set of data objects. These objects, which can be referred to as the Preloaded Deals, may then be transferred via a network connection to the customer's device for temporary storage. In an embodiment, the objects may include a portion of the valid retail installment agreement results, such as all the valid retail installment agreement results or less than all the valid retail installment agreement results. As part of rendering the financing page of the web portal, the customer's computing device may search the stored objects on the customer's device via the web browser in order to construct a user interface for retail installment agreement terms, such as a Financing Terms section of a website. The user interface may be used by the customer to customize or set preferred financing terms for a particular item or vehicle. The range and combination of outputs the interface may produce may be directly dependent on the data objects transferred to the customer's computing device, as well as a combination of additional features including locking and snapping features.

In an embodiment, the user interface created by the service provider may be designed to depict a standard vehicle instrument cluster, commonly referred to as a dashboard. A dashboard may be composed of a series of individual gauges, which typically mark outputs with dials that move across a perimeter scale. For the purposes of the service provider the appearance of a dashboard may be duplicated, however instead of miles per hour or revolutions per minute the dials may land on values representing financing parameters spaced out in increments matching those in the objects. In an embodiment, gauges that have dials may be adjustable by the interactive tool on the customer's network connected computing device, such as a computer's mouse or a touch sensitive display. In an embodiment, gauges without dials may represent parameters that may only be treated as outputs. In an embodiment, the values presented via the dials may be displayed numerically below the matching gauge.

In an aspect, a gauge may be presented for each financing parameters: down payment, period payment, term, and APR. The ranges of the gauges may be unique to the specific customer-item combination, while the increments across each gauge may be selected by the service provider. Each dial's range may be established by minimum and maximum restrictions which may be imposed on each parameter. The lowest value on the down payment dial may correspond to the minimum down payment for this customer and vehicle. The highest value on the down payment gauge may correspond to the maximum down payment amount, which may be found by subtracting the minimum amount financed from the Required Present Value. Both of these values may be vehicle specific. The default position of the down payment dial may be to rest at minimum down, which as discussed above, may be often Active Required Down. For period payment the lowest value may come from the minimum period payment amount, determined from the separate risk assessment program. The highest period payment value may correspond to the PTI Constrained Period Payment. The default setting for the period payment dial may be the period payment required at maximum term for the minimum down payment, which may not necessarily be the minimum or maximum period payment amount. The upper limit to term may be established by the vendor driven credit check and risk assessment program, while the minimum term length may be dictated by various other constraints. The default position for term may be at maximum term. Therefore down may start at its minimum, term may start at its maximum, and period payment may be displayed at the required amount given the first two constraints. APR may be calculated from the other three values. Therefore none of these values may be changed without affecting at least one of the others. These limitations may exist because of the way in which the data objects may be built as discussed above.

In an embodiment, the entire lookup system described above may require specifying at least one value for a financing parameter before searching for another parameter. The interface may be built to account for this requirement, and therefore may provide a way for a customer to hold one dial constant while moving another dial across a separate gauge. This feature of the website may be known as locking and it may be implemented in two separate ways. Soft locking may be an intuitive system where the website tracks and remembers customers' actions so that the last moved dial by the customer becomes the locked dial and does not move when another dial is moved next. Hard locking may be where the customer specifically selects a gauge to be locked at a certain value for as long as the customer keeps it locked, regardless of the actions performed on the other gauges. Hard locking may also ensure the locked dial may not ever move, forcing another dial to compensate as much as possible, whereas soft locking may permit the dial to snap to another value when the limits of a feasible deal may be reached.

In an embodiment, soft-locking may be used to track the most recently manipulated or "clicked" dial on the user interface and store the value the dial landed on. When a customer adjusts a dial on a gauge to select a certain value, the customer may be indicating an interest in having that financing parameter on his or her installment agreement. In order to respect that interest, when a customer starts to adjust another dial, the customer's computing device may automatically lock that value in, keeping the previous dial stationary. Meanwhile all of the remaining dials may move to produce the corresponding outputs for the locked value and the currently specified value. Therefore, the customer has control over two of the financing parameters at any one time. Soft locking may also be dynamic, such that when the customer makes a new input and then moves onto another gauge, the soft lock may shift to immobilize the newly made input. With the exception of an active hard lock, the soft lock feature may always be active, and always reacting to customer action. The reasoning for this is directly related to the method by which the data objects are referenced by the user interface, which may make soft locking a necessity. The "soft" portion of the locking function originates from the fact that if a retail installment agreement does not exist on the objects for the given inputs, then the soft locked value may be allowed to move to the next closest value where a possible deal does exist. That way if a customer unknowingly specifies a pair of inputs that do not produce a valid retail installment agreement, then the customer computing device may still present the user with a potential deal at parameters that are as close as possible to what was originally specified. Limitations may be denoted by pivot points such that for any locked value, the pivot point on the currently active dial may serve as the practical limit of the soft lock. Another effect of using pivot points may be that when the locked value must move, another gauge may tend to lock in place. This may be because pivot points indicate to change object sources, which may be required in this situation. When the lookup object source changes, one parameter may still be fixed.

Unlike soft locking which may be an automated element of the interface, hard locking may be an action that may be only undertaken by the explicit consent of the customer. In an embodiment, black padlock icons may be displayed below each gauge that has a dial. These padlocks may be the user interface symbol for the hard lock feature. If a customer wishes to determine financing with one parameter firmly fixed at a specific value, he or she may click the padlock icon, which may close the icon's clasp. That gauge may now be hard locked. As the customer manipulates the other dials, if the combination of inputs with the locked value does not find a feasible retail installment agreement, the user interface may simply prevent the customer from dragging the dials to that particular value. The dials may simply stop at the threshold of a possible deal with the service provider. Due to this constraint pivot points may not be needed for hard locking. A data object may be selected or created with the user interface and the customer's computing device may not need to switch to another table since that locked value cannot change. The limits to the object (temporary or not) may define the borders of feasibility under hard lock. When there is no active hard lock, soft locking may be automatically employed.

In an embodiment, for any locking procedure, the secured value must conform to a format usable to perform searches in the objects. Snapping may be the procedure conforming the secured value to the usable format. As discussed above, increments with minimum and maximum limitations may be used. While the actual value of the increments may be easily changed before the process starts, the required pre-calculations may demand that any value that may be referenced in an object correspond to a value that would be included by the interval. To insure a customer selected value on the dial may match with the interval in the object, the value may be snapped. Snapping may involve taking the display value on the dial and dividing it by the increment of the dial. This may also be known as the step value. The quotient of this operation may be rounded to the nearest whole number. Finally, the rounded value may be multiplied again by the step value. Thus, the number may be returned to near its original value, except now it may correspond to the increment. For any snap, the system may use the snapped value to find the corresponding output to display. An illustrative example would be if the down payment was locked at $11,129.00 with intervals set at $100 increments. Therefore, down payments as an input may only be listed in whole hundred dollar increments. To snap the value so it is readable, $11,129 may be divided by $100 to arrive at 111.29. That number rounded to the nearest whole value may be 111.00. Multiplied by $100 again yields $11,100. This is only $29 less than the locked value, which may not have a significant impact on determining APR or period payments but does fit with the existing increments. Because locking may be dynamic, any output may later serve as an input. Thus, despite what the display indicates, when a number which does not fit into the pre-set increments may be used, it may be snapped behind the scenes to find the value to use to locate a set of outputs. Any difference in the actual payment scheme due to snapping an input may be made up for in the final period payment by comparing the amount paid so far to the Required Present Value of the retail installment agreement. Snapping would become less necessary if increments were set at smaller amounts such as single dollars. However, that may produce very extensive objects to transfer and store for the customer, slowing down the entire process. The only financing parameter with firmly set increments may be term, which may be defined by single periods. The amount of time a period represents may vary (such as one week or one month) but a term may not change by fractions of a period.

The custom Financing Terms feature may permit the customer to dictate the parameters of his or her own vehicle purchase plan to a great degree. In an embodiment, any service provider financing parameter may represent an input or an output in the various embodiments. The dashboard interface may be such an apt design because of the flexibility in parameters because the gauges may function as input or output displays without having to make an artistic or visual change. A dial reading may be an input if the customer moves the dial to that value, whereas the gauge may function as an output if the dial moves on its own. In order to allow a customer to set his or her own values for things such as down payment, period payment, term, and/or APR without requiring the customer to spend an inordinate amount of time entering in personal preferences and sending and resending them over and over to the service provider to review, calculate/re-calculate, and produce additional outputs, a portion of the valid retail installment agreements for a customer-vehicle combination, such as all the valid retail installment agreements or less than all the valid retail installment agreements, may be pre-calculated and pushed to that customer's computing device. To do that in a convenient and secure manner, the service provider may not send the actual algorithms to conduct the calculations, rather merely the results of the calculations. The process may be automatically and repeatedly executed for a range of inputs. This may allow the creation of objects containing preloaded (and pre-approved, i.e., "valid") retail installment agreement contracts. These objects may then be sent to the customer. By having objects of reference available on the customer's side of the operation, as well as the tools to utilize them stored on the website, the user interface may operate with minimal delay to the customer. An additional, yet extremely important, result of pre-calculating valid retail installment agreements may be that a customer may never have to suffer the loan approval process and the long wait often associated with it. Any deal (i.e., valid retail installment agreement) the customer may find (or generate) may already be acceptable to the service provider, eliminating any redundancies common in the financing approval process. The concepts of soft locking and hard locking may serve this important role as well. They also allow the customer to increase his or her control on creating a financing plan for a product or vehicle. Navigating the data objects requires those features and those features may let the customer select any two of the possible input parameters at a time. By using this two step filtering process as well as allowing each approved parameter to serve the dual role as an input and an output, a customer may be able to find acceptable financing terms for vehicles or similar products in less time.

The primary goal of the service provider may be to remove the hassles of traditional automotive purchasing while providing a product of equal or improved quality. A large part of that greater mission may be made possible by new levels of transparency and choice inherent in various embodiments. The various embodiments may permit the customer to elect into a retail installment agreement where the terms of the deal are open to adjustment by the customer. This concept of customer choice may be present at all levels, from the initial calculations designed to incorporate different types of inputs to the creation of an intellectually clear and visually distinct user interface. The options made available to the customer by the data objects that may be organized in such a way that requests for information are performed quickly and accurately, while insuring any deal the customer selects may be already pre-approved by the service provider for service. Assuming the customer has provided trustworthy personal information, there may be no need to haggle over particulars. Furthermore the online interface may remove the need to operate through individual sales personnel. The customer may be able to find the parameters which most appeal to them within the range of potential agreements that are guaranteed to be acceptable by the service provider. This may insure that customers may purchase a vehicle under conditions that meet with their approval in a purely online purchase process, while avoiding the hassles of the traditional dealership.

FIG. 1 illustrates a network system 100 suitable for use with the various embodiments. For ease of discussion, many of the embodiments are discussed in relation to motor vehicles. However, the embodiments discussed herein may be applied to any of a variety of items. The network system 100 may include multiple devices, such as a one or more buyer computing device 102, and one or more seller server 106 connected to a network, such as the Internet 112. As an example, the buyer computing device 102 may be a laptop, tablet, desktop, smartphone, etc., operated by a buyer intending to shop for and/or purchase a vehicle. The buyer computing device 102 may include a network interface enabling the buyer computing device 102 to establish a network connection 103, such as a wired or wireless connection via a router and/or base station, to a network, such as the Internet 112.

The seller server 106 may be part of a financial and inventory management system which may include a database 110 of seller information (e.g., seller records), inventory information, (e.g., seller inventory records), and/or financial information (e.g., financing records), and the seller server 106 may manage/update the information within the database 110 and/or make the information from the database 110 available to other devices as well as perform operations using the information within the database 110 and provided from other devices. As an example, the seller server 106 may host a web portal accessible as a series of web pages enabling access to the database 110 and providing results of operations performed by the seller server 106. As a specific example, the seller server 106 may host a series of web pages enabling a buyer computing device 102 to render a portal enabling a user of the buyer computing device 102 to browse items for sale, select terms for purchase of items for sale, and complete a contract to purchase one or more selected item. The seller server 106 may additionally pre-calculate terms for purchase of items for sale and generate objects, such as tables, including those terms which may be sent to the buyer computing device 102. The seller server 106 may include a network interface enabling the seller server 106 to establish a network connection 101, such as a wired or wireless connection via a router and/or base station, to a network, such as the Internet 112. Via their respective network interfaces, respective network connections 101 and 103 to the network, such as the Internet 112, the buyer computing device 102 and the seller server 106 may exchange data with each other.

Figure 2:
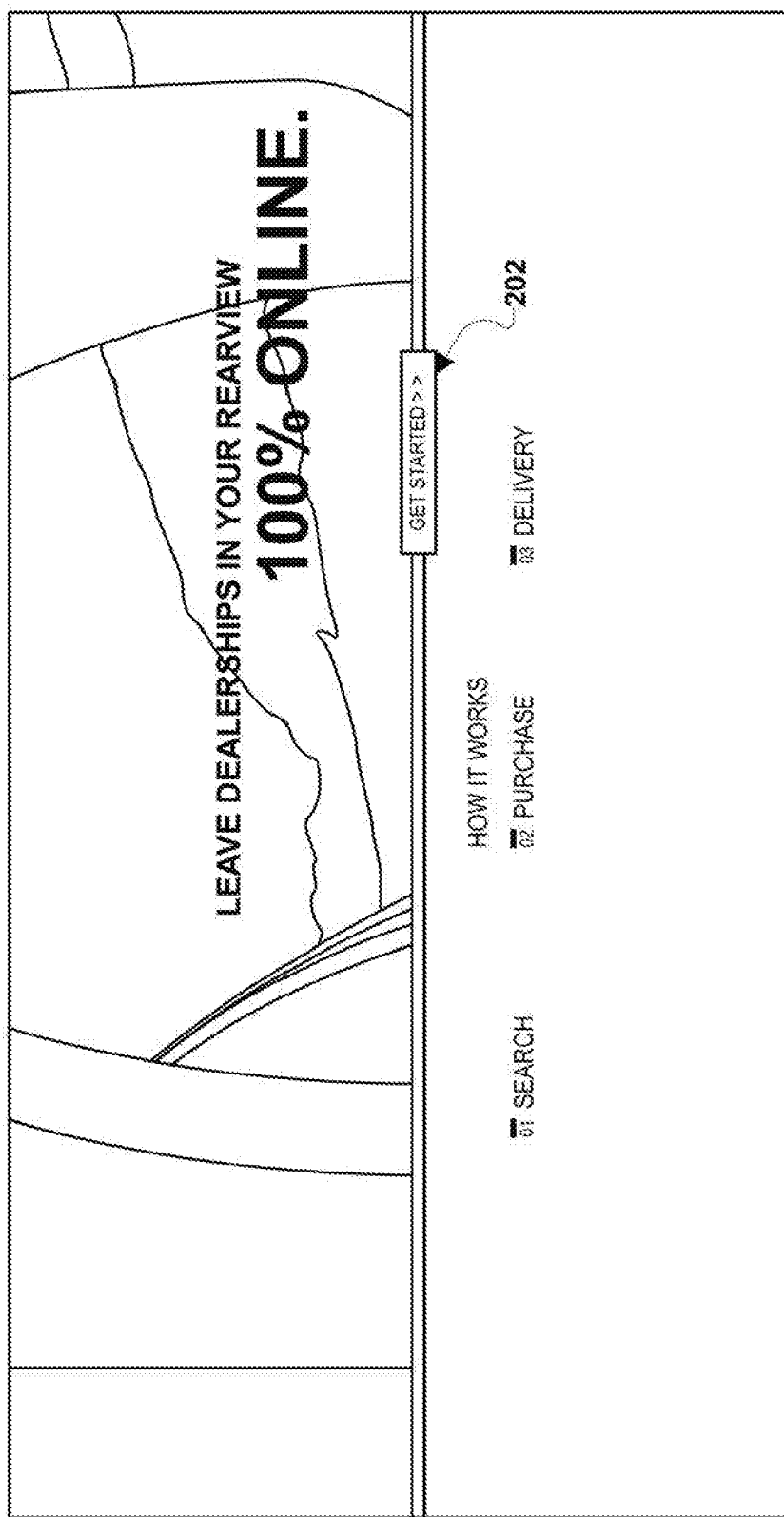
FIG. 2 illustrates an exemplary home page of a web portal according to an embodiment.

FIG. 2 illustrates an exemplary home page of a web portal according to an embodiment. In an aspect, the homepage may convey basic information relating to one or more item purchase services available via the web portal. As an example, one or more home pages may comprise principle marketing messages, as well as some basic facts related to the item purchase service. As a further example, the customer (or buyer) may be informed that there may be three steps to the item purchasing process, i.e., search, purchase, and delivery.

In an aspect, the customer may click on a "Get Started" button 202 or a smaller log-in button. The "Get Started" button 202 may direct the customer to the shopping page to select a vehicle for purchase, without submitting personal information. The log-in button may take the customer to a log-in page where the customer may sign into his or her personal account or create a new personal account. When finished with the homepage, the customer may be able to view the online inventory.

In an aspect, the create/log-in page may enable a customer to create or return to a specific account. As an example, having an account may be necessary for most processes in the web portal, most importantly the purchase of a vehicle, but also to track customer activity and to maintain features, such as the garage discussed further below. In another aspect, on the log-in page, the customer may access an established account with a user name and password or advance to another page to create a new account. The log-in page may also include links to social media, such as Facebook® and Google®, such that a customer may connect to the web portal with those services if he or she so wishes. In a further aspect, when the customer is done using this page, he or she may either have been taken to the Create a New Account page or to the unlocked shopping page. A customer may alternatively exit the log-in page via any of the consistent web page links.

Figure 3:
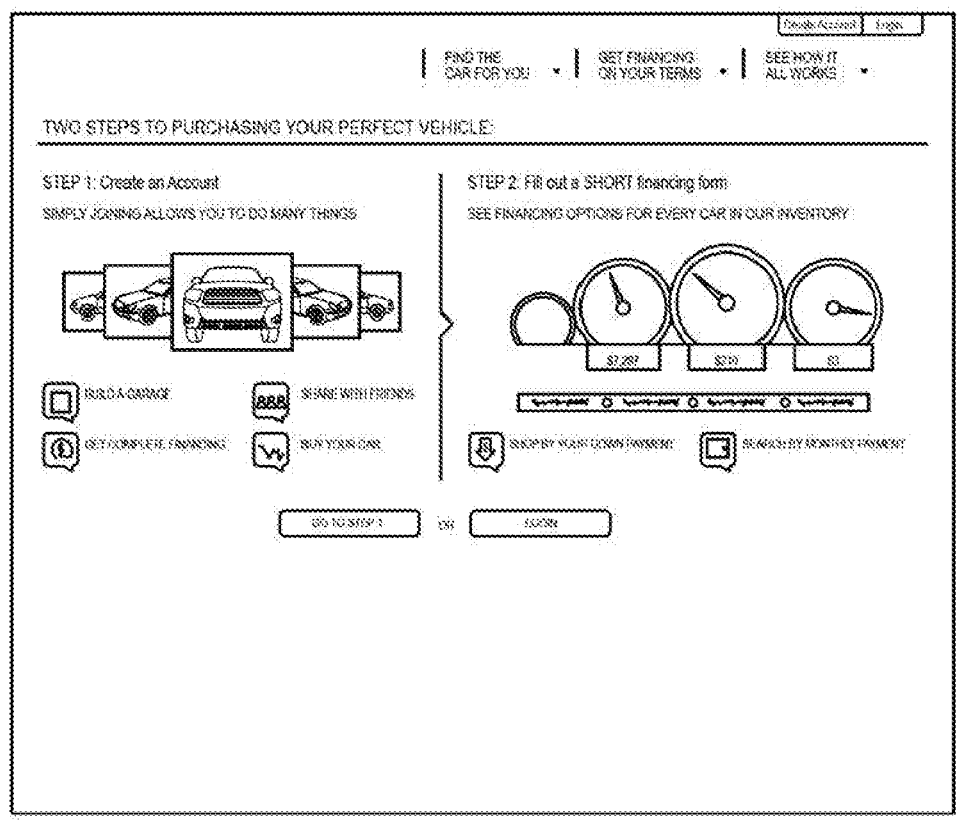
FIG. 3 illustrates a process page such as a "two easy steps page."

FIG. 3 illustrates a process page such as a "two easy steps page." In an aspect, a process page may provide an outline to a customer of the two step process by which the web portal obtains the necessary information to construct a retail installment agreement. Such a process page may be accessed by clicking on the "Get Financing On Your Terms" tab when no account has been created/logged into. As an example, the customer may be presented with information and icons explaining the two step account creation process. After reviewing that information, the customer may be able either to travel to step one of the account creation process (i.e., "Create an Account") or to enter his or her log in information. The page may provide a better understanding of the set up process for preparing financing terms, and after viewing the page the customer may already be on his or her way to creating a new account or returning to an existing account to do more shopping.

Figure 4:
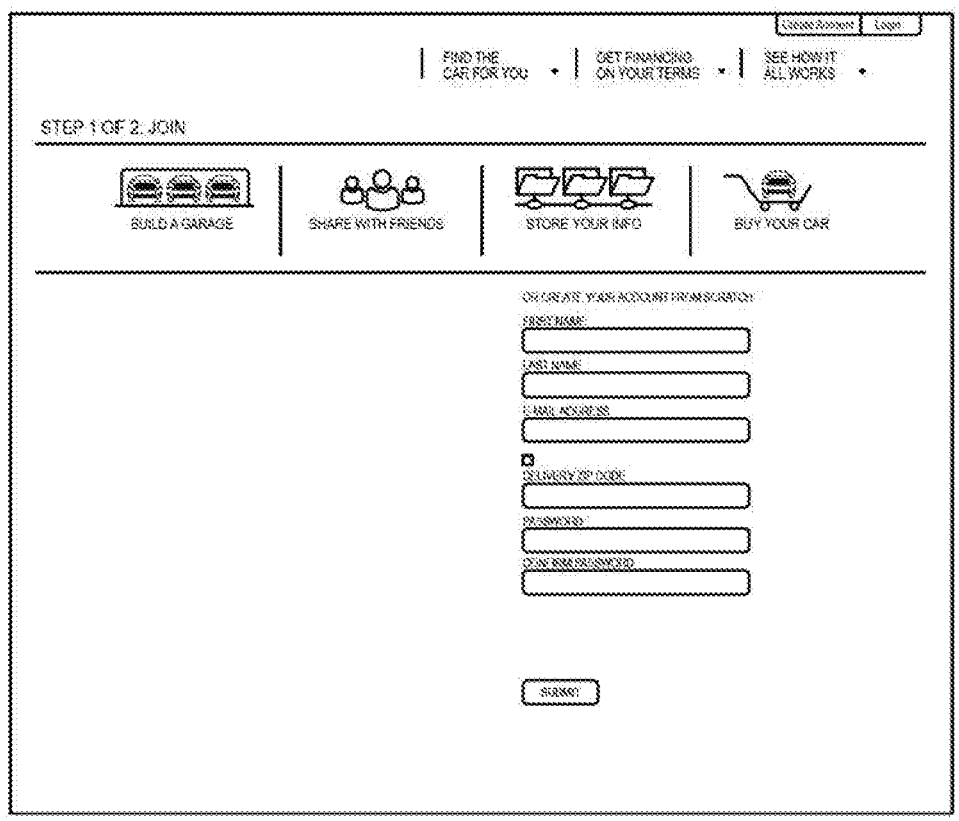
FIG. 4 illustrates a screen shot of a first account creation page.

FIG. 4 illustrates a screen shot of a first account creation page. In an aspect, the first account creation page may be used to collect the necessary information to create a user account for a potential customer. Subsequently, customer credit information may be collected to provide pricing and financing terms, as well as to track user activity and store preferences, such as the vehicles stored in the garage discussed below. The customer may be able to enter his or her first and last name, preferred email address, delivery zip code, password, and a confirmation of his or her password. The customer may also click to certify he or she is 18 years or older and click to not receive email news.

Figure 5:
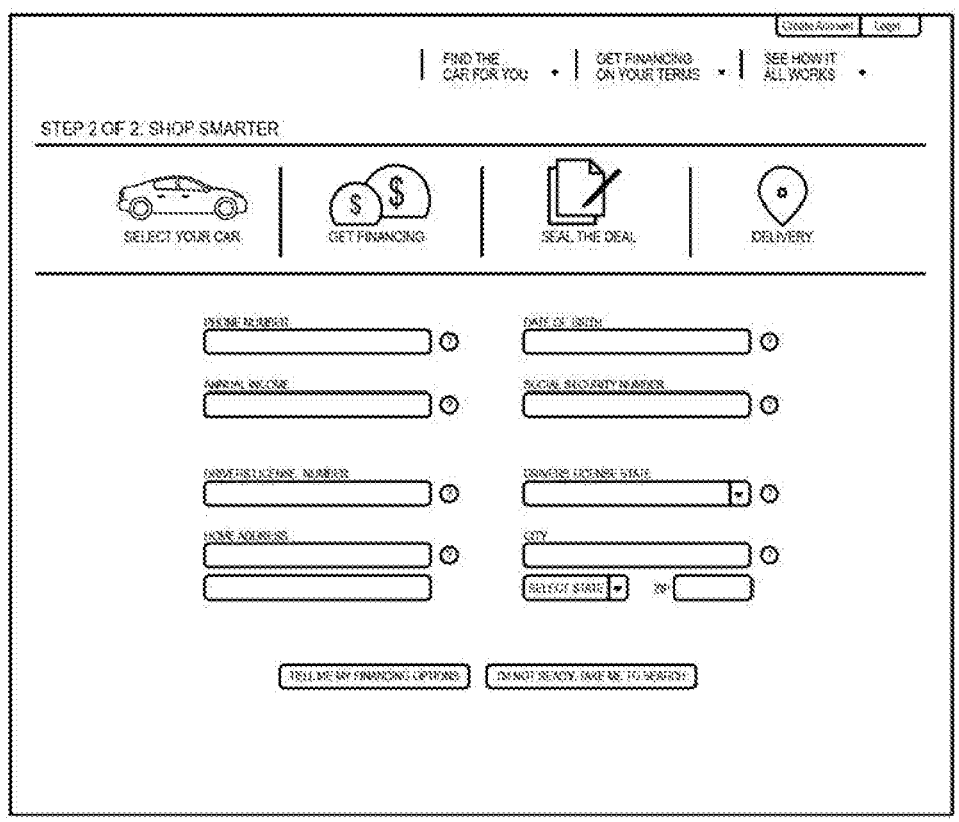
FIG. 5 illustrates is a screen shot of a second account creation page.

FIG. 5 illustrates is a screen shot of a second account creation page. In an aspect, the second account creation page can be used to collect additional customer information to enable the seller to pull the individual's credit in order to construct pricing and financing terms for the available inventory. Checking the individual's credit may not be a mandatory part of creating an account and may be skipped over and returned to later. However, checking a buyer's credit may be necessary in order to purchase a vehicle. This page may also determine whether the customer is in the serviceable area of web portal for purchase and delivery.

In an aspect, the customer may submit various information, such as his or her telephone number, date of birth, annual income, social security number, driver's license number, the state that issued the driver's license, and/or complete home address. Additionally the customer may authorize the seller to use the provided information to obtain a credit report from various vendors. In order to advance to other portions of the website, the customer may certify that all provided information is correct, confirm that he or she has read and agreed to a "Consent for Electronic Transactions and Communications" agreement, and confirm that the customer has read and agreed to the seller's financial privacy policy. This page may also reconfirm the legal age of the customer. At this point, the seller server may pull credit information from various vendors, compile data for the customer (e.g., gathered credit data, customer provided data, and/or other data available to the seller) and calculate a proprietary risk score for the customer.

In an embodiment, once the risk score is calculated, seller server may iterate through a selected portion of the vehicles in inventory (e.g., one vehicle, more than one vehicle, all vehicles, etc.) and calculates the APR for the customer at the maximum payment allowed for all selected vehicles. In an embodiment, using the calculated APR, maximum payment, and maximum term, a minimum down payment may be calculated for each selected vehicle. When the customer returns to the shopping page there may be a possible retail installment contract loaded for each selected vehicle from inventory. That installment contract may be the lowest possible down payment the customer can choose for that vehicle. The seller server may also confirm that the buyer (or customer) lives within the company's operational area.

An information page such as a "how it works page" may be displayed. The purpose of this page may be to inform the customer, through text and graphics, the basic processes vehicles available from the seller go through, including inspection, photographing, and online purchase. The customer may read all information presented if he or she so wishes. The customer may use the web portal wide navigation buttons to go to the shopping page, create account page, or to log out of the web portal.

In an aspect, the account page may present the customer with every available option for searching for and purchasing a vehicle. The account page may also serve to inform the customer of the features of the web portal and indicate the garage feature. The customer may interact with the account page to learn more about several web portal features, including the dynamic search function, delivery to driveway, personalized financing options, the garage feature, and what "Buy 100% Online" means. These may be indicated in informational tabs and/or links to the actual services themselves. In an embodiment, all tabs contain links to start shopping, however. The customer may also expand a small window to review the personal information associated with his or her account, including name, email, delivery zip code, any connections to Facebook® or Google® accounts, and a get financing tab which may lead back to the create account page.

Figure 6:
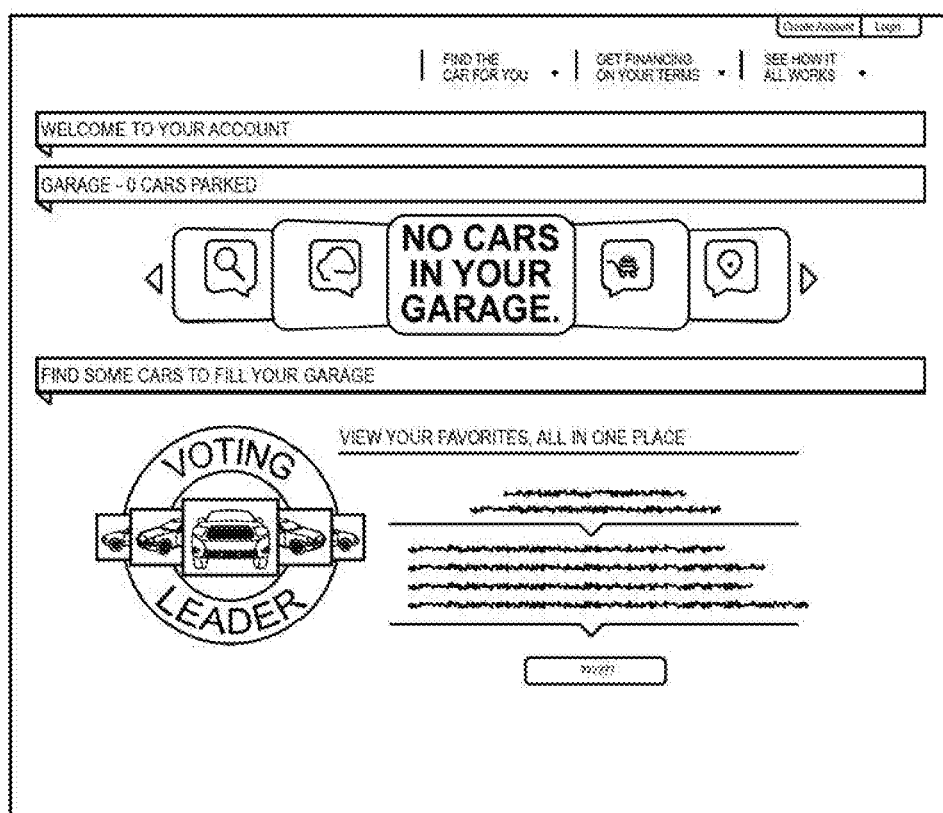
FIG. 6 is a screen shot of exemplary garage page.

FIG. 6 is a screen shot of exemplary garage page. Once a customer has begun to populate his or her garage, that feature may replace the previous interactive features on the account page. When viewing a vehicle, a customer is given the option of adding it to his or her garage. Once added, the vehicle's image and basic facts may be placed in the garage. If more than one vehicle is in a garage, the vehicles may be ordered in a menu that the customer may scroll through, such as a horizontal menu. The viewing angle on the vehicle may change depending on its location on the list and may be taken from a composite image spinner system. In an embodiment, whichever vehicle may be currently up front on the garage may have its full details and financing dials displayed below it. The garage page may also list how many times the specific vehicle has been viewed and how many other customers have also added the vehicle to their garages. The customer may click on the image of a vehicle in the garage to either buy it or remove it. In this manner, the garage may serve as a storage location for the customer's favorite vehicles and may allow quick access to the customer's informational pages as well as vehicle to vehicle comparisons.

The garage may also drive many of the social networking features of the web portal. For example, if a customer has his or her Facebook® account linked to his or her account, the customer may post to Facebook®, or send via email a link to his or her public garage (which the customer may be able to view as well). This page is very similar to the customer's garage except that financing terms may be hidden. People customers have invited to view their public garage may then vote on which vehicle the invited people like best. By this method a customer may gauge the popularity of a potential purchase among his or her social network peers.

After viewing the garage page, the customer may have a basic understanding of some of the web portal's defining features and some of the capabilities of the web portal. The customer may begin shopping or return to creating an account to obtain financing options. The customer may also review previously looked at and garaged vehicles for comparison to other products and may be able to determine a popularity of selected vehicles, both from within the website and from contacts in social networks.

Figure 7:
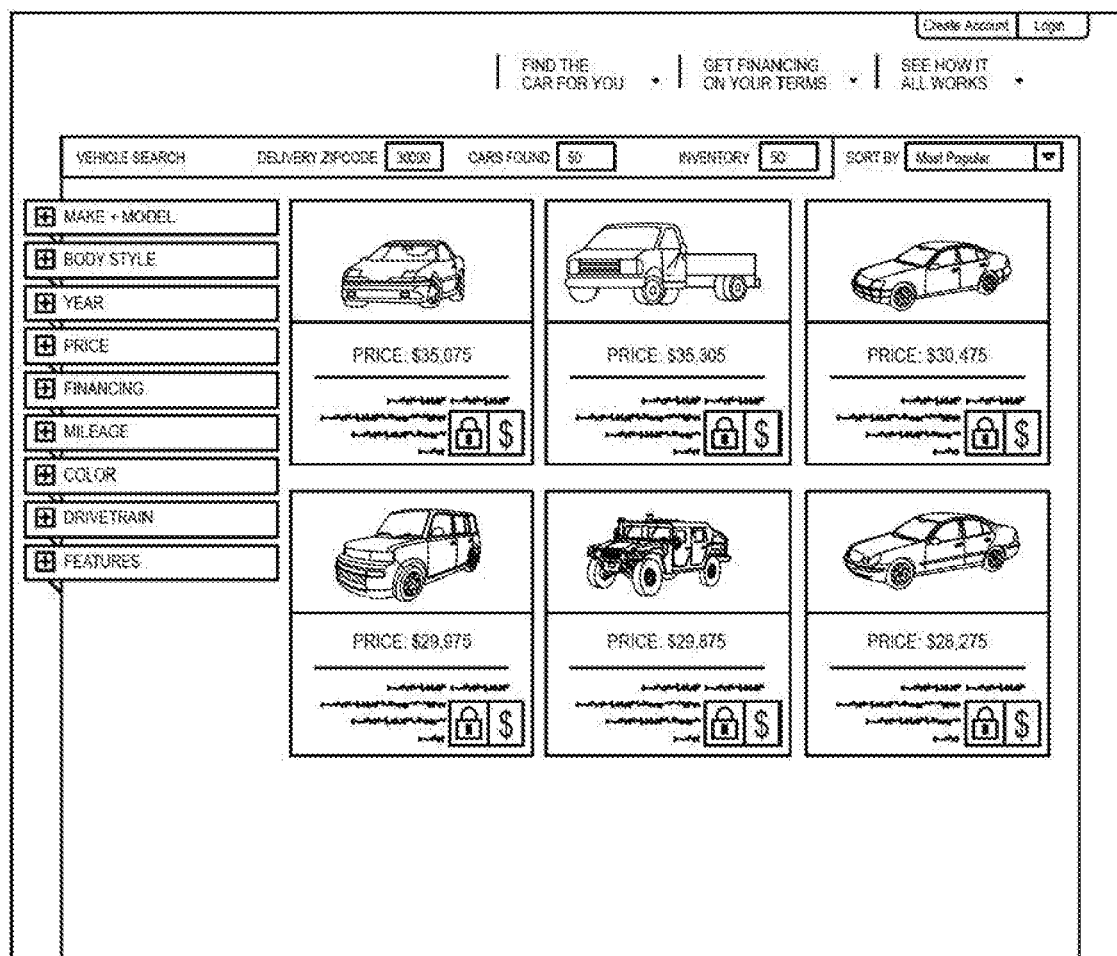
FIG. 7 is a screen shot of an exemplary shopping page shown locked.

FIG. 7 is a screen shot of an exemplary shopping page shown locked. In an aspect, the shopping page may enable a customer to find his or her preferred vehicle for purchase.

In an embodiment, the entire inventory within the provided delivery zip code may be displayed on the shopping page, with an image of each vehicle and some basic information such as mileage and financing terms (if a credit report has been done for the customer and financing terms generated). A locked view may be a shopping page in which an inventory search without pulling credit data may be displayed, for example with blue padlock icons where financing options would be displayed. An unlocked view may be a shopping page in which an inventory search with pulled credit data may be displayed, for example with financing options displayed for each vehicle. Several tools may be provided to aid the customer in narrowing the selection of vehicles displayed. In another aspect, the customer may able to see the entire inventory within his or her delivery area, found by the zip code if previously provided or entered at the top of the shopping page. In an embodiment, there may be a range of search criteria or filters on a side, such as the left side, of the shopping page. The customer may use those expanding tabs to narrow the inventory list by make/model, body style, year, price, financing, mileage, color, drive train, and additional features.

Figure 8:
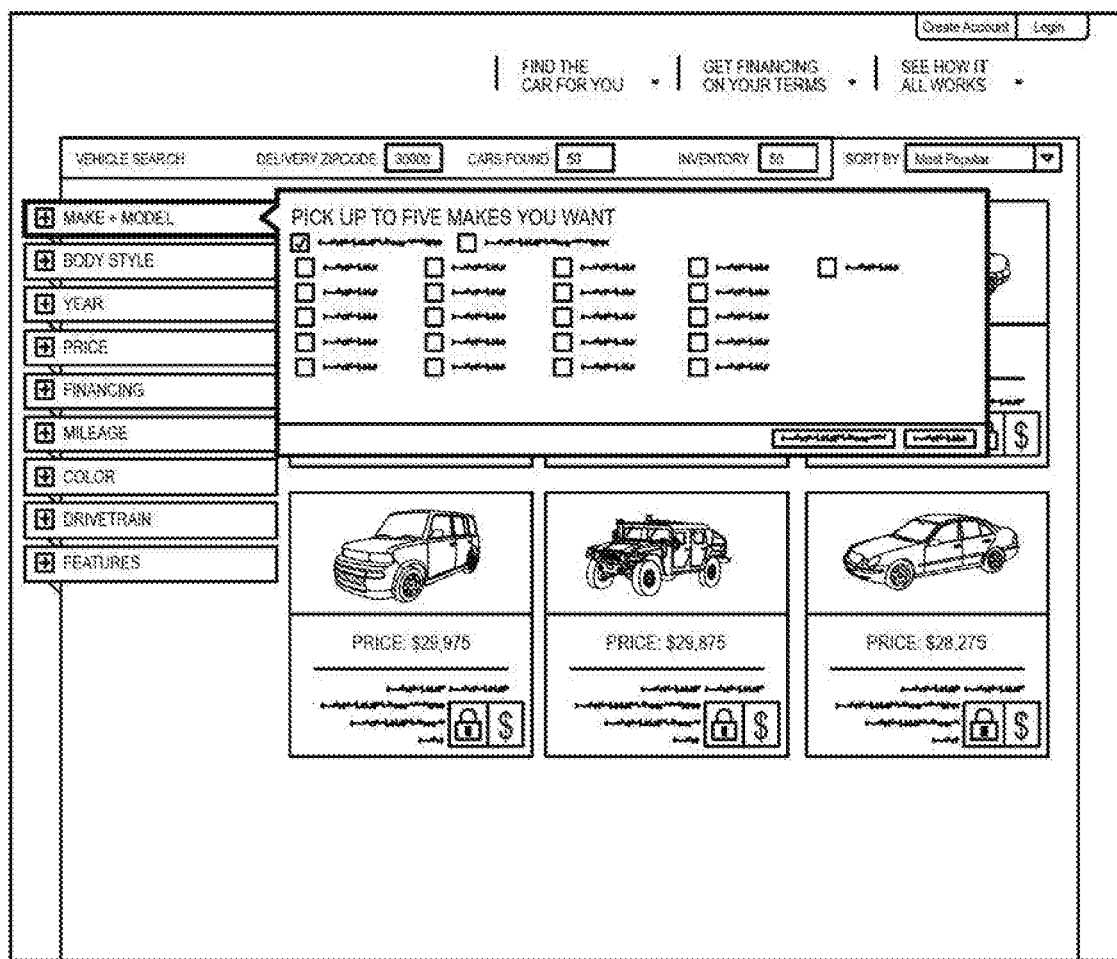
FIGS. 8-16 illustrate example screen shots of embodiment filter pages.

As an example, when a customer selects the make and model filter, the customer may be displayed a list of vehicle manufacturers, such as Ford or BMW, and the count of vehicles in the inventory that are made by each manufacturer, as illustrated in FIG. 8. The customer may narrow the field by choosing one or more automotive makes. Those vehicles that are made by the selected manufacturers may be displayed in the search results area.

Figure 9:
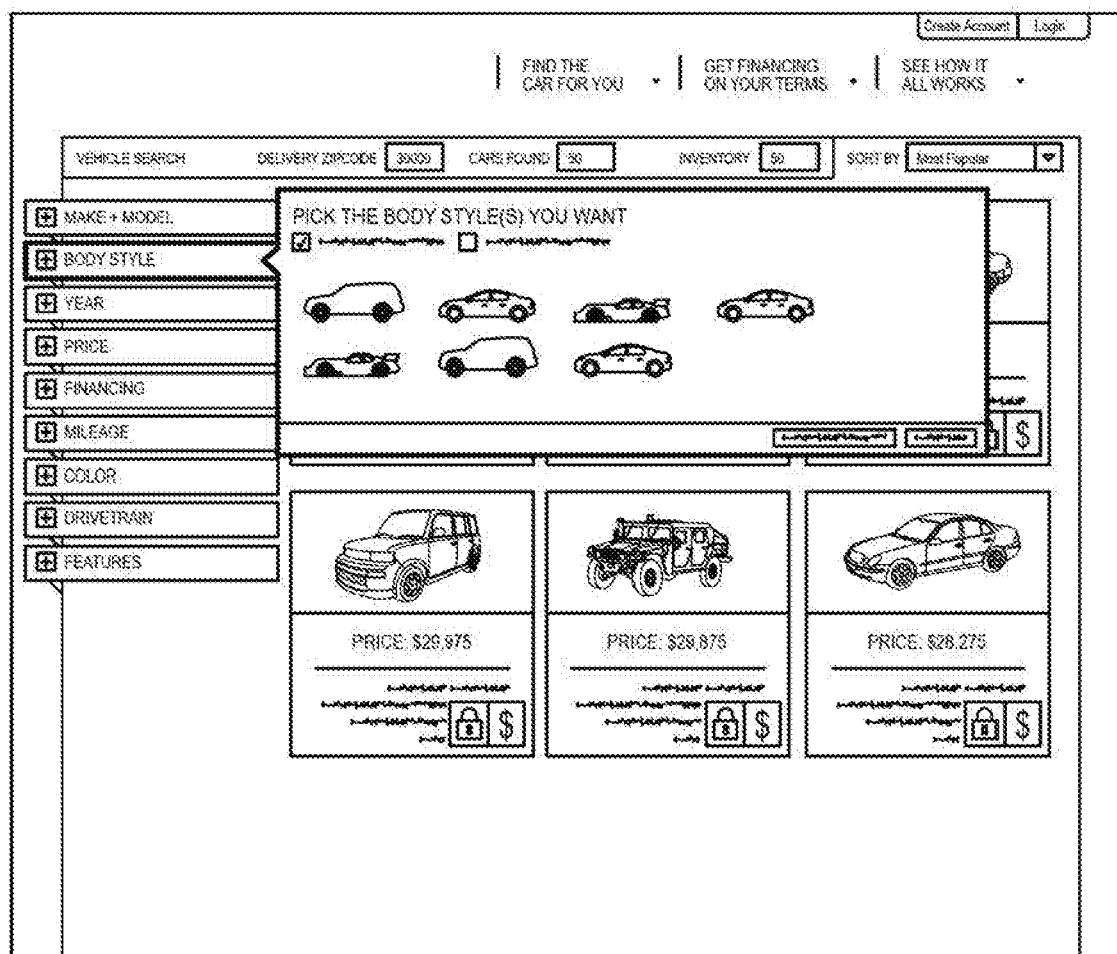

When the customer selects the body style filter, the customer may narrow the search results to one or more body types from a list of possible choices, as illustrated in FIG. 9. The types may include wagon, sedan, SUV, mini-van, coupe, hatchback, truck, and convertible.

Figure 10:
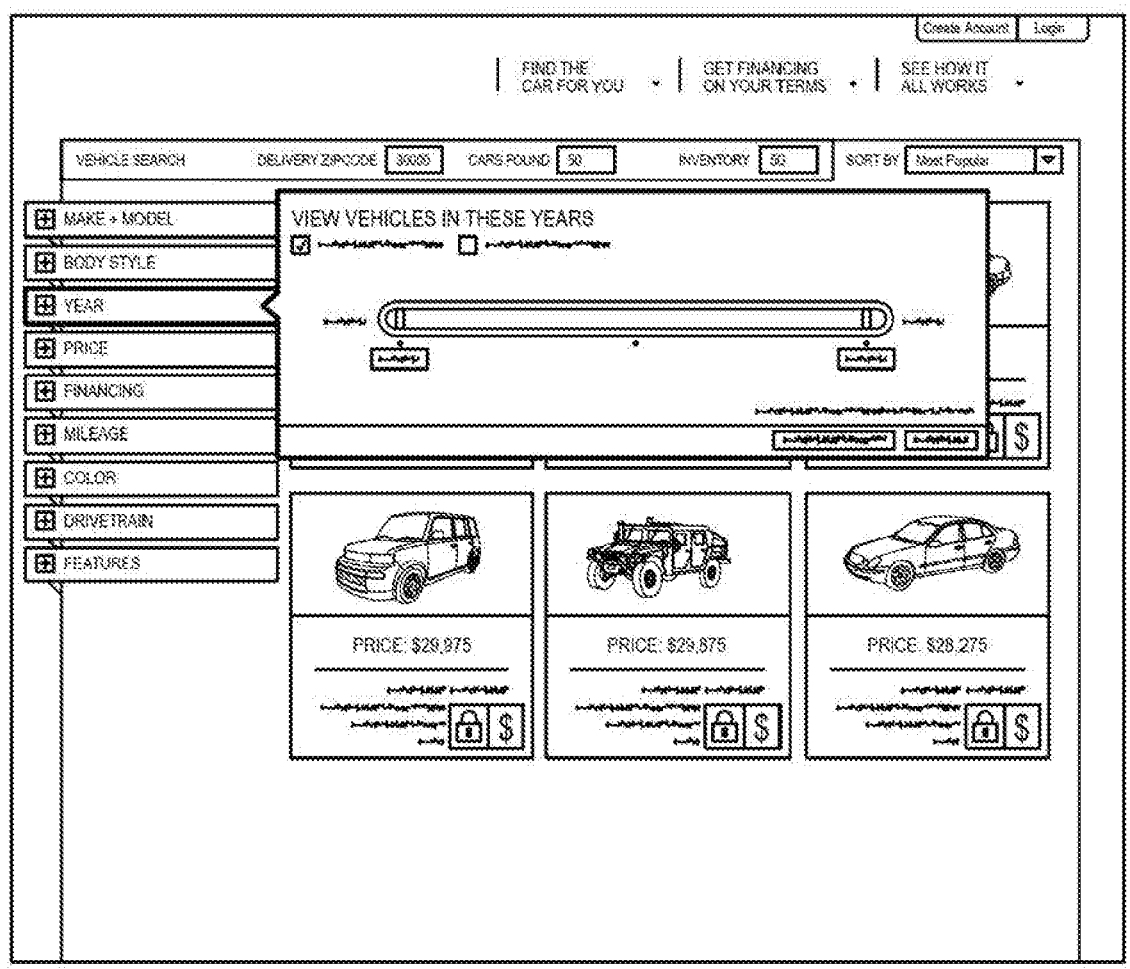
Figure 11:
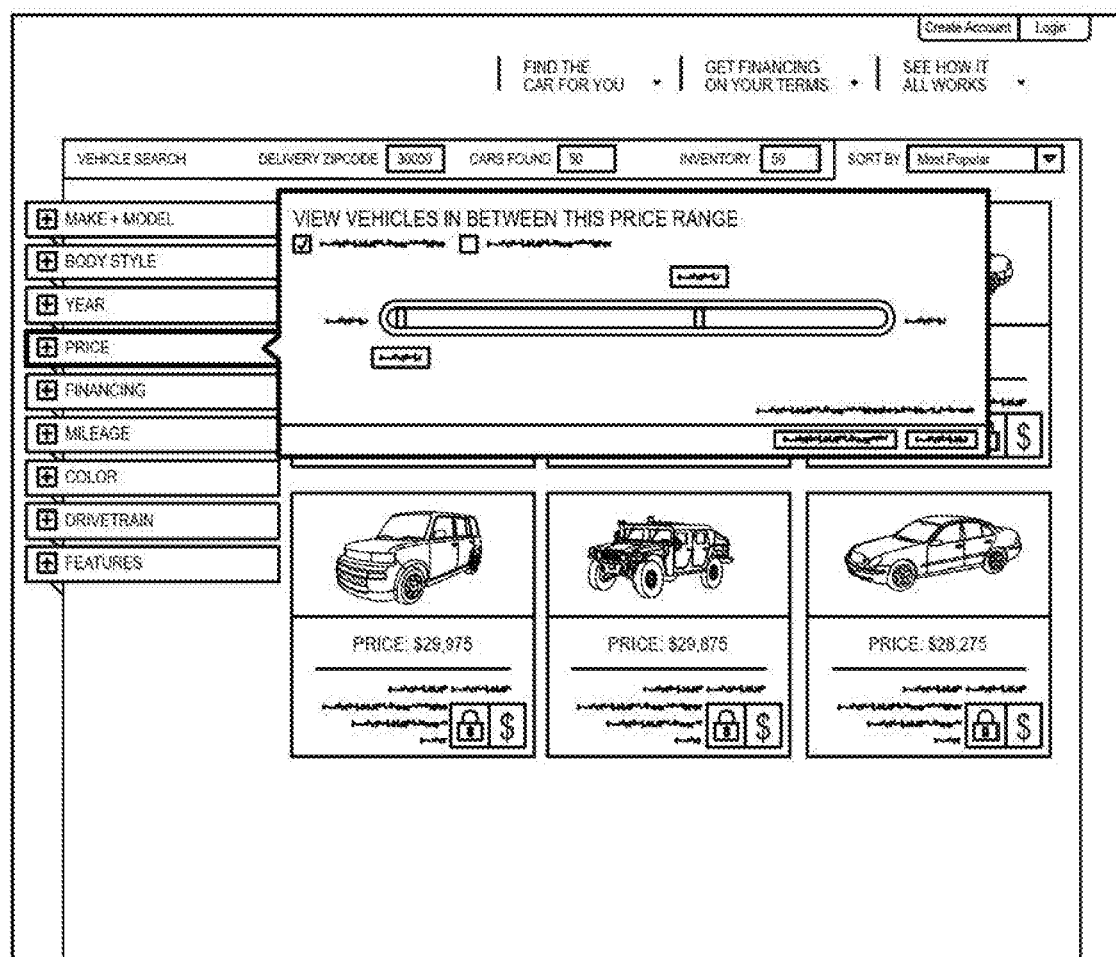

When a customer selects the year filter, he or she may dictate the range of manufacturing years which are on display, as illustrated in FIG. 10. This may include anywhere from the oldest vehicle in inventory to the most recent model year. For any given range, the count of available vehicles in that rage may be displayed. A price filter may looks and function similar to the year filter, except displaying in units of dollars, as illustrated in FIG. 11.

Figure 12:
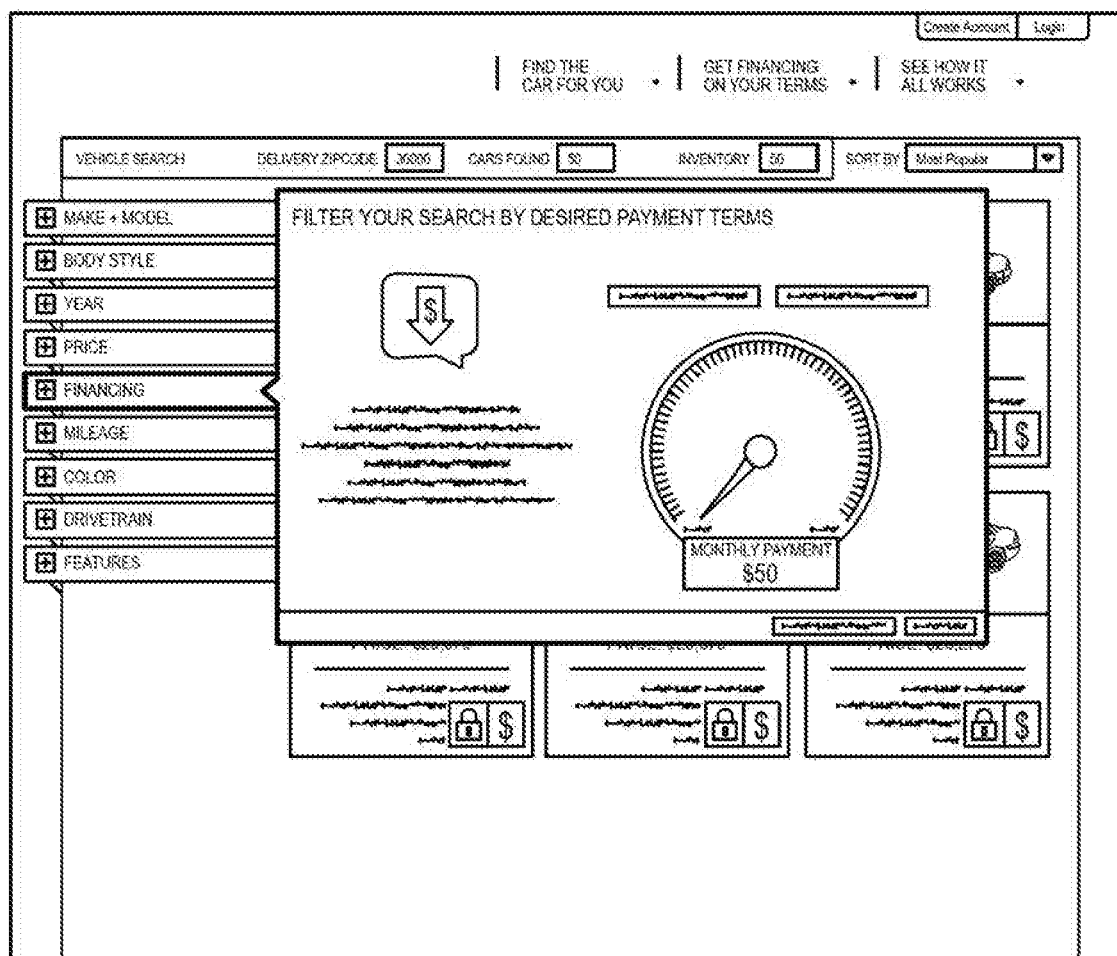
Figure 13:
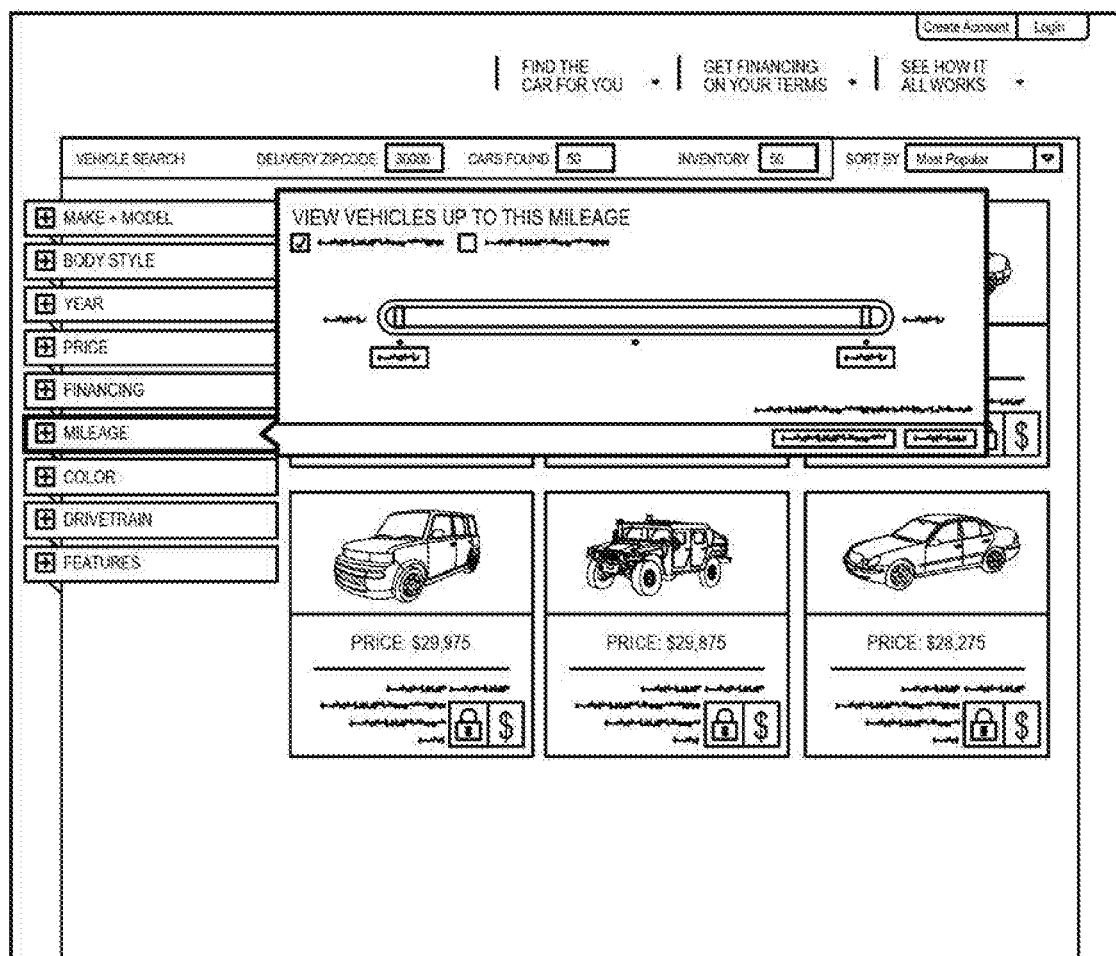
Figure 14:
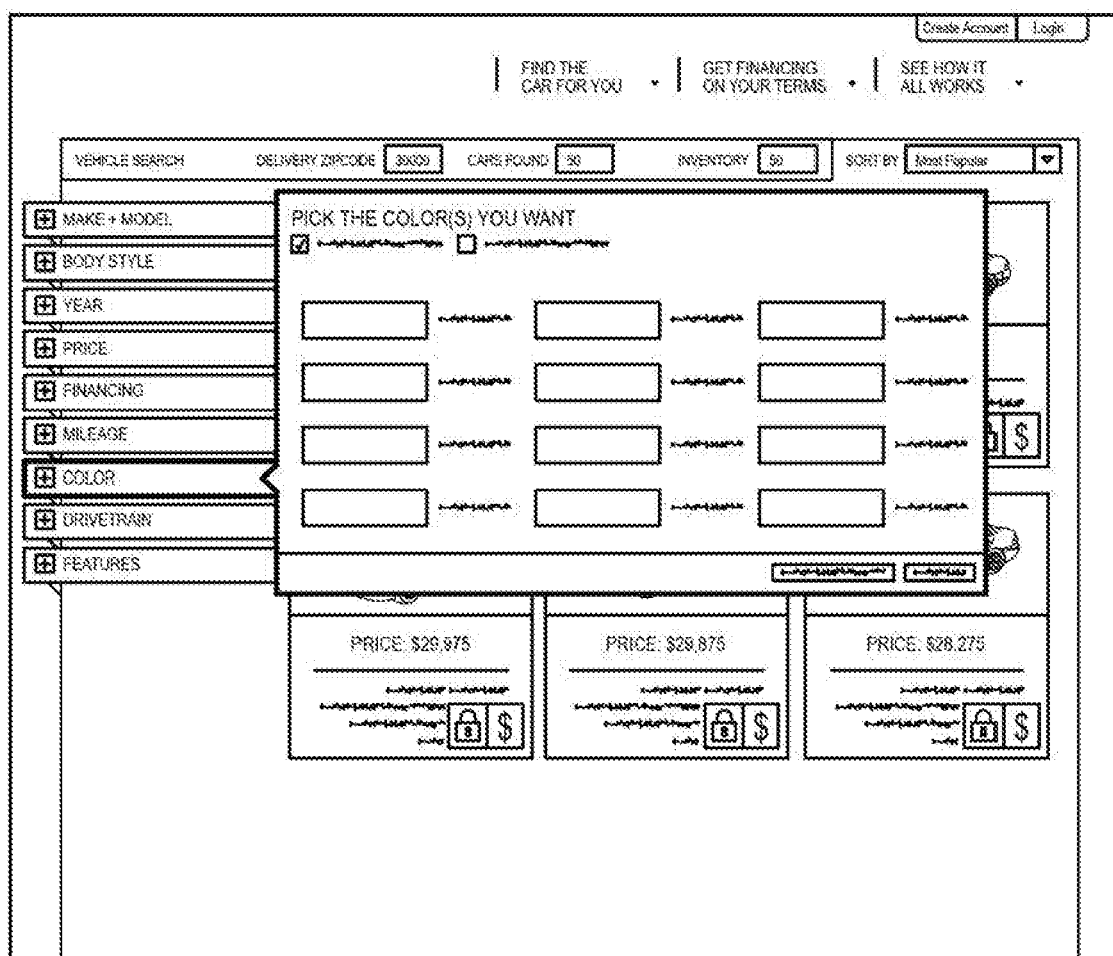

When a customer selects the financing filter, the customer may be presented an option between Monthly Payment and Down Payment, as illustrated in FIG. 12. If the customer chooses to select a monthly payment, the search results may update and show financing for each vehicle calculated at that specific monthly payment. Similarly, should the customer select a down payment, the search page may update with all financing updated at that down payment. In an embodiment, selection of a down payment may cause some vehicles to no longer appear on the page due to selecting a down payment less than the minimum down payment for that vehicle. The mileage filter illustrated in FIG. 13 may function similar to the price and year filters described above. When a customer selects the color filter, he or she may be displayed a range of colors represented by rectangles, with the number of vehicles in the inventory that fit into each category displayed, as illustrated in FIG. 14.

Figure 15:
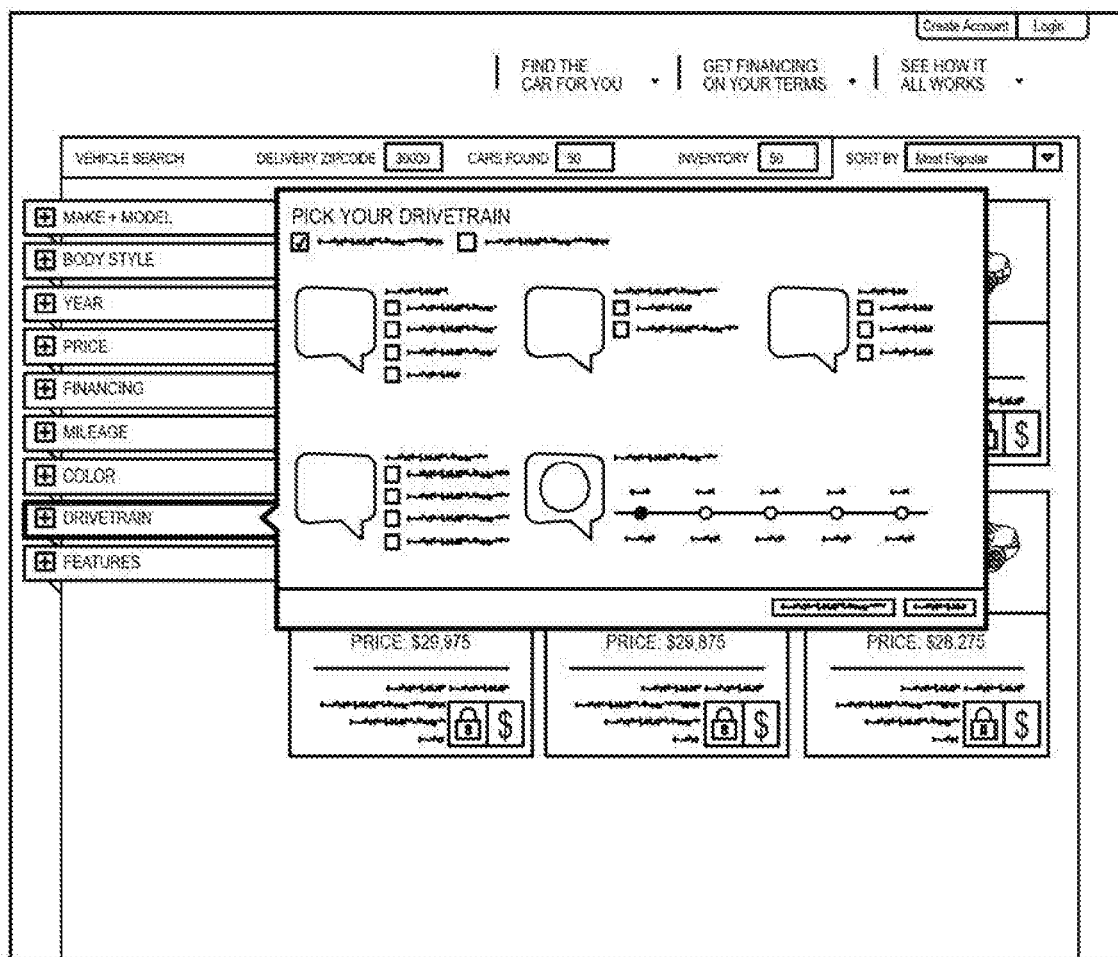
Figure 16:
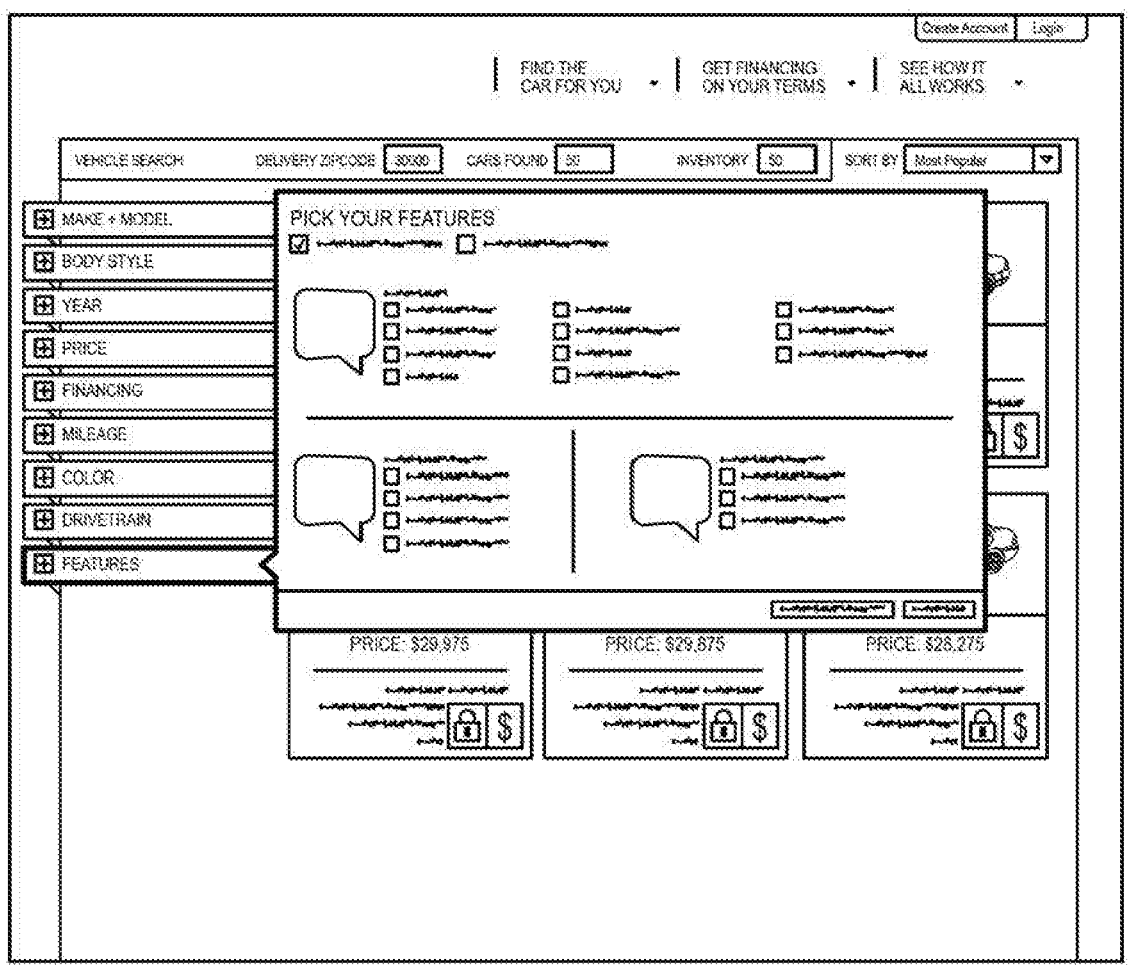

When the customer selects the drive train filter, he or she may define the particular engine, fuel type, transmission, drive capability (such as four wheel drive), and fuel efficiency of a vehicle, as illustrated in FIG. 15. Inventory that does not match those characteristics may not be displayed. The features filter may allow a customer to narrow the search results by a number of entertainment, safety, or other features, as illustrated in FIG. 16. This may include everything from ABS brakes to DVD video to heated seats. Filters may be combined with one another for further precision and may be cleared manually or all at once.

Figure 17:
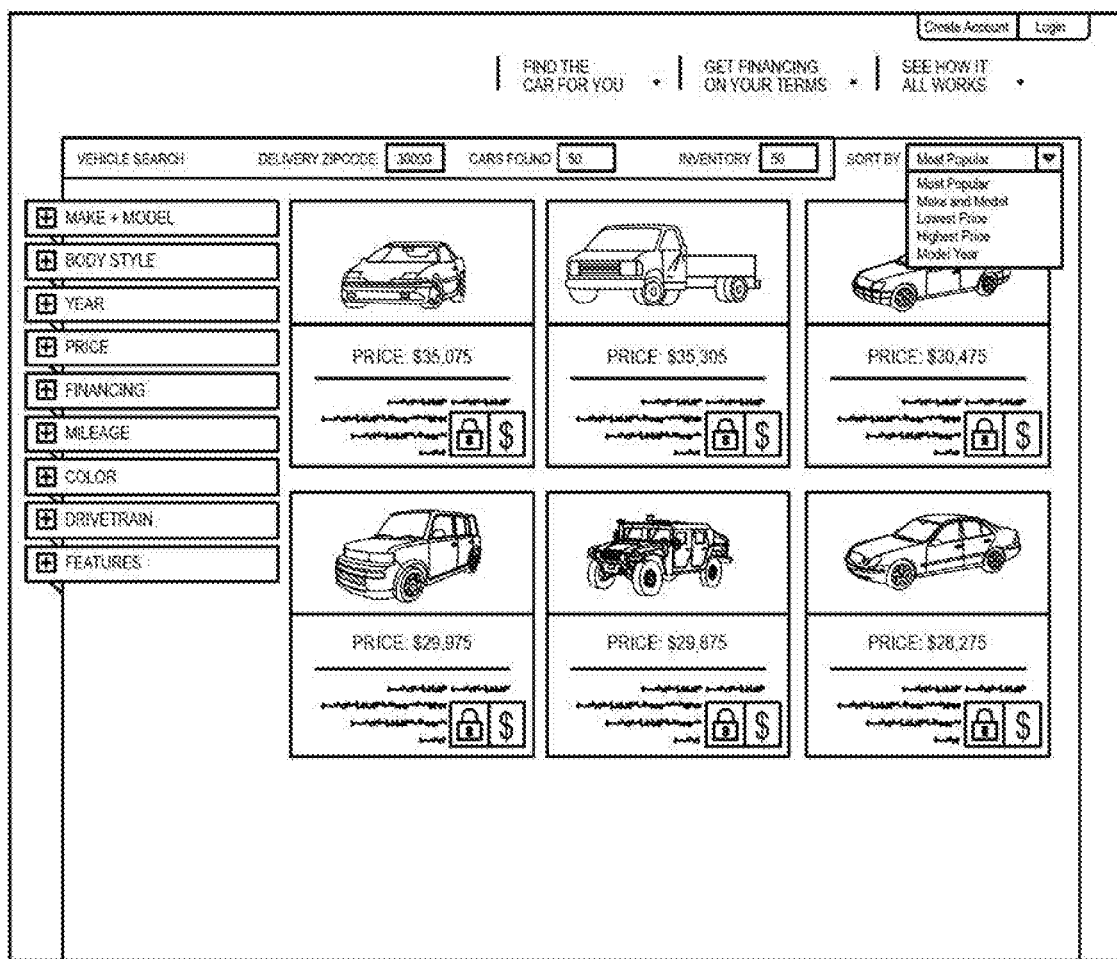
FIG. 17 is a screen shot of an example sort list page.
Figure 18:
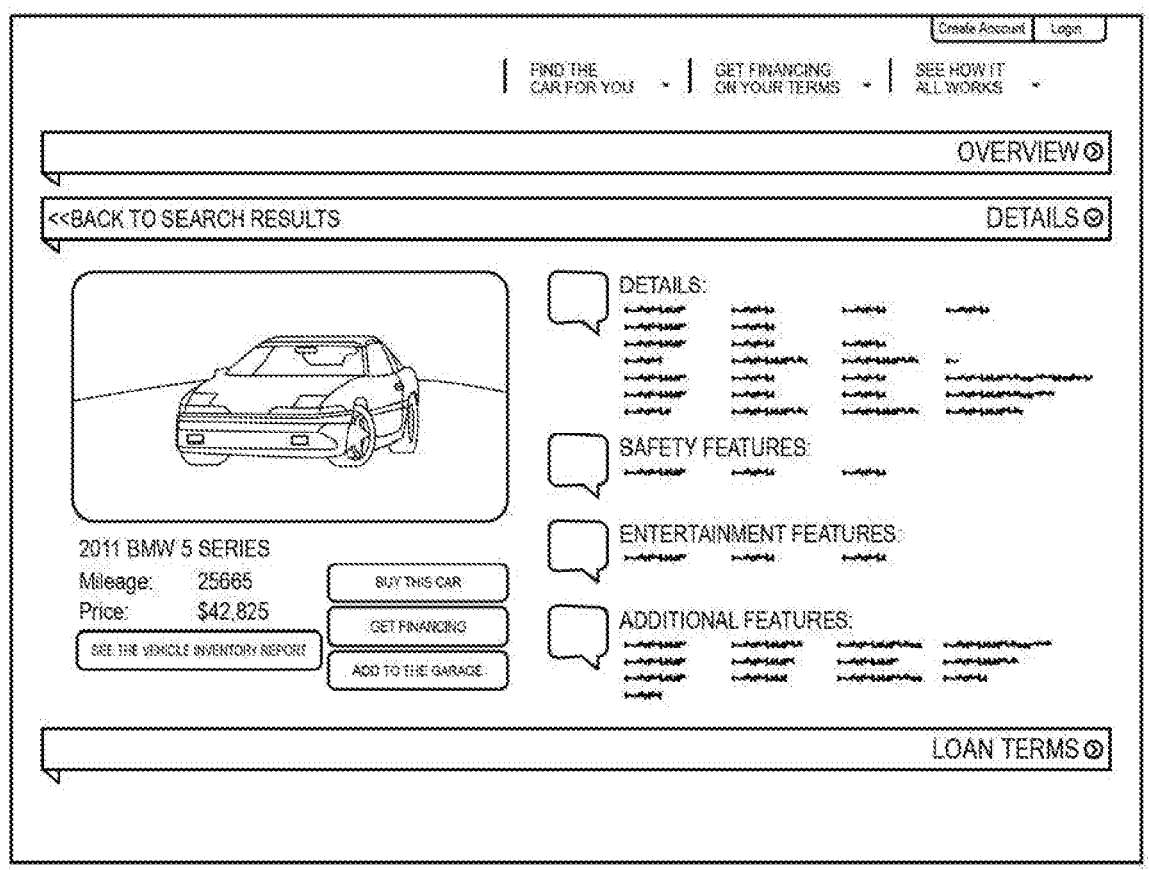
FIG. 18 is a screen shot of an example vehicle details page.
Figure 19:
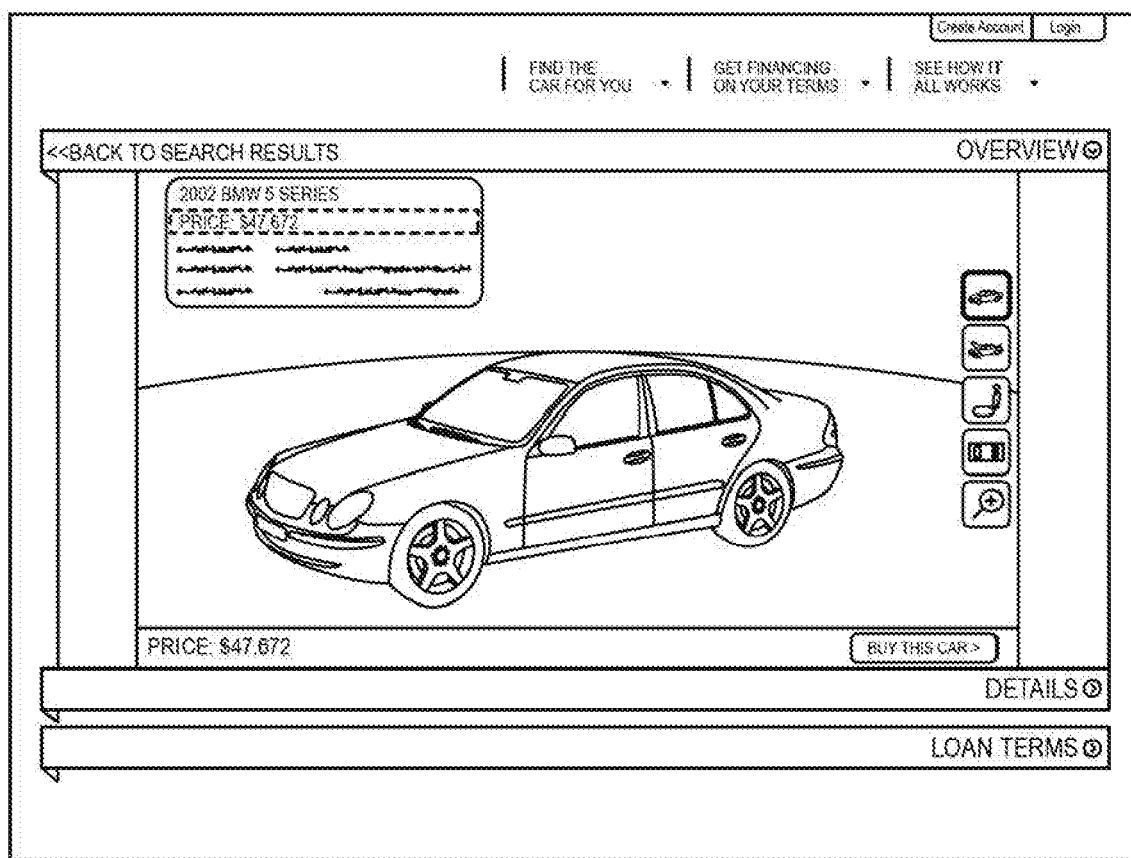
FIGS. 19-22 illustrate screen shots of example vehicle overview pages.
Figure 20:
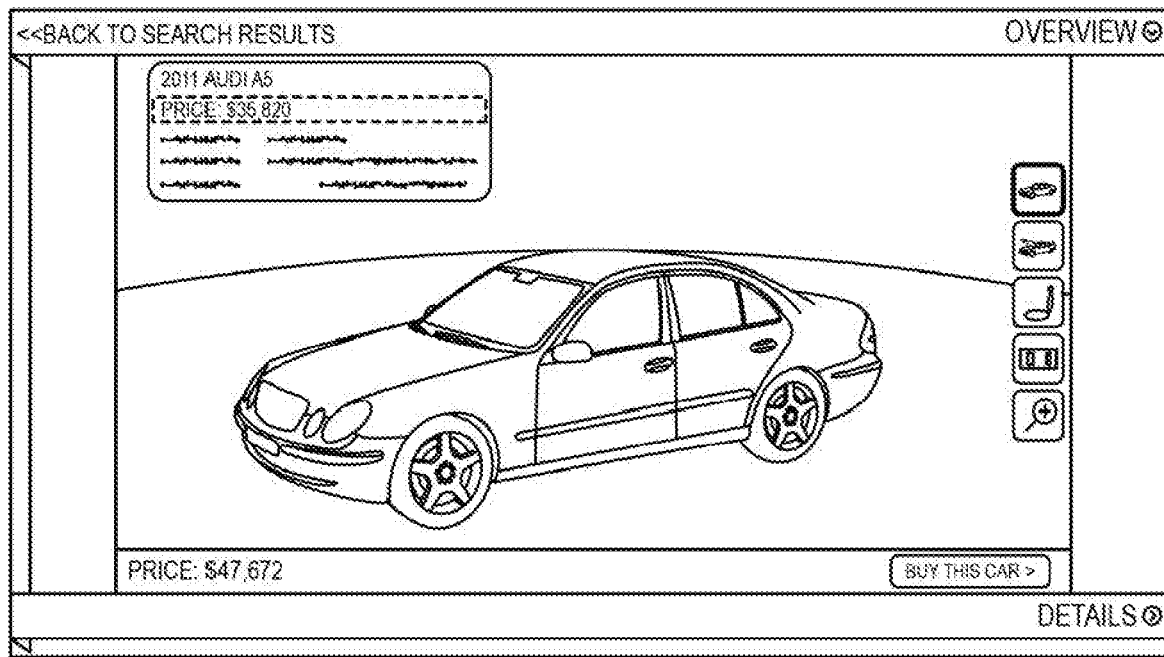
Figure 21:
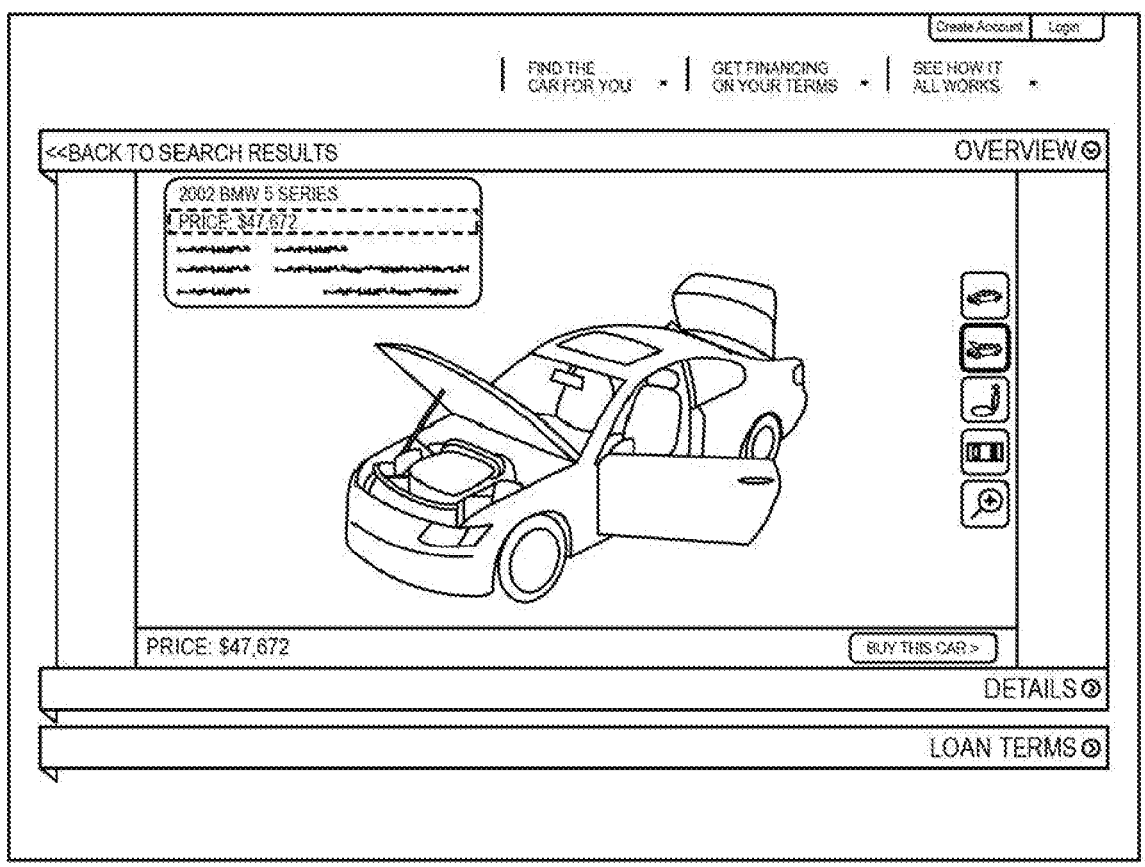
Figure 22:
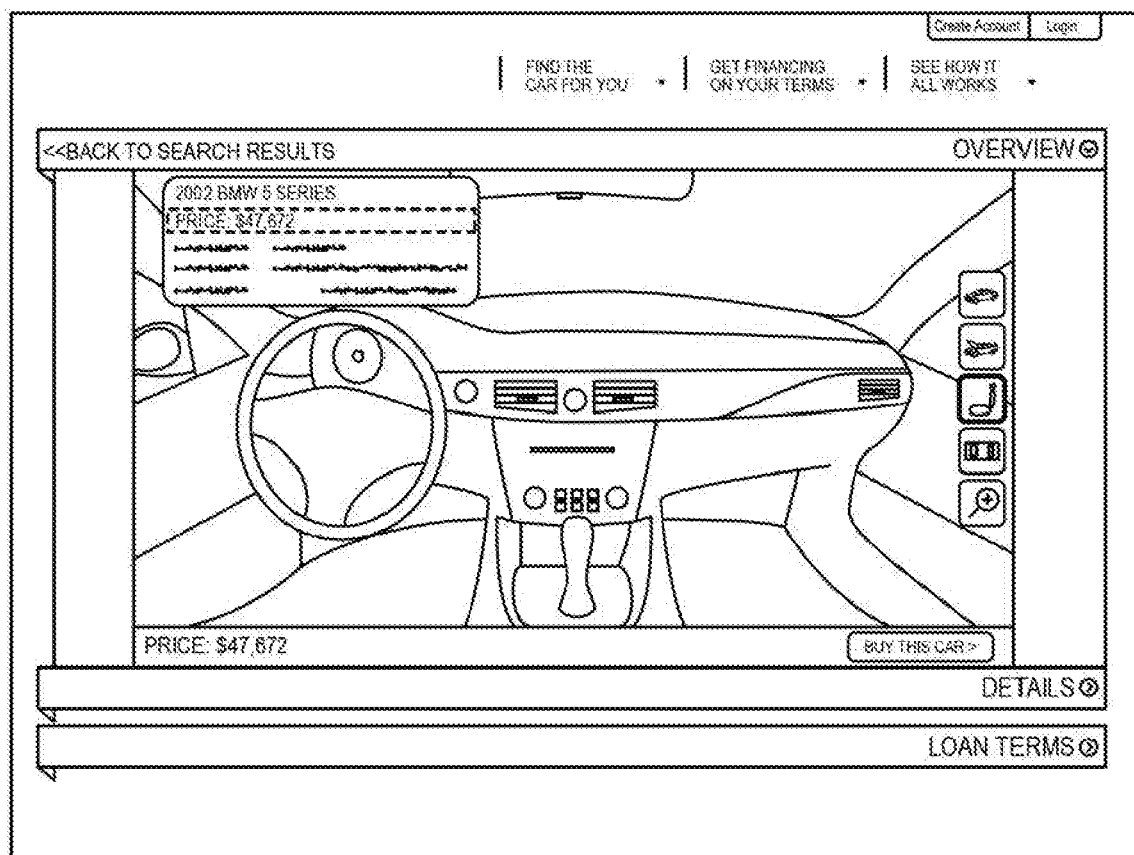

FIG. 17 is a screen shot of an example sort list page. The list of vehicles displayed may be sorted on screen in order of popularity, make & model, lowest price, highest price, latest model year, etc. In this manner, the customer may easily see a small photo of the vehicle, the make and model, the year, the mileage, the seller's full price, and personalized financing terms if a credit report has been run. If no report has been run yet, the customer may see a lock icon over the vehicle details and may only be displayed the make/model, year, price, and mileage for every vehicle. The customer's main goal in navigating the sort list page may be to find a vehicle or vehicles he or she may be interested in purchasing. The methods by which the customer may find a vehicle are varied. If a customer finds a vehicle to potentially purchase, he or she may click on any vehicle produced from the search and filter process to view in more detail as illustrated in FIG. 18, add to his or her garage, and/or purchase. FIG. 18 is a screen shot of an example vehicle details page. This page may list all details of a vehicle. The customer may read all listed details and choose to receive an Experian® Auto Check Report, or return to the shopping page. The vehicle details page may provide an understanding of all of the characteristics of the vehicle, especially those features which may not be easily recognizable from the photo viewer.

FIGS. 19-22 illustrate screen shots of example vehicle overview pages. In an aspect, the overview pages may provide a full disclosure of a vehicle selected by a customer on the shopping page. As an example, the customer may be able to view the vehicle via a "spinner." In an embodiment, a "spinner" may be a compilation of actual photographs of the specific vehicle being sold combined into a 360 degree dynamically adjustable digital image. The customer may further adjust the magnification of the image to more closely view any surface of the vehicle, as well as access images of the interior and of closed compartments, such as under the hood. A customer may select blue dots or "hot spots" that highlight important features or damages to the particular vehicle, which may automatically magnify the area of interest and expand an informational window further explaining that feature or damage. The customer may select a "Buy This Car" button or may opt to view the details or financing terms of the vehicle page. The customer may also add (or remove) the vehicle to his or her garage, where the customer can return to view it at a later date.

Figure 23:
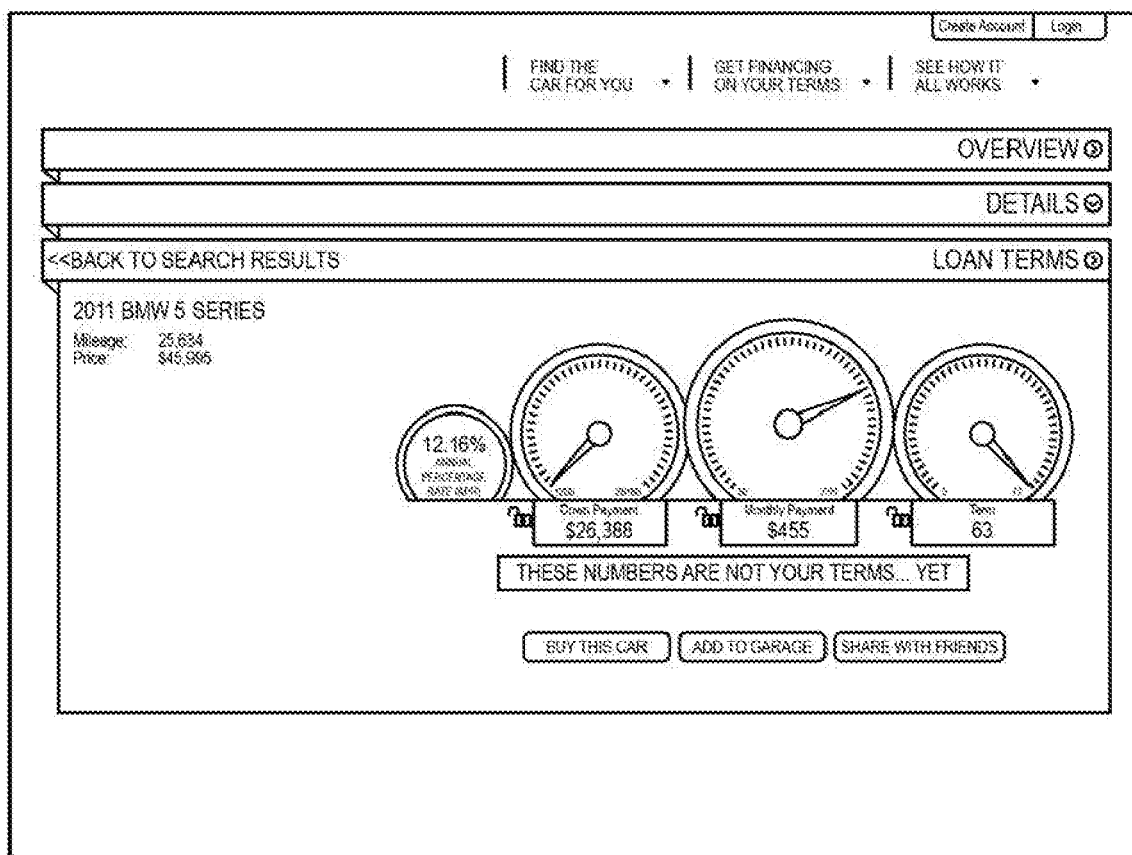
FIG. 23 illustrates an example financing page.
Figure 24:
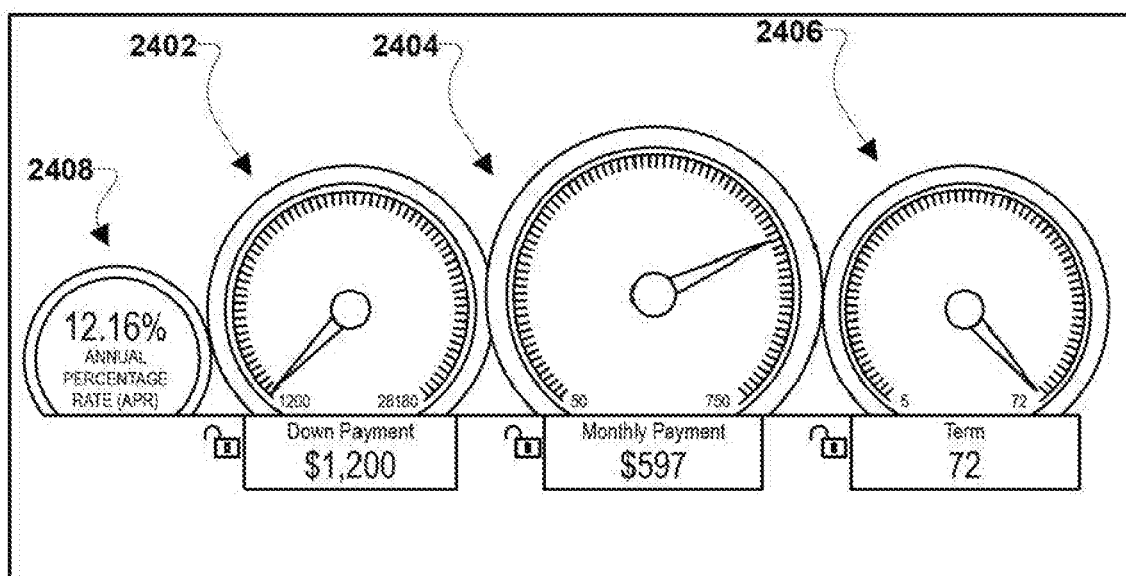
FIG. 24 illustrates an example user interface that may be displayed in a financing page in an embodiment.

FIGS. 23 and 24 illustrate an example financing page and a user interface that may be displayed in the financing page. In an aspect, the financing page may allow the customer to personalize his or her financing terms for the selected vehicle in order to arrive at an installment contract that is acceptable by both parties (i.e., the seller and the buyer). In another aspect, the customer may be presented with a unique online user interface where financing terms are presented in a form of an automobile dashboard. As illustrated in FIG. 24, the user interface may include readouts with dials for selecting down payment 2402, monthly payment 2404, and term 2406. APR may be presented as a numerical output in an additional gauge 2408 once the other values have been selected. The default settings for the dials may be at minimum down payment, maximum term, and the maximum monthly payment for that term. These levels may be set specifically for the customer and determined from his or her credit history. The system may track which dial the customer selected last. For example, if a customer adjusts the down payment and then adjusts the monthly payment, term may change. The customer may also lock a dial in place, so that any manipulation of the other two dials may maintain the third dial at its locked value (unless such a combination of outputs is not possible). The customer is also able to chose "buy car now" and then select "buy with cash" to purchase the vehicle without financing. As an example, the customer may finish this page with a financial structure he or she either approves or disapproves of. The former may lead the customer to click the "buy car now" button, while the latter may see the customer returning to any number of previous pages, including the Garage, shopping page, or Vehicle Overview or Details page.

Figure 25:
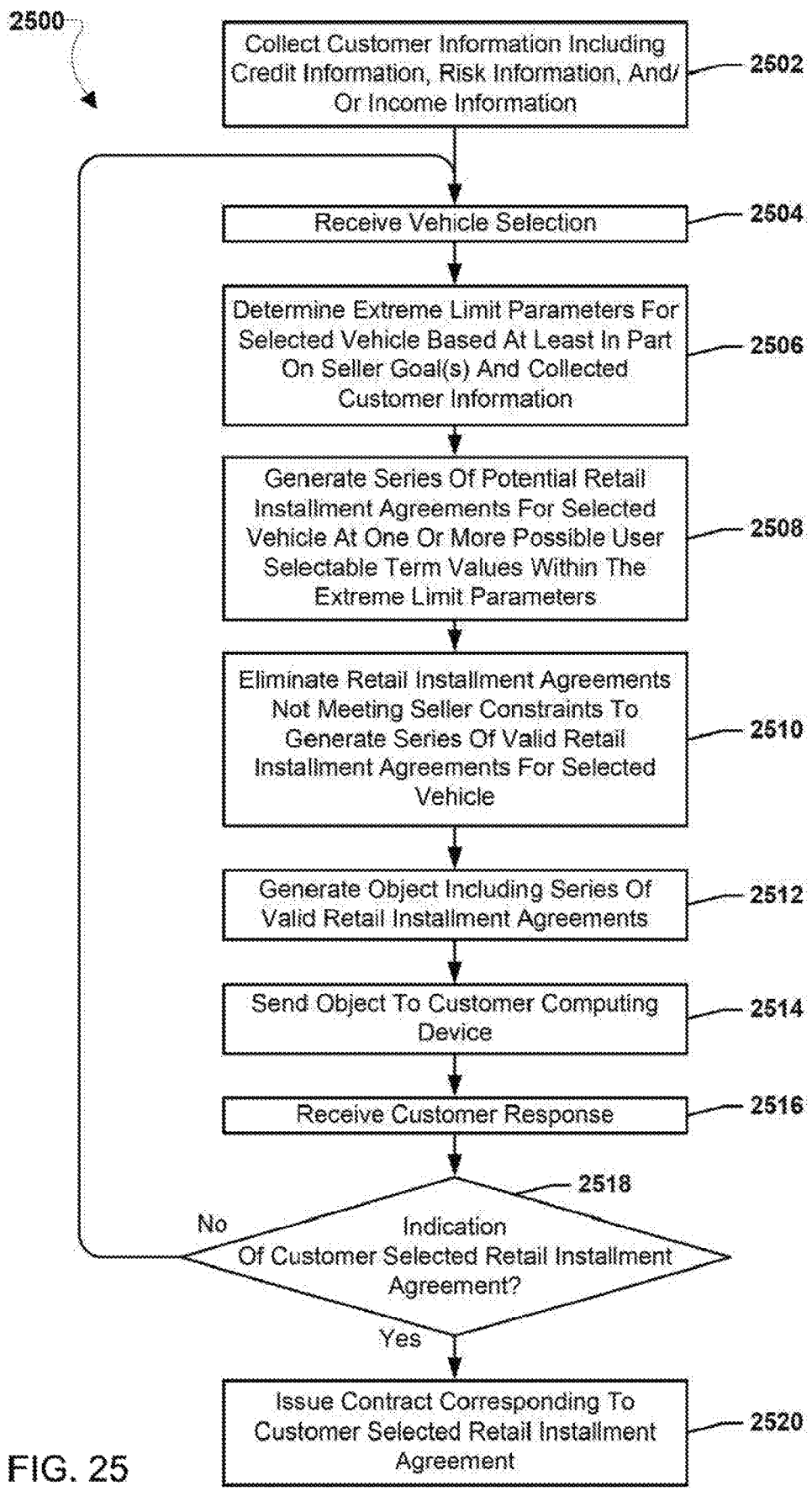
FIG. 25 is process flow diagram illustrating an embodiment method for generating a deal table.

FIG. 25 illustrates an embodiment method 2500 for generating one or more object, such as one or more deal table discussed above. In an embodiment, the operations of method 2500 may be performed by a processor of a server, such as a seller server 106 hosting a web portal enabling the purchase of an item, such as a vehicle.

In block 2502 the seller server may collect customer information including credit information, risk information, and/or income information for a customer. In an embodiment, customer information may be collected based on customer information received from a customer computing device and/or information gathered from third party sources, such as a credit bureaus, financial institutions, etc. Customer information may be stored in records associated with the customer, such as a user profile for a particular customer.

In block 2504 the seller server may receive a vehicle selection. In an embodiment, a vehicle selection may be an indication received from a customer computing device of a vehicle a user of the customer computing device is interested in purchasing. In block 2506 the seller server may determine the extreme limit parameters for the selected vehicle based at least in part on seller goals and the collected customer information. In an embodiment, the seller goals may include a yield, such as the desired return, on the contract for purchase of the vehicle. In an embodiment, the extreme limit parameters may be selected based on the risk of default of the customer. Extreme limit parameters may include maximum possible period payment, a maximum available term length, and/or a customer payment to income ratio. In block 2508 the seller server may generate a series of potential retail installment agreements for the selected vehicle at one or more possible user selectable term values within the extreme limit parameters. In an embodiment, the seller sever may generate a series of potential retail installment agreements by calculating terms for retail installment agreements at seller selected increments of any user specifiable or selectable parameters of a retail installment agreement, such as down payment amount, period payment amount, term amount, and APR, for one or more user specifiable or selectable parameters up to maximum values of those parameters as defined by the extreme limit parameters. In an embodiment, all possible user selectable term values within the extreme limit parameters may be used by the seller server to generate the series of potential retail installment agreements. In another embodiment, less than all possible user selectable term values within the extreme limit parameters may be used by the seller server to generate the series of potential retail installment agreements.

In block 2510 the seller server may eliminate retail installment agreements not meeting seller constraints to generate a series of valid retail installment agreements for the selected vehicle. As discussed above, all potential retail installment agreements may not be desirable to a seller, and undesirable retail installment agreements may not be offered to a customer. In an embodiment, seller constraints may include minimum/maximum down payment, minimum/maximum period, minimum/maximum term, and/or minimum/maximum APR a seller may be willing to accept on a retail installment agreement for the selected vehicle. By eliminating retail installment agreements not meeting the seller constraints, a series of valid retail installment agreements may be generated.

In block 2512 the seller server may generate an object including the series of valid retail installment agreements. As discussed above, the object may be one or more deal tables including the calculated terms of the valid retail installment agreements. In block 2514 the seller server may send the object to the customer computing device, for example, via a connection to a network, such as the Internet.

In block 2516 the seller server may receive a customer response. In an embodiment, a customer response may be an indication of a selected one of the valid retail installment agreements include in the previously sent object. In another embodiment, the customer response may an indication that the customer desires to select another vehicle. In determination block 2518 the seller server may determine whether the customer response is an indication of a customer selected retail installment agreement. If the customer response is not a selected retail installment agreement (i.e., determination block 2518="No"), in block 2504 the seller server may receive another vehicle selection. If the customer response is a selected retail installment agreement (i.e., determination block 2518="Yes"), in block 2520 the seller server may generate an indication of the selected one of the series of valid retail installment agreements indicated in the received customer response, for example the seller server may issue a contract corresponding to the customer selected retail installment agreement. In this manner, the contract issued by the seller server for the selected vehicle may include terms corresponding to user specified parameter selections in the selected valid retail installment agreement. Issuing a contract corresponding to the customer selected retail installment agreement may be only one example of an indication generated by the seller server in block 2520, and in other embodiment the seller server may not issue a contract. As other examples of generating an indication a seller server may generate and send a message to a third party computing device, such as a computing device of a loan company, including the indication of the selected one of the series of valid retail installment agreements indicated in the received customer response and/or the terms of the selected one of the series of valid retail installment agreements, thereby enabling the third party computing device and/or another entity to issue a corresponding contract.

Figure 26:
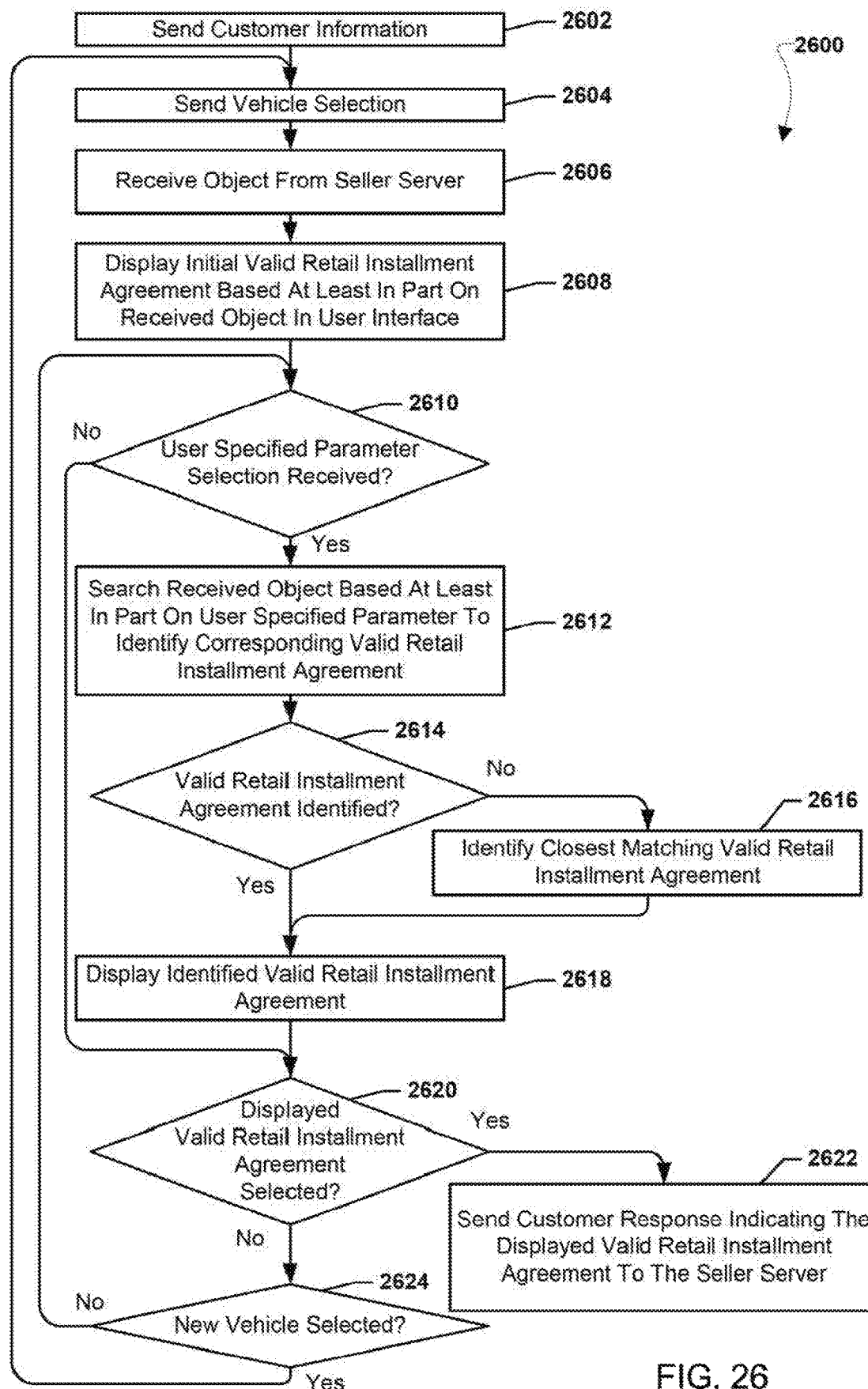
FIG. 26 is a process flow diagram illustrating an embodiment method for presenting deal parameters.

FIG. 26 is a process flow diagram illustrating an embodiment method for presenting deal parameters for valid retail installment agreements. In an embodiment, the operations of method 2600 may be performed by a processor of a customer computing device, such as a customer computing device 102 described above. In an embodiment, the operations of method 2600 may be performed in conjunction with the operations of method 2500 described above with reference to FIG. 25.

In block 2602 the customer computing device may send customer information to the seller server. Customer information sent by the customer computing device may include data entered by a user of the customer computing device in fields of forms on web pages hosted by the seller server, including income information, credit information, location information, etc. In block 2604 the customer computing device may send a vehicle selection to the seller server. For example, a vehicle selection may be an indication of a selection of a vehicle listed in a garage associated with the user of the customer computing device. As another example, a vehicle selection may be an indication of a selection of a vehicle from an inventory list of vehicles available from the seller.

In block 2606 the customer computing device may receive one or more objects from the seller server. As discussed above, the objects may be one or more deal tables indicating pre-calculated terms for a series of valid retail installment agreements determined for the vehicle-customer pairing. In block 2608 the customer computing device may display an initial valid retail installment agreement based at least in part on the received object in a user interface. The initial valid retail installment agreement may be the retail installment agreement corresponding to the maximum term and minimum down payment with the resulting period payments. In an embodiment, the initial valid retail installment agreement may be displayed in a financing interface including at least one user interface element configured to be manipulated by a user of the customer computing device to indicate user specified parameter selections. As an example, the user interface element may be displayed as a user selectable dial. The user interface configured as a dashboard with selectable dials discussed above with reference to FIGS. 23 and 24 is one example of such a user interface and user selectable dials. The examples of user selectable dials discussed herein are used merely as examples to illustrate aspects of the various embodiments, and other user interface elements configured to be manipulated by a user of a customer computing device may be substituted for the dials in the examples discussed herein without departing from the spirit or scope of the invention.

In determination block 2610 the customer computing device may determine whether a user specified parameters selection has been received. For example, the customer computing device may determine whether a needle of a dial has been moved by a user. If a user specified parameter selection is received (i.e., determination block 2610="Yes"), in block 2612 the customer computing device may search the received one or more objects based at least in part on the user specified parameter to identify corresponding valid retail installment agreements. As an example, the customer computing device may search the received one or more objects to find valid retail installment agreements matching the user specified parameters exactly. In determination block 2614 the customer computing device may determine whether a valid retail installment agreement is identified. If no valid retail installment agreement is identified (i.e., determination block 2614="No"), in block 2616 the customer computing device may identify the closest matching valid retail installment agreement. In an embodiment, a closest matching valid retail installment agreement may be found pivot point and/or block value operations described above.

If a valid retail installment agreement is identified (i.e., determination block 2614="Yes") or upon identifying the closest matching valid retail installment agreement in block 2616, in block 2618 the customer computing device may display the identified valid retail installment agreement. In an embodiment, the identified valid retail installment agreement may be displayed in a financing interface including at least one user interface element configured to be manipulated by a user of the customer computing device to indicate user specified parameters selections, such as a user interface element displayed as a user selectable dial in the user interface configured as a dashboard with selectable dials discussed above with reference to FIGS. 23 and 24.

If a user specified parameter selection is not received (i.e., determination block 2610="No") or upon displaying the identified valid retail installment agreement in block 2618, the customer computing device may determine whether the displayed valid retail installment agreement is selected by the user of the customer computing device in determination block 2620. For example, the customer computing device may determine whether an "buy this car" button is selected in the user interface. If the displayed valid retail installment agreement is selected (i.e., determination block 2620="Yes"), in block 2622 the customer computing device may send a customer response indicating the displayed valid installment agreement to the seller server. If the displayed valid retail installment agreement is not selected (i.e., determination block 2620="No"), in determination block 2624 the customer computing device may determine whether a new vehicle is selected. If a new vehicle is not selected (i.e., determination block 2624="No"), in block 2610 the customer computing device may continue to determine whether a user specified parameter selection is received. If a new vehicle is selected (i.e., determination block 2624="Yes"), in block 2604 the customer computing device may send the vehicle selection to the seller server.

Figure 27:
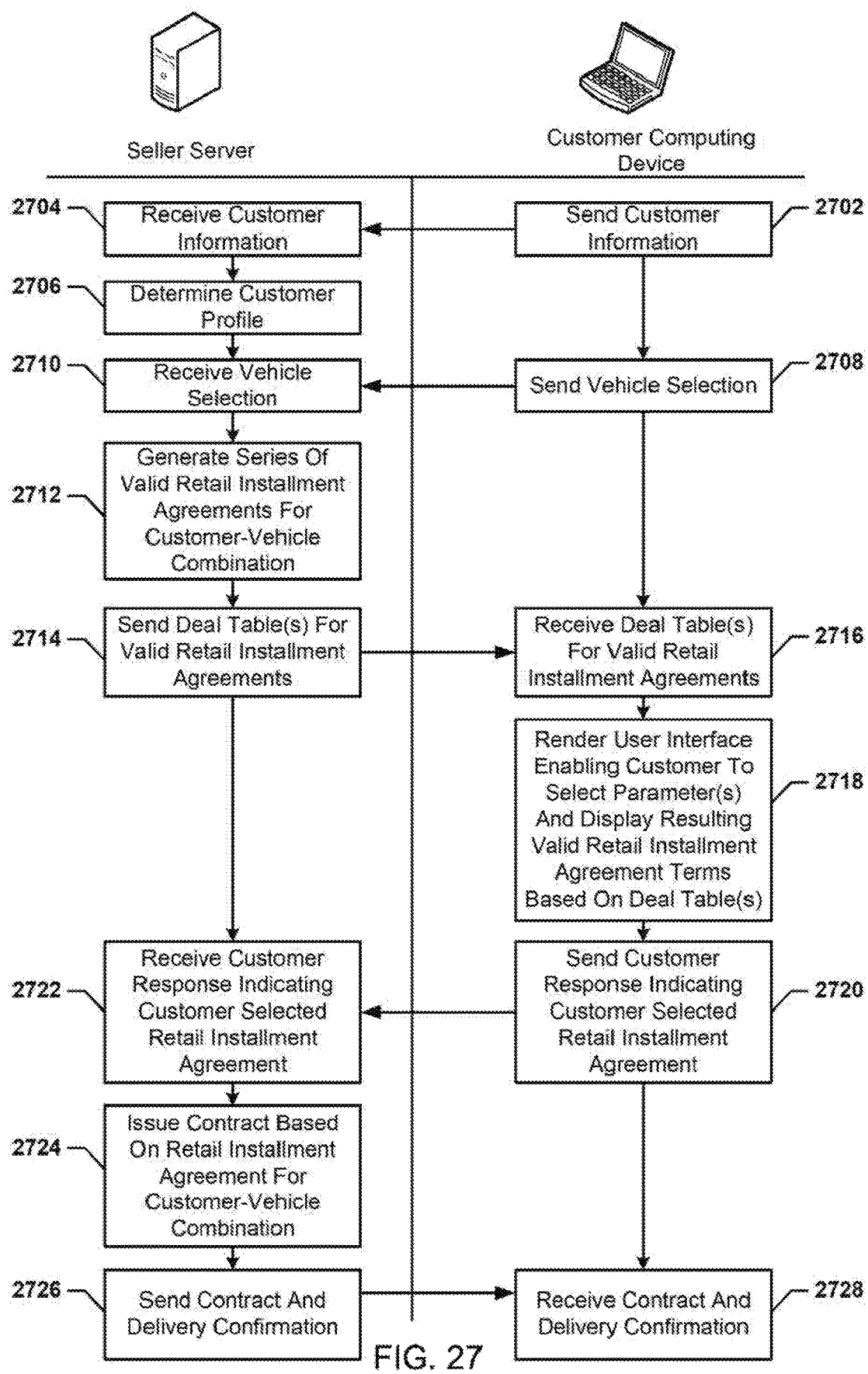
FIG. 27 is a communication and process flow diagram illustrating interactions between a seller server and customer computing device to close a deal.

FIG. 27 is a communication and process flow diagram illustrating interactions between a seller server and customer computing device to close a deal. In an embodiment, the operations illustrated in FIG. 27 may be performed by the seller server and customer computing device as part of the customer computing device rendering and interacting with web pages of a web portal hosted by the seller server enabling the purchase of an item, such as a vehicle.

In block 2702 the customer computing device may send customer information to the seller server and in block 2704 the seller server may receive the customer information. In block 2706 the seller server may determine a customer profile. In an embodiment, a customer profile may be a risk profile of the customer based on the customer information, such as credit history, income information, etc. In block 2708 the customer computing device may send a vehicle selection the seller server and in block 2710 the seller server may receive the vehicle selection. In block 2712 the seller server may generate a series of valid retail installment agreements for the customer-vehicle combination.

In block 2714 the seller server may send one or more deal tables for the valid retail installment agreements to the customer computing device and in block 2716 the customer computing device may receive the deal tables for the valid retail installment agreements. In block 2718 the customer computing device may render a user interface enabling the customer to select one or more parameters and the customer computing device may display the resulting valid retail installment agreement terms based on the received deal tables. In block 2720 the customer computing device may send the customer response indicating the customer selected retail installment agreement to the seller server, and in block 2722 the seller server may receive the customer response indicating the customer selected retail installment agreement.

In block 2724 the seller server may generate an indication of the selected one of the series of valid retail installment agreements indicated in the customer response, for example the seller server may generate an indication by issuing a contract based on the retail installment agreement for the customer-vehicle combination selected by the customer. As discussed above, issuing a contract is only one example of a manner in which a seller server may generate an indication of the selected one of the series of valid retail installment agreements indicated in the customer response, and the seller server may not necessarily issue a contract. Other examples of generating an indication may include sending messages to third party devices of the selected valid retail installment agreement, notifying other financing agents or systems of the third selected valid retail installment agreement selection, etc. Once a contract is issued by the seller server or alternatively by another device or party, in block 2726 the seller server may send the retail installment agreement and delivery confirmation to the customer computing device and in block 2728 the customer computing device may receive the retail installment agreement and delivery confirmation. For example, the issued contract may be indicated in one or more of a terms page, contract page, delivery confirmation page, and/or purchase page as discussed below.

In an aspect, a terms page may provide the same user interface provided under a Vehicle Page and Financial Terms and present it as part of the process for purchasing a vehicle online using financing. As an example, the same interactions possible on the Vehicle Financing Terms page may be available on a terms page. In addition, vehicle price, taxes & fees, total amount to be financed, APR, term, and monthly payment may all be listed in vertical order below the dials interface. These values may not be open to interaction outside of what the dials allow. The customer may also be able to see what the earliest delivery date may be and how many days it may take to complete the vehicle purchase. A timeline showing which step the customer is currently on, as well as all other steps in the purchasing process, may be displayed across the top of the screen. As an example, the customer may leave the terms page when he or she "locks in" the financial terms he or she has selected. This may finalize the financial structure of the installment contract and carry the customer to the next step in vehicle purchase process.

In an aspect, a vehicle verification page may facilitate the upload of customer provided documents used to verify that person's identity, place of residence, income, and possession of insurance. The service provider may begin by verifying the identity of the consumer. This is accomplished through an interface that connects to Experian's KIQ authentication. This asks the customer "out of wallet" questions that a fraudster may have difficulty acquiring. If the customer answers the questions sufficiently then he or she may move along in the verification process.

The customer may supply proof of income, proof of residency, a valid form of identification, and proof of insurance in order to buy a vehicle from the service provider. Proof of income may be satisfied by providing the customer's last two pay stubs or a bank account statement showing income dated back 60 days. Proof of residency may be provided by a utility bill or a piece of mail with the customer's name on it. A valid form of I.D. may include either a driver's license, state issued I.D., or a passport. Proof of insurance requires a copy of an insurance card or a certificate of liability. All documents must be uploaded digitally from a scan or photograph. An upload may be activated by clicking bright blue oblong buttons labeled with the related category of proof. The customer knows if the upload is completed via a status symbol. Once the file is uploaded the status changes from "Upload Needed" to "Pending Approval." This may change to "Approval" once the document has been inspected by the service provider employee. The customer may also specify that he or she is not currently in bankruptcy or in the process of filing for bankruptcy. Once all documents have been uploaded and are pending approval, the customer can select "Go to next step." By fully interacting with the verification page the customer may have accomplished the submission of documents necessary for the verification of the customer's identity and other requirements needed to finish the purchase of the vehicle.

In an aspect, a contract page may generate an electronic contract through a third party vendor for the customer to read and electronically sign. In another aspect, the customer must provide his or her electronic signature multiple times for the e-contract in order to finish the purchase process. This may be done by first confirming the electronic signature. Once completed, the customer may only have to click on boxes that require an e-signature or initial, where the signature or initial is automatically filled in. The customer may then click "Apply Signature" to fully submit the signature. Response time may also be measured to gauge the likelihood that the person using the computer is in fact reading the signed documents. Once finished, the customer may have completed the electronic signing process, and the electronic contract between the customer and the seller may be complete.

Figure 28:
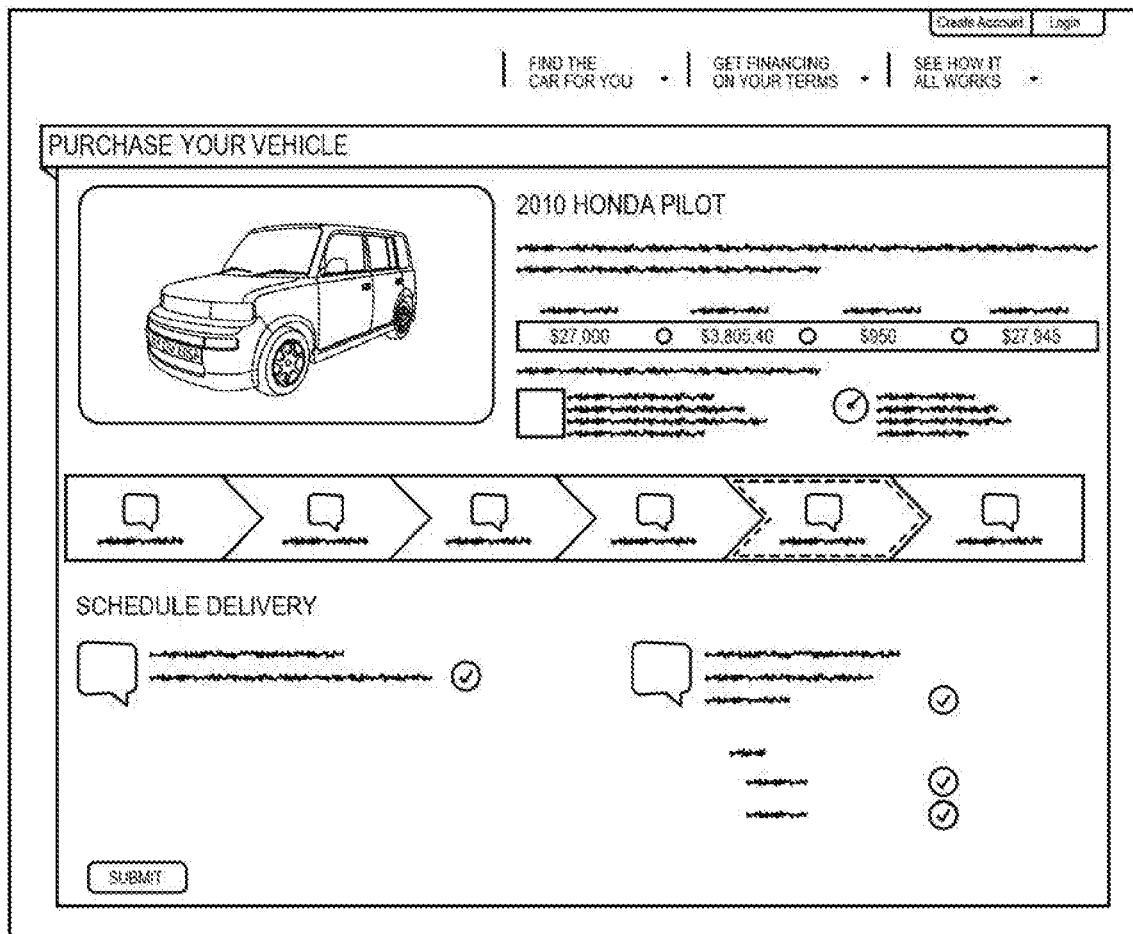
FIG. 28 illustrates an example delivery page.

FIG. 28 illustrates a delivery page. In an aspect, the delivery page may allow the customer to select the time and location for delivery of the vehicle. The available delivery options shown may be calculated based off of the current staffing, current scheduled appointments and the customer's delivery address. In another aspect, the customer may select the date and time of day from a drop down menu and confirm the delivery address, which by default is set as the address provided during the create account process. The customer may confirm all information on screen by clicking the submit button. By completing this page the customer may have specified when and where the vehicle will be delivered.

In an aspect, a down payment page allows the system to collect the customer's bank account information to withdraw the down payment for the vehicle, the amount of which was specified previously. In another aspect, the customer, given an example image of a check to refer to, must enter his or her routing and account numbers from a personal check. There may also be a confirmation step for the customer's telephone number and address. The customer's name and email are displayed but not changeable on this page. The customer may check a box to authorize the transaction and hit "submit" to finish the payment process. As an example, once the customer has provided the information and consent for the down payment to be made via ACH withdrawal from his or her bank account, this step is complete. Other policies may also be displayed to the customer.

Figure 29:
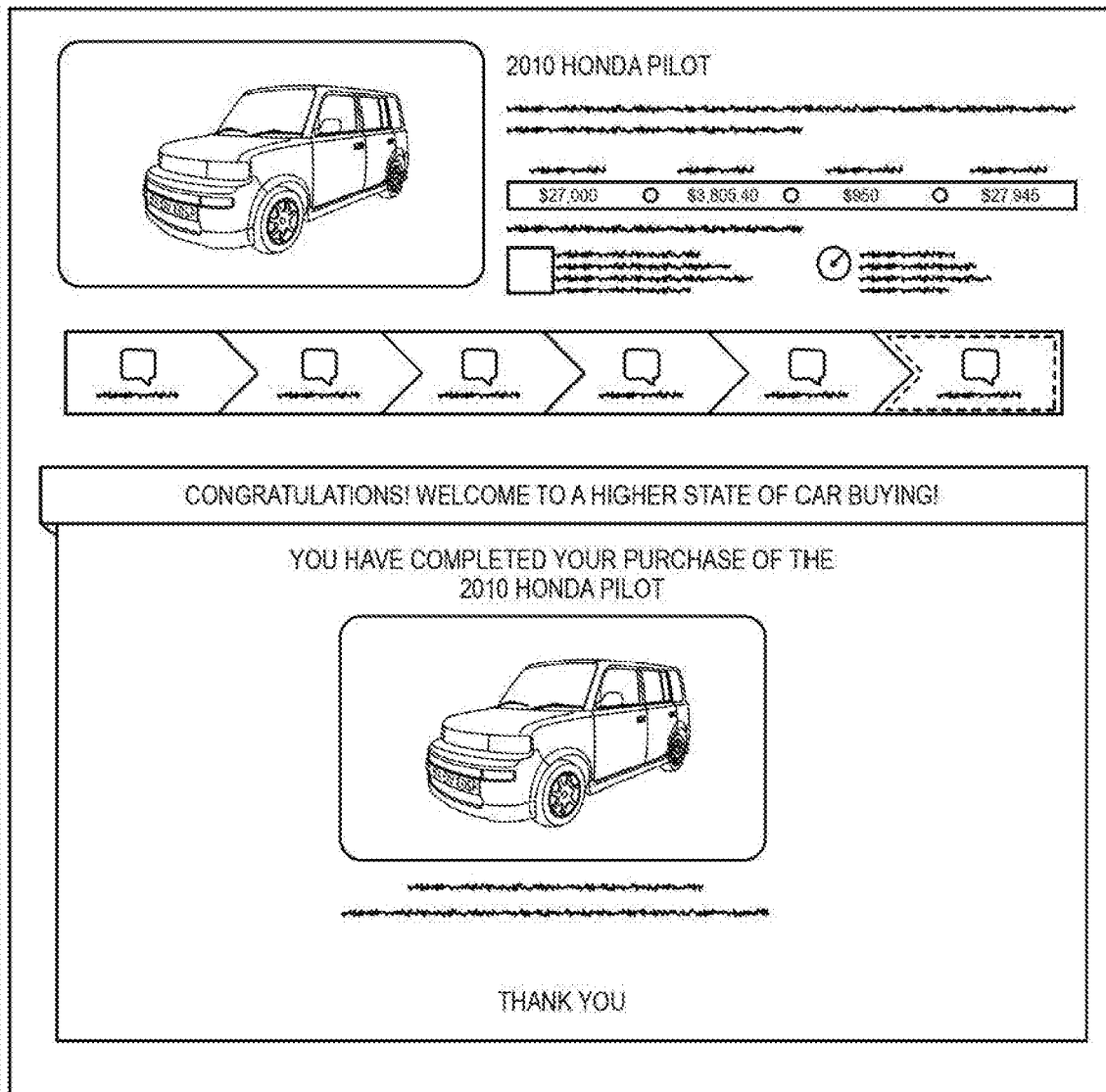
FIG. 29 illustrates an example purchase page.

FIG. 29 illustrates a purchase page. In an aspect, this page congratulates the customer on his or her vehicle purchase and signals the completion of the purchasing process. The customer may be given information to read. This may include his or her confirmation number for records. Other information may include the notification process for delivery as well as notices for what documents the customer should have on hand at delivery (such as identification). There may be no special buttons or links for the customer to interact with inside the webpage. The customer may return to one of the main three web pages that are always listed on the top section of the webpage or interact with his or her web browser in another manner.

In an aspect, an already purchasing notice can be provided to a customer to inform a customer who has begun an online purchase of a second motor vehicle that he or she is already in the process of purchasing another vehicle. In another aspect, the customer may be given the option of returning to whatever purchasing step he or she was at with regard to the first vehicle selected. A customer may cancel the order on that vehicle, making the purchase of the second vehicle possible, though that would have to be reinitiated from the shopping page again and may be subject to all of the conditions of the full purchase process, regardless of whatever steps were performed under the first selected vehicle.

Figure 30:
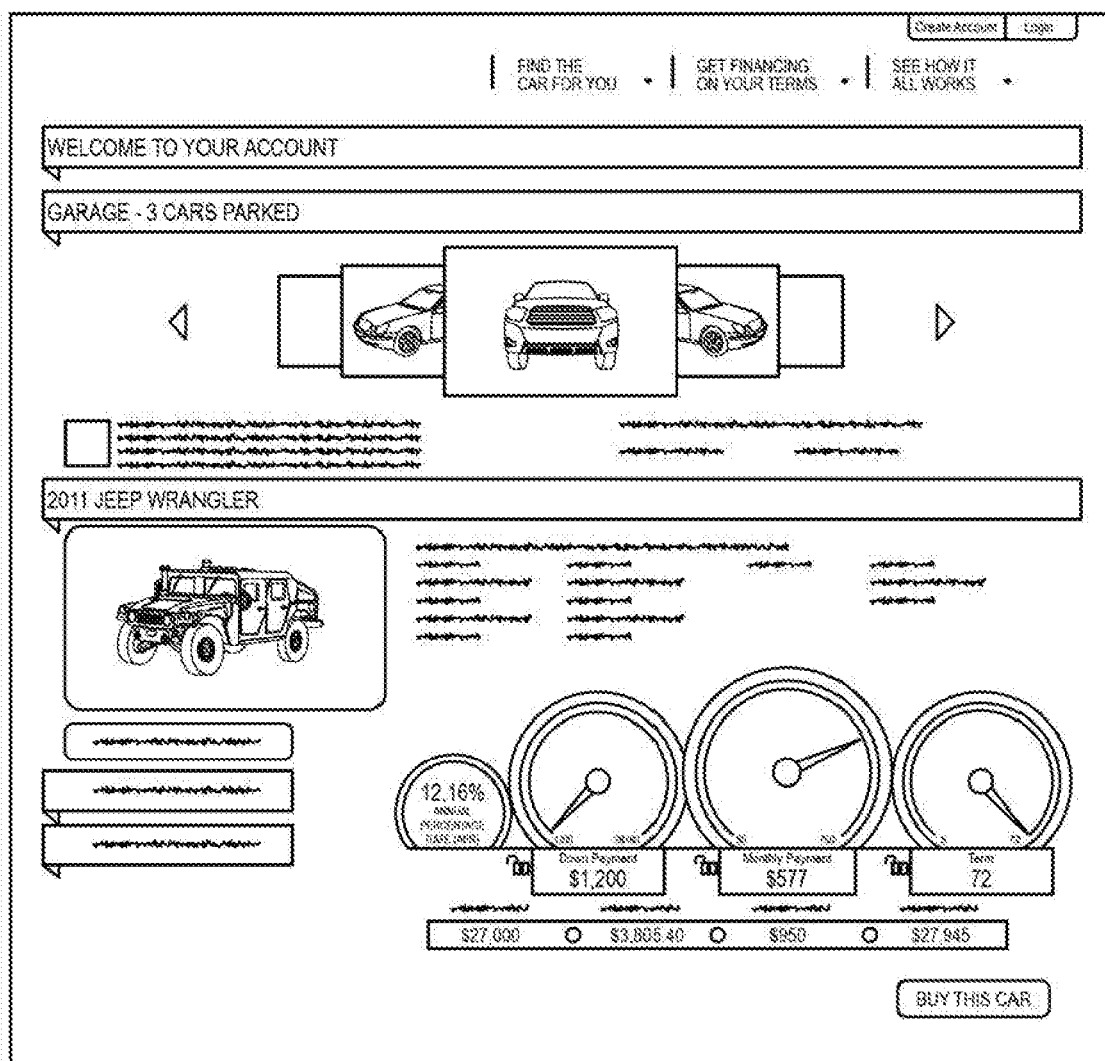
FIG. 30 is a screen shot of an exemplary options page.

FIG. 30 is a screen shot of an exemplary options page. Various options may be provided to a customer or user, such as a user garage, financing information, search information, delivery information, and information relating to online transactions. In an aspect, options may be provided in different modes or states, such as public and private. As an example, FIG. 30 is a screen shot of an exemplary garage page shown in private state. Other options and information can be presented in various states or modes.

In an aspect, a contact us page may provided customer service to a customer. The purpose of this page may be to offer the customer a human source to direct questions and concerns. This may be done by providing a helpful message and phone number for the service provider Customer Advocates. The customer may find from this page an outlet to voice questions and concerns. This information is also accessible by placing the cursor over the live help tab which may always be located midway down the right edge of the website window.

Figure 31:
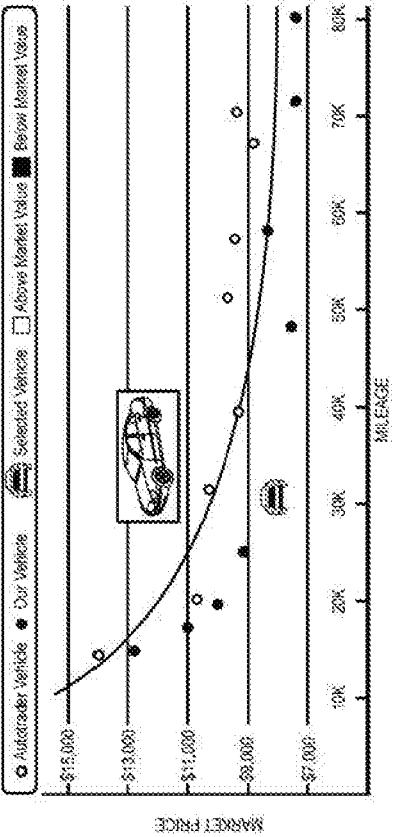
FIG. 31 illustrates an exemplary market comparison page.

FIG. 31 illustrates an exemplary market comparison page. In an aspect, the market comparison page may illustrate to the customer his or her monetary savings from purchasing a vehicle over a similar product on the open market. This page also allows a customer to view his or her vehicle options on a third party web site, such as Auto Trader® used in the examples below, if the vehicle does not match his or her personal preferences.

In another aspect, for a selected vehicle, a customer may be presented with a graphical representation of market conditions on that day for similar vehicles over a range of prices and mileage. In order to give a customer a fair representation of the actual market for this car the service provider may provide the vehicles available for sale in their area. For example, the service provider may limit the vehicles from another site (e.g., Auto Trader®) to the same Make, Model, Year, Trim and Package as the vehicle being viewed within a 100 mile radius of the customer zip code. The vehicles that come back from Auto Trader® may then be run through algorithms to ensure the service provider is displaying only the most appropriate "similar" vehicles to the customer. This process begins by using formulas to remove outliers from the data set, in the dimensions of mileage, sales price and the sales price given the mileage. Next the service provider constructs the depreciation curves which represent the market value for the vehicle with a given mileage. These curves may be generated by fitting the Auto Trader® data after removing outliers. That is, the service provider may generate a curve that determines the market value for any given mileage by using the actual cars available in the market. The curves may not be generated off of the service provider vehicles at all. The curves may be constructed statistically and practically. This may ensures that a vehicle with one more mile than another vehicle must be cheaper. It may also recognize the different depreciation rates of different types of vehicles. Some vehicles may have a very different curve shape than other vehicles. The shape may be completely dependent on what is available within the market on that day. Market Price Comparison may only be displayed for a vehicle if the number of cars available on Auto Trader® is great enough to generate an intelligent curve. Whether or not Market Price Comparison is displayed may not depend on where the service provider vehicles appear on the curve.

Once the curve is generated for the customer on the webpage, he or she may be given a menu to select from the list of vehicles produced by Auto Trader® to initiate a side-by-side comparison with the selected vehicle. Price and mileage may be compared, with savings from the vehicle (if present) displayed for the customer. Discrepancies in mileage may be converted into dollar amounts. This process may be explained to the customer if he or she clicks on the adjacent symbol "?". Finally the customer may be reminded of the unique features of the service provider, including the "7 Day Money Back Guarantee," "Delivery to your driveway," and a full vehicle history disclosure. The customer may use the market comparison page to reference the relative value of a vehicle with the service provider's particular retail process and support with other vehicles on the market at that time, represented by the independent vendor Auto Trader®. If the customer wishes to purchase a vehicle pervaded by the vendor, the service provider may facilitate the customer's transfer to that service.

Figure 32:
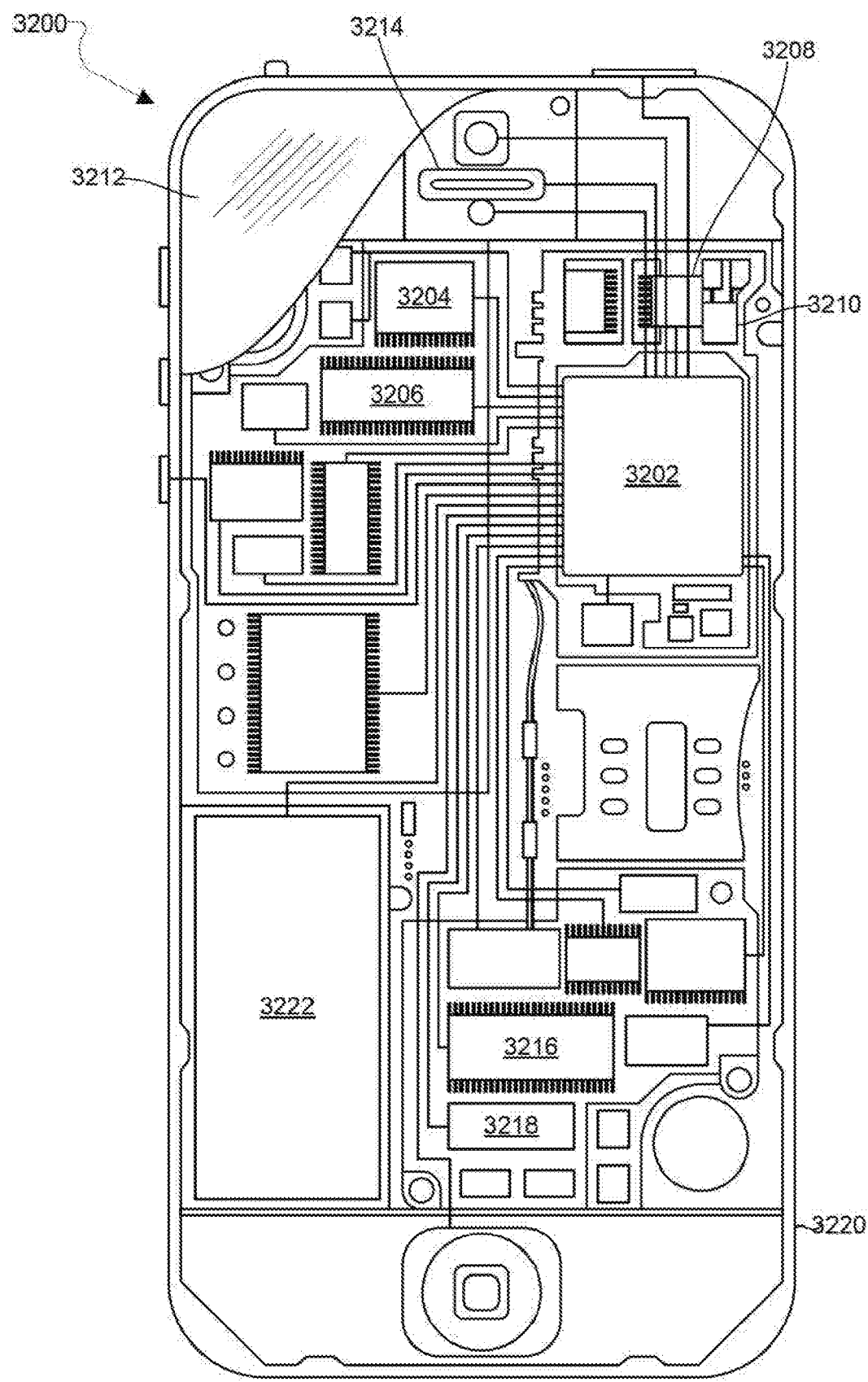
FIG. 32 is a component diagram of an example computing device suitable for use with the various embodiments.

The various embodiments may be implemented in any of a variety of computing devices, such as a mobile computing device, an example of which is illustrated in FIG. 32. For example, the mobile computing device 3200 may include a processor 3202 coupled to internal memories 3204 and 3206. Internal memories 3204 and 3206 may be volatile or non-volatile memories, and may also be secure and/or encrypted memories, or unsecure and/or unencrypted memories, or any combination thereof. The processor 3202 may also be coupled to a touch screen display 3212, such as a resistive-sensing touch screen, capacitive-sensing touch screen infrared sensing touch screen, or the like. Additionally, the display of the receiver device 3200 need not have touch screen capability. The receiver device 3200 may have one or more radio signal transceivers 3208 (e.g., Peanut®, Bluetooth®, Zigbee®, Wi-Fi, RF radio) and antennae 3210, for sending and receiving, coupled to each other and/or to the processor 3202. The mobile computing device 3200 may include a cellular network interface, such as wireless modem chip 3216, that enables communication via a cellular data network (e.g., CDMA, TDMA, GSM, PCS, 3G, 4G, LTE, or any other type of cellular data network) and is coupled to the processor 3202. The receiver device 3200 may include a peripheral device connection interface 3218 coupled to the processor 3202. The peripheral device connection interface 3218 may be singularly configured to accept one type of connection, or multiply configured to accept various types of physical and communication connections, common or proprietary, such as USB, FireWire, Thunderbolt, or PCIe. The peripheral device connection interface 3218 may also be coupled to a similarly configured peripheral device connection port. The mobile computing device 3200 may also include speakers 3214 for providing audio outputs. The receiver device 3200 may also include a housing 3220, constructed of a plastic, metal, or a combination of materials, for containing all or some of the components discussed herein. The receiver device 3200 may include a power source 3222 coupled to the processor 3202, such as a disposable or rechargeable battery. The rechargeable battery may also be coupled to the peripheral device connection port to receive a charging current from a source external to the mobile computing device 3200.

Figure 33:
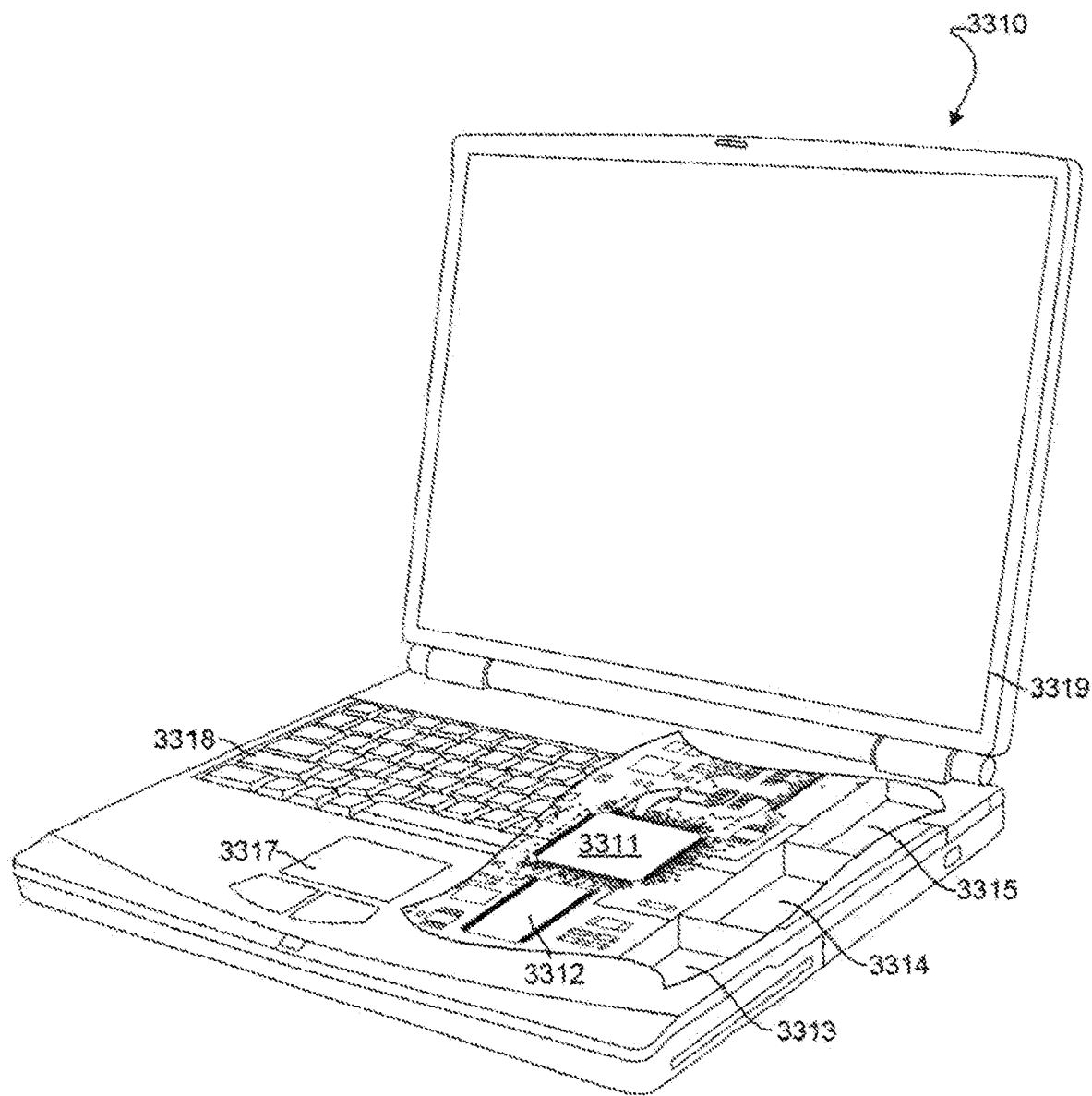
FIG. 33 is a component diagram of another example computing device suitable for use with the various embodiments.
Figure 34:
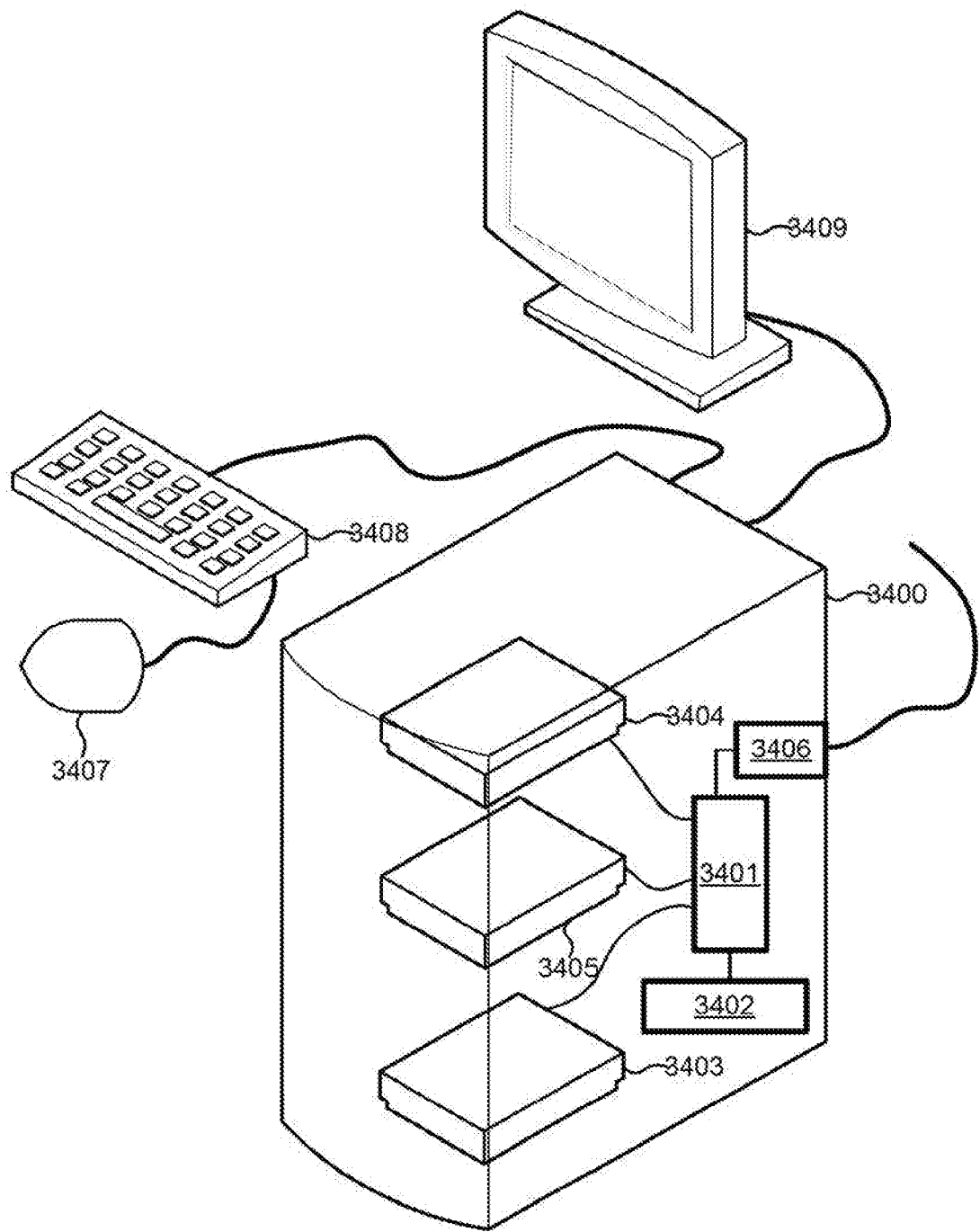
FIG. 34 is a component diagram of an additional example computing device suitable for use with the various embodiments.

The various embodiments described above may also be implemented within a variety of computing devices, such as a laptop computer 3310 as illustrated in FIG. 33. Many laptop computers include a touch pad touch surface 3317 that serves as the computer's pointing device, and thus may receive drag, scroll, and flick gestures similar to those implemented on mobile computing devices equipped with a touch screen display and described above. A laptop computer 3310 will typically include a processor 3311 coupled to volatile memory 3312 and a large capacity nonvolatile memory, such as a disk drive 3313 of Flash memory. The laptop computer 3310 may also include a floppy disc drive 3314 and a compact disc (CD) drive 3315 coupled to the processor 3311. The laptop computer 3310 may also include a number of connector ports coupled to the processor 3311 for establishing data connections or receiving external memory devices, such as a USB or FireWire® connector sockets, or other network connection circuits (e.g., interfaces) for coupling the processor 3311 to a network. In a notebook configuration, the computer housing may include the touchpad 3317, the keyboard 3318, and the display 3319 all coupled to the processor 3311. Other configurations of the computing device may include a computer mouse or trackball coupled to the processor (e.g., via a USB input) as are well known, which may also be use in conjunction with the various embodiments.

The various embodiments described above may also be implemented within a variety of computing devices, such as a desk top computer 3400 as illustrated in FIG. 32. A desk top computer 3400 will typically include a processor 3401 coupled to volatile memory 3402 and a large capacity nonvolatile memory, such as a disk drive 3404 of Flash memory. The desk top computer 3400 may also include a floppy disc drive 3405 and a compact disc (CD) drive 3403 coupled to the processor 2701. The desk top computer 3400 may also include a number of connector ports 3406 coupled to the processor 3401 for establishing data connections or receiving external memory devices, such as a USB or FireWire® connector sockets, or other network connection circuits (e.g., interfaces) for coupling the processor 3411 to a network. Additionally, a keyboard 3408, mouse 3407, and display 3419 may all be coupled to the processor 3401.

Figure 35:
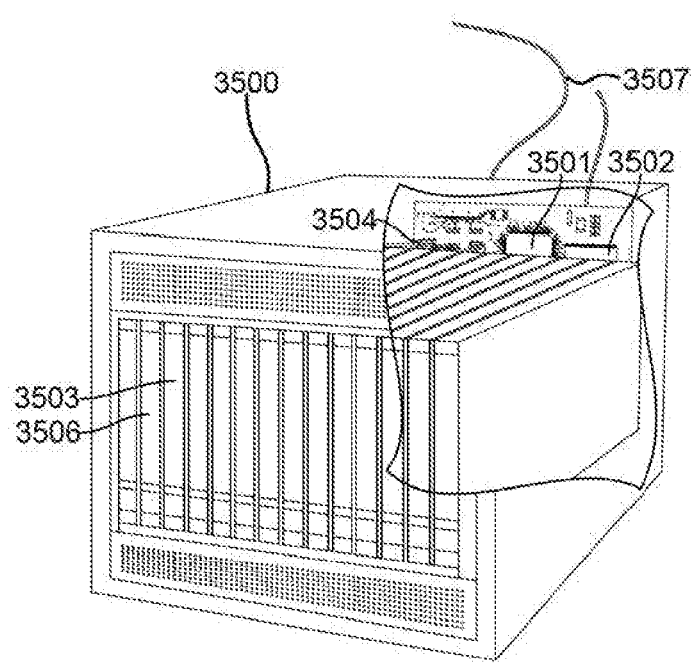
FIG. 35 is a component diagram of an example server suitable for use with the various embodiments.

The various embodiments may also be implemented on any of a variety of commercially available server devices, such as the server 3500 illustrated in FIG. 35. Such a server 3500 typically includes a processor 3501 coupled to volatile memory 3502 and a large capacity nonvolatile memory, such as a disk drive 3503. The server 3500 may also include a floppy disc drive, compact disc (CD) or DVD disc drive 3506 coupled to the processor 3501. The server 3500 may also include network access ports 3504 (network interfaces) coupled to the processor 3501 for establishing network interface connections with a network 3507, such as a local area network coupled to other computers and servers, the Internet, the public switched telephone network, and/or a cellular data network (e.g., CDMA, TDMA, GSM, PCS, 3G, 4G, LTE, or any other type of cellular data network).

The processors 3202, 3311, 3401, and 3501 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 3204, 3206, 3312, 3313, 3402, 3404, 3502, and 3503 before they are accessed and loaded into the processors 3202, 3311, 3401, and 3501. The processors 3202, 3311, 3401, and 3501 may include internal memory sufficient to store the application software instructions. In many devices the internal memory may be a volatile or nonvolatile memory, such as flash memory, or a mixture of both. For the purposes of this description, a general reference to memory refers to memory accessible by the processors 3202, 3311, 3401, and 3501 including internal memory or removable memory plugged into the device and memory within the processor 3202, 3311, 3401, and 3501 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method comprising:
    receiving, in a seller server, customer information from a customer computing device;
    receiving, in the seller server, an item selection from the customer computing device;
    determining, in the seller server, extreme limit parameters for the selected item based at least in part on a seller goal and the received customer information;
    generating, in the seller server, a series of potential retail installment agreements for the selected item at one or more possible user selectable term values within the determined extreme limit parameters;
    eliminating, in the seller server, any retail installment agreement of the series of potential retail installment agreements for the selected item not meeting a seller constraint to generate a series of valid retail installment agreements for the selected item;
    generating, in the seller server, one or more objects including the series of valid retail installment agreements for the selected item;
    sending, from the seller server, the one or more objects to the customer computing device enabling the customer computing device to display a dashboard comprising a first graphical interface element, a second graphical interface element distinct from the first graphical interface element, and a third graphical interface element distinct from the first graphical interface element and the second graphical interface element, wherein the first graphical interface element is a selectable element configured to be manipulated by a user of the customer computing device to indicate a first of the one or more possible user selectable term values, wherein the second graphical interface element is a selectable element configured to be manipulated by the user of the customer computing device to indicate a second of the one or more possible user selectable term values, wherein the third graphical interface element is a selectable element configured to be manipulated by the user of the customer computing device to indicate a fourth of the one or more possible user selectable term values, wherein manipulation of the first graphical interface element modifies the second graphical interface element to indicate a second of the one or more possible user selectable term values that corresponds to one of the series of valid retail installment agreements generated with the first of the one or more possible user selectable term values and manipulation of the second graphical interface element modifies the first graphical interface element to indicate a third of the one or more possible user selectable term values that corresponds to one of the series of valid retail installment agreements generated with the second of the one or more possible user selectable term values, and wherein the first graphical interface element is configured to be locked by the user such that manipulation of the second graphical interface element after the first graphical interface element is locked modifies the third graphical interface element without modifying the first graphical interface element;
    receiving, in the seller server, a customer response from the computing device indicating a selected one of the series of valid retail installment agreements; and
    generating, in the seller server, an indication of the selected one of the series of valid retail installment agreements indicated in the received customer response.

2. The method of claim 1, wherein:
    the seller goal is a yield on the contract for purchase of the item;
    the extreme limit parameters are one or more of a maximum possible period payment, a maximum available term length, and a customer payment to income ratio; and
    the seller constraint is one or more of a minimum down payment, a maximum down payment, a minimum period payment, a maximum period payment, a maximum term, a minimum term, a maximum annual percentage rate (APR), and a minimum APR.

3. The method of claim 1, wherein the first graphical interface element and the second graphical interface element are displayed at the customer computing device as separate user selectable dials.

4. The method of claim 1, wherein the item is a motor vehicle.

5. The method of claim 1, wherein generating, in the seller server, an indication of the selected one of the series of valid retail installment agreements indicated in the received customer response comprises issuing, in the seller server, a contract for purchase of the item corresponding to terms of the selected one of the series of valid retail installment agreements indicated in the received customer response.

6. A server, comprising:
    a network interface; and
    a processor connected to the network interface, wherein the processor is configured with processor-executable instructions to perform operations comprising:
        receiving customer information from a customer computing device via the network interface;
        receiving an item selection from the customer computing device via the network interface;

determining extreme limit parameters for the selected item based at least in part on a seller goal and the received customer information;

generating a series of potential retail installment agreements for the selected item at one or more possible user selectable term values within the determined extreme limit parameters;

eliminating any retail installment agreement of the series of potential retail installment agreements for the selected item not meeting a seller constraint to generate a series of valid retail installment agreements for the selected item;

generating one or more objects including the series of valid retail installment agreements for the selected item;

sending the one or more objects to the customer computing device via the network interface enabling the customer computing device to display a dashboard comprising a first graphical interface element a second graphical interface element distinct from the first graphical interface element, and a third graphical interface element distinct from the first graphical interface element and the second graphical interface element, wherein the first graphical interface element is a selectable element configured to be manipulated by a user of the customer computing device to indicate a first of the one or more possible user selectable term values, wherein the second graphical interface element is a selectable element configured to be manipulated by the user of the customer computing device to indicate a second of the one or more possible user selectable term values, wherein the third graphical interface element is a selectable element configured to be manipulated by the user of the customer computing device to indicate a fourth of the one or more possible user selectable term values, wherein manipulation of the first graphical interface element modifies the second graphical interface element to indicate a second of the one or more possible user selectable term values that corresponds to one of the series of valid retail installment agreements generated with the first of the one or more possible user selectable term values and manipulation of the second graphical interface element modifies the first graphical interface element to indicate a third of the one or more possible user selectable term values that corresponds to one of the series of valid retail installment agreements generated with the second of the one or more possible user selectable term values, and wherein the first graphical interface element is configured to be locked by the user such that manipulation of the second graphical interface element after the first graphical interface element is locked modifies the third graphical interface element without modifying the first graphical interface element;

receiving a customer response from the computing device via the network interface indicating a selected one of the series of valid retail installment agreements; and generating an indication of the selected one of the series of valid retail installment agreements indicated in the received customer response.

7. The server of claim 6, wherein the processor is configured with processor-executable instructions to perform operations such that: the seller goal is a yield on the contract for purchase of the item; the extreme limit parameters are one or more of a maximum possible period payment, a maximum available term length, and a customer payment to income ratio; and the seller constraint is one or more of a minimum down payment, a maximum down payment, a minimum period payment, a maximum period payment, a maximum term, a minimum term, a maximum annual percentage rate (APR), and a minimum APR.

8. The server of claim 6, wherein the first graphical interface element and the second graphical interface element are displayed at the customer computing device as separate user selectable dials.

9. The server of claim 6, wherein the item is a motor vehicle.

10. The server of claim 6, wherein generating an indication of the selected one of the series of valid retail installment agreements indicated in the received customer response comprises issuing a contract for purchase of the item corresponding to terms of the selected one of the series of valid retail installment agreements indicated in the received customer response.

11. A non-transitory processor readable storage medium having stored thereon processor-executable instructions configured to cause a processor to perform operations comprising:

receiving customer information from a customer computing device;

receiving an item selection from the customer computing device;

determining extreme limit parameters for the selected item based at least in part on a seller goal and the received customer information;

generating a series of potential retail installment agreements for the selected item at one or more possible user selectable term values within the determined extreme limit parameters;

eliminating any retail installment agreement of the series of potential retail installment agreements for the selected item not meeting a seller constraint to generate a series of valid retail installment agreements for the selected item;

generating one or more objects including the series of valid retail installment agreements for the selected item;

sending the one or more objects to the customer computing device enabling the customer computing device to display a dashboard comprising a first graphical interface element, a second graphical interface element distinct from the first graphical interface element, and a third graphical interface element distinct from the first graphical interface element and the second graphical interface element, wherein the first graphical interface element is a selectable element configured to be manipulated by a user of the customer computing device to indicate a first of the one or more possible user selectable term values, wherein the second graphical interface element is a selectable element configured to be manipulated by the user of the customer computing device to indicate a second of the one or more possible user selectable term values, wherein the third graphical interface element is a selectable element configured to be manipulated by the user of the customer computing device to indicate a fourth of the one or more possible user selectable term values, wherein manipulation of the first graphical interface element modifies the second graphical interface element to indicate a second of the one or more possible user selectable term values that corresponds to one of the series of valid retail installment agreements generated with the first of the one or more possible user selectable term values and manipulation of the second graphical interface element modifies the first graphical interface element to indicate a third of the one or more possible user selectable term values that corresponds to one of the series of valid retail installment agreements generated with the second of the one or more possible user selectable term values, and wherein the first graphical interface element is configured to be locked by the user such that manipulation of the second graphical interface element after the first graphical interface element is locked modifies the third graphical interface element without modifying the first graphical interface element;

receiving a customer response from the computing device indicating a selected one of the series of valid retail installment agreements; and generating an indication of the selected one of the series of valid retail installment agreements indicated in the received customer response.

12. The non-transitory processor readable medium of claim 11, wherein the stored processor-executable instructions are configured to cause a processor to perform operations such that:

the seller goal is a yield on the contract for purchase of the item;

the extreme limit parameters are one or more of a maximum possible period payment, a maximum available term length, and a customer payment to income ratio; and the seller constraint is one or more of a minimum down payment, a maximum down payment, a minimum period payment, a maximum period payment, a maximum term, a minimum term, a maximum annual percentage rate (APR), and a minimum APR.

13. The non-transitory processor readable medium of claim 11, wherein the stored processor-executable instructions are configured to cause a processor to perform operations such that the first graphical interface element and the second graphical interface element are displayed at the customer computing device as separate user selectable dials.

14. The non-transitory processor readable medium of claim 11, wherein the stored processor-executable instructions are configured to cause a processor to perform operations such that the item is a motor vehicle.

15. The non-transitory processor readable medium of claim 11, wherein the stored processor-executable instructions are configured to cause a processor to perform operations such that generating an indication of the selected one of the series of valid retail installment agreements indicated in the received customer response comprises issuing a contract for purchase of the item corresponding to terms of the selected one of the series of valid retail installment agreements indicated in the received customer response.

16. A method for providing an online transaction, comprising:

receiving, in a seller server, customer information from a customer computing device via a network;

receiving, in the seller server, an item selection from the customer computing device via the network;

determining, in the seller server, extreme limit parameters for the selected item based at least in part on a seller goal and the received customer information;

generating, in the seller server, a series of potential retail installment agreements for the selected item at one or more possible user selectable term values within the determined extreme limit parameters;

eliminating, in the seller server, any retail installment agreement of the series of potential retail installment agreements for the selected item not meeting a seller constraint to generate a series of valid retail installment agreements for the selected item;

generating, in the seller server, one or more objects including the series of valid retail installment agreements for the selected item;

sending the one or more objects from the seller server to the customer computing device via the network enabling the customer computing device to display a dashboard comprising a first graphical interface element a second graphical interface element distinct from the first graphical interface element, and a third graphical interface element distinct from the first graphical interface element and the second graphical interface element, wherein the first graphical interface element is a selectable element configured to be manipulated by a user of the customer computing device to indicate a first of the one or more possible user selectable term values, wherein the second graphical interface element is a selectable element configured to be manipulated by the user of the customer computing device to indicate a second of the one or more possible user selectable term values, wherein the third graphical interface element is a selectable element configured to be manipulated by the user of the customer computing device to indicate a fourth of the one or more possible user selectable term values, wherein manipulation of the first graphical interface element modifies the second graphical interface element to indicate a second of the one or more possible user selectable term values that corresponds to one of the series of valid retail installment agreements generated with the first of the one or more possible user selectable term values and manipulation of the second graphical interface element modifies the first graphical interface element to indicate a third of the one or more possible user selectable term values that corresponds to one of the series of valid retail installment agreements generated with the second of the one or more possible user selectable term values, and wherein the first graphical interface element is configured to be locked by the user such that manipulation of the second graphical interface element after the first graphical interface element is locked modifies the third graphical interface element without modifying the first graphical interface element;

displaying, at the customer computing device, an initial valid retail installment agreement from the series of valid retail installment agreements for the selected item based at least in part on the selected first dial interface element parameter and the selected second dial interface elements parameter;

receiving, in the customer computing device, a user specified parameter selection;

identifying, in the customer computing device, another valid retail installment agreement from the series of valid retail installment agreements for the selected item corresponding to the user specified selection based at least in part on the one or more objects; and displaying, at the customer computing device, the another valid retail installment agreement.

17. The method of claim 16, further comprising:

receiving, in the customer computing device, a selection of the another valid retail installment agreement;

generating, in the customer computing device, a customer response indicating the selected another valid retail installment agreement;
sending the customer response from the customer computing device to the seller server via the network; and
generating, in the seller server, an indication of the selected one of the series of valid retail installment agreements indicated in the received customer response.

18. The method of claim 17, wherein:
the seller goal is a yield on the contract for purchase of the item;
the extreme limit parameters are one or more of a maximum possible period payment, a maximum available term length, and a customer payment to income ratio;
the seller constraint is one or more of a minimum down payment, a maximum down payment, a minimum period payment, a maximum period payment, a maximum term, a minimum term, a maximum annual percentage rate (APR), and a minimum APR; and
the user specified parameter selection is one or more of a down payment amount, a period payment amount, a term amount, and an APR.

19. A system, comprising:
a customer computing device, comprising:
    a first network interface configured to communicate with a network;
    a display; and
    a first processor coupled to the first network interface and the display;
a seller server, comprising:
    a second network interface configured to communicate with the network; and
    a second processor coupled to the second network interface, wherein the second processor is configured with processor-executable instructions to perform operations comprising:
        receiving customer information from the customer computing device via the second network interface;
        receiving an item selection from the customer computing device via the second network interface;
        determining extreme limit parameters for the selected item based at least in part on a seller goal and the received customer information;
        generating a series of potential retail installment agreements for the selected item at one or more possible user selectable term values within the determined extreme limit parameters;
        eliminating any retail installment agreement of the series of potential retail installment agreements for the selected item not meeting a seller constraint to generate a series of valid retail installment agreements for the selected item;
        generating one or more objects including the series of valid retail installment agreements for the selected item; and
        sending the one or more objects to the customer computing device via the second network interface, and
wherein the first processor is configured with processor-executable instructions to perform operations comprising:
    receiving the one or more objects via the first network interface enabling the customer computing device to display a dashboard comprising a first graphical interface element a second graphical interface element distinct from the first graphical interface element, and a third graphical interface element distinct from the first graphical interface element and the second graphical interface element, wherein the first graphical interface element is a selectable element configured to be manipulated by a user of the customer computing device to indicate a first of the one or more possible user selectable term values, wherein the second graphical interface element is a selectable element configured to be manipulated by the user of the customer computing device to indicate a second of the one or more possible user selectable term values, wherein the third graphical interface element is a selectable element configured to be manipulated by the user of the customer computing device to indicate a fourth of the one or more possible user selectable term values, wherein manipulation of the first graphical interface element modifies the second graphical interface element to indicate a second of the one or more possible user selectable term values that corresponds to one of the series of valid retail installment agreements generated with the first of the one or more possible user selectable term values and manipulation of the second graphical interface element modifies the first graphical interface element to indicate a third of the one or more possible user selectable term values that corresponds to one of the series of valid retail installment agreements generated with the second of the one or more possible user selectable term values, and wherein the first graphical interface element is configured to be locked by the user such that manipulation of the second graphical interface element after the first graphical interface element is locked modifies the third graphical interface element without modifying the first graphical interface element;
    displaying, at the customer computing device, an initial valid retail installment agreement from the series of valid retail installment agreements for the selected item based at least in part on the selected first graphical interface element parameter and the selected second graphical interface element parameter;
    receiving a user specified parameter selection;
    identifying another valid retail installment agreement from the series of valid retail installment agreements for the selected item corresponding to the user specified selection based at least in part on the one or more objects; and
    displaying on the display the another valid retail installment agreement.

20. The system of claim 19, wherein the first processor is configured with processor-executable instructions to perform operations further comprising:
    receiving a selection of the another valid retail installment agreement;
    generating a customer response indicating the selected another valid retail installment agreement; and
    sending the customer response to the seller server via the first network interface, and
wherein the second processor is configured with processor-executable instructions to perform operations further comprising:
    receiving the customer response via the second network interface; and generating an indication of the selected one of the series of valid retail installment agreements indicated in the received customer response.

21. The system of claim 20, wherein:

the seller goal is a yield on the contract for purchase of the item;

the extreme limit parameters are one or more of a maximum possible period payment, a maximum available term length, and a customer payment to income ratio;

the seller constraint is one or more of a minimum down payment, a maximum down payment, a minimum period payment, a maximum period payment, a maximum term, a minimum term, a maximum annual percentage rate (APR), and a minimum APR; and the user specified parameter selection is one or more of a down payment amount, a period payment amount, a term amount, and an APR.

\* \* \* \* \*